US011875383B2

(12) United States Patent
Mo

(10) Patent No.: US 11,875,383 B2
(45) Date of Patent: Jan. 16, 2024

(54) ADVERTISEMENT ATTRIBUTION METHOD AND DEVICE

(71) Applicant: Huawei Technologies Co., Ltd., Shenzhen (CN)

(72) Inventor: Lan Mo, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/759,181

(22) PCT Filed: Jan. 6, 2021

(86) PCT No.: PCT/CN2021/070453
§ 371 (c)(1),
(2) Date: Jul. 20, 2022

(87) PCT Pub. No.: WO2021/147673
PCT Pub. Date: Jul. 29, 2021

(65) Prior Publication Data
US 2023/0071453 A1 Mar. 9, 2023

(30) Foreign Application Priority Data

Jan. 21, 2020 (CN) .......................... 202010075025.3

(51) Int. Cl.
G06Q 30/00 (2023.01)
G06Q 30/0251 (2023.01)
G06Q 30/0241 (2023.01)

(52) U.S. Cl.
CPC ..... *G06Q 30/0267* (2013.01); *G06Q 30/0271* (2013.01); *G06Q 30/0277* (2013.01)

(58) Field of Classification Search
None
See application file for complete search history.

(56) References Cited

U.S. PATENT DOCUMENTS 9,754,274 B1 9/2017 Brussin et al.
10,169,778 B1 1/2019 Collin et al.
(Continued)

FOREIGN PATENT DOCUMENTS

CN 101689263 A 3/2010
CN 104008494 A 8/2014
(Continued)

OTHER PUBLICATIONS

Kitts; Attribution of Conversion Events to Multi-channel Media; IEEE Data Mining; pges 881-886; 2010.*
(Continued)

*Primary Examiner* — Radu Andrei
(74) *Attorney, Agent, or Firm* — Slater Matsil, LLP

(57) ABSTRACT

An advertisement attribution method and a device are provided, and relate to the field of electronic devices. When playing a first advertisement, an advertising device broadcasts a wireless signal including an identifier of the advertising device and orientation information that is used to indicate a position and an orientation of the advertising device. A terminal receives the wireless signal, and sends a first advertisement event to a server when determining that the first advertisement played by the advertising device is effectively exposed to a user of the terminal.

20 Claims, 19 Drawing Sheets

(56) References Cited

U.S. PATENT DOCUMENTS

| | | | |
|---|---|---|---|
| 2013/0066705 A1 | 3/2013 | Umeda | |
| 2014/0365311 A1 | 12/2014 | Eulenstein et al. | |
| 2015/0106198 A1 | 4/2015 | Miller et al. | |
| 2015/0356596 A1 | 12/2015 | Hiramatsu | |
| 2016/0027041 A1* | 1/2016 | Zhong | H04L 67/535 |
| | | | 705/14.45 |
| 2016/0034948 A1* | 2/2016 | Zhong | G06Q 30/0246 |
| | | | 705/14.45 |
| 2016/0210656 A1* | 7/2016 | Chittilappilly | G06Q 30/0246 |
| 2017/0091811 A1* | 3/2017 | Saxena | G06Q 30/0277 |
| 2018/0308123 A1* | 10/2018 | Zhong | G06Q 30/0246 |
| 2018/0341983 A1 | 11/2018 | Dean et al. | |
| 2018/0349948 A1 | 12/2018 | Dow et al. | |
| 2020/0021893 A1 | 1/2020 | Muller et al. | |
| 2021/0133797 A1* | 5/2021 | Adibi | H04M 3/42102 |
| 2021/0133798 A1* | 5/2021 | Adibi | G10L 15/1815 |
| 2021/0133799 A1* | 5/2021 | Adibi | G10L 15/1815 |
| 2022/0067777 A1* | 3/2022 | Shkedi | G06Q 30/0242 |

FOREIGN PATENT DOCUMENTS

| | | |
|---|---|---|
| CN | 105451184 A | 3/2016 |
| CN | 105976216 A | 9/2016 |
| CN | 106339908 A | 1/2017 |
| CN | 108269126 A | 7/2018 |
| CN | 108648003 A | 10/2018 |
| CN | 108876428 A | 11/2018 |
| CN | 110020893 A | 7/2019 |
| CN | 110276643 A | 9/2019 |
| CN | 111311314 A | 6/2020 |
| JP | 2013164729 A | 8/2013 |
| JP | 2014157414 A | 8/2014 |

OTHER PUBLICATIONS

Zhao; Revenue-based Attribution Modeling; Group M New York; 23 pages; 2015.*

Baidu, "Clustering platform; Achieve your marketing goals", Contract placement process, https://juping.baidu.com/homepage/process, 2017, 1 page.

Pan, R., "The Analysis of Advertising Marketing Data Based on the Multi-touch Attribution Model", Submitted for the Degree of Master of Applied Statistics, Southeast University, Nanjing, CN, May 2016, 59 pages.

* cited by examiner

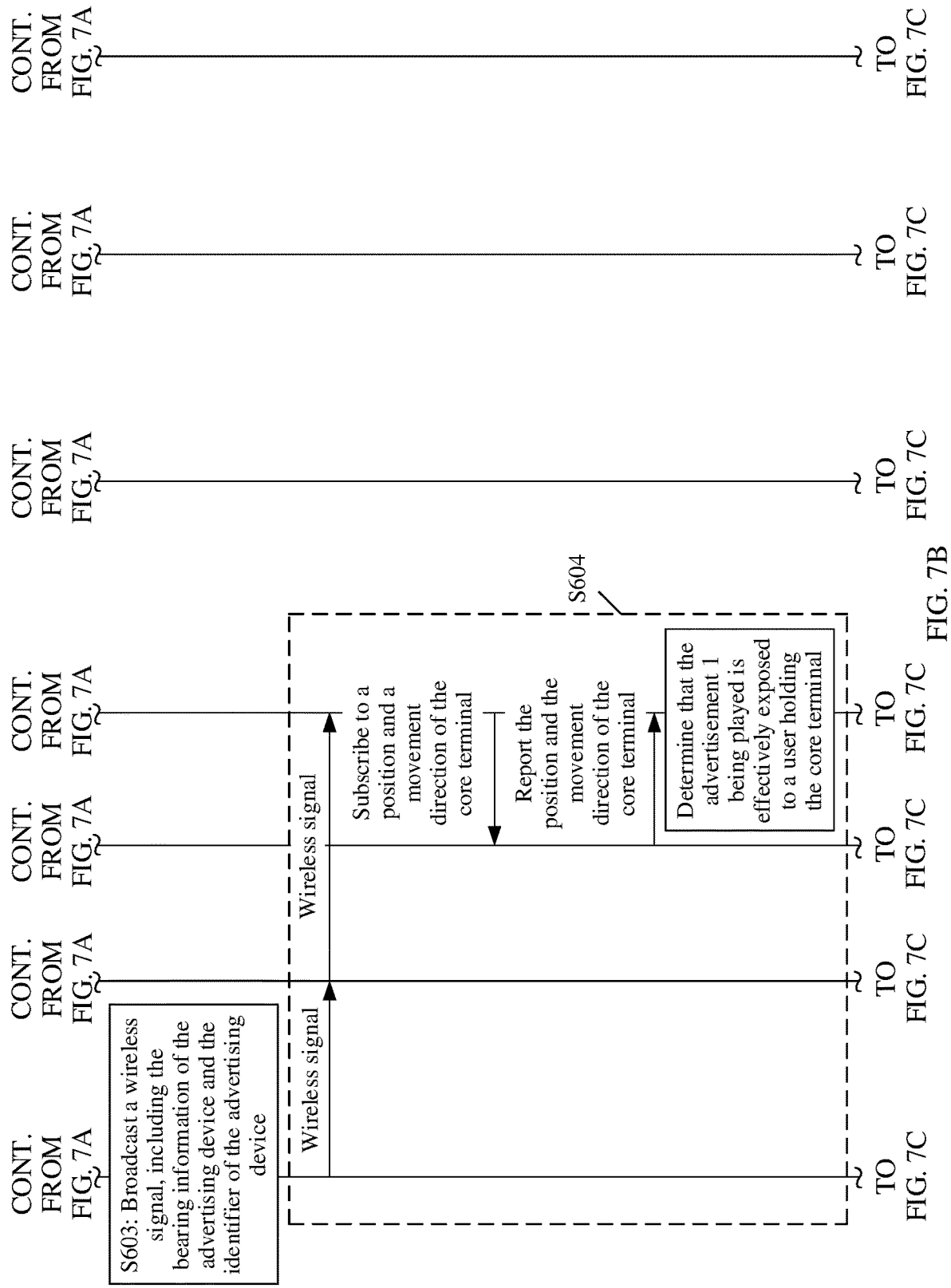

ADVERTISEMENT ATTRIBUTION METHOD AND DEVICE

CROSS-REFERENCE TO RELATED APPLICATIONS

This application is a national stage of International Application No. PCT/CN2021/070453, filed on Jan. 6, 2021, which claims priority to Chinese Patent Application No. 202010075025.3, filed on Jan. 21, 2020. Both of the aforementioned applications are hereby incorporated by reference in their entireties.

TECHNICAL FIELD

This application relates to the field of electronic devices, and in particular, to an advertisement attribution method and a device.

BACKGROUND

Advertisement attribution analysis is the main means of advertisement promotion effect evaluation. A brand advertiser may optimize a brand advertisement placement policy based on an advertisement attribution analysis result, for example, increase a placement volume or change an advertisement play device.

Currently, an advertisement play device may include a terminal such as a television (television, TV) or an internet device (such as a mobile phone or a tablet computer), an advertising device (such as an electronic billboard), or the like. Therefore, advertisement attribution analysis should comprehensively consider an advertisement played by each advertisement play device, in other words, cross-device advertisement attribution analysis should be performed.

However, because a propagation mode of the advertisement played by the advertising device is unidirectional propagation and does not support user interaction, the advertisement cannot be associated with user behavior (for example, paying attention to the advertisement or placing an order). Consequently, there is no way to know which users pay attention to these advertisements, or to know how many users experience behavior conversion because they pay attention to these advertisements. In other words, because the advertisement played by the advertising device cannot be associated with a user, the advertisement cannot participate in advertisement attribution analysis. Consequently, the advertising device cannot implement cross-device advertisement attribution analysis with another advertisement play device (for example, the foregoing terminal).

SUMMARY

Embodiments of this application provide an advertisement attribution method and a device, to resolve a problem that an advertising device and a terminal cannot implement cross-device advertisement attribution analysis.

To resolve the foregoing problem, the following technical solutions are used in this application:

According to a first aspect, an embodiment of this application provides an advertisement attribution method. The method may include: An advertising device plays a first advertisement, and broadcasts a wireless signal. The wireless signal may include an identifier of the advertising device and orientation information of the advertising device, and the orientation information is used to indicate a position and an orientation of the advertising device. A first terminal receives the wireless signal, determines, based on the orientation information in the wireless signal, a position and a movement direction of the first terminal, and preset exposure duration, whether the first advertisement played by the advertising device is effectively exposed to a user of the first terminal, and sends a first advertisement event to a server after determining that the first advertisement is effectively exposed. The first advertisement event includes the identifier of the advertising device and a unified identity, and the unified identity corresponds to the user of the first terminal. When playing a second advertisement, the first terminal sends a second advertisement event to the server. The second advertisement event includes a first advertisement slot identifier and the unified identity, and the first advertisement slot identifier includes information used to identify the first terminal. The server receives the first advertisement event, and receives the second advertisement event. The server receives a conversion event from the first terminal. The conversion event includes the unified identity and a first tracking parameter. The server determines an advertising campaign (campaign) of the first advertisement corresponding to the first advertisement event, and determines an advertising campaign of the second advertisement corresponding to the second advertisement event. The server determines, based on the unified identity and the first tracking parameter in the conversion event, that the advertising campaign of the first advertisement corresponding to the first advertisement event is the same as an advertising campaign indicated by the first tracking parameter and the advertising campaign of the second advertisement corresponding to the second advertisement event is the same as the advertising campaign indicated by the first tracking parameter, and determines that the first advertisement event and the second advertisement event are related to the conversion event. The server determines, based on the first advertisement event and the second advertisement event, a degree of contribution of the first advertisement played by the advertising device to user behavior conversion and a degree of contribution of the second advertisement played by the first terminal to the user behavior conversion.

According to the foregoing technical solution, the advertising device broadcasts a wireless signal, so that a surrounding personal device of the user, for example, the first terminal, can detect the wireless signal. In addition, after determining, based on the wireless signal, that the user pays attention to an advertisement played by the advertising device, the first terminal reports an advertisement event to the server, to indicate that the advertisement played by the advertising device is effectively exposed to the user. The advertisement event carries the unified identity associated with the user, so that the advertisement played by the advertising device can also be associated with the user, and the advertisement played by the advertising device can participate in advertisement attribution analysis. This implements advertisement attribution analysis of the advertising device. The first terminal also adds the unified identity when reporting the advertisement event to the server. Therefore, after the user behavior conversion occurs, the server may determine, based on the unified identity, an advertisement event of an advertisement played by each device (for example, the advertising device and a core terminal), so as to determine a degree of contribution of the advertisement played by each device to the user behavior conversion. This implements cross-device advertisement attribution analysis between the advertising device and a personal device of the user.

In a possible implementation, the first advertisement event further includes a second tracking parameter, the second advertisement event further includes the first tracking parameter, and the second tracking parameter is added by the advertising device to the wireless signal and sent to the first terminal. That the server determines an advertising campaign campaign of the first advertisement corresponding to the first advertisement event, and determines an advertising campaign of the second advertisement corresponding to the second advertisement event includes: The server determines the advertising campaign of the first advertisement based on the second tracking parameter in the first advertisement event. The server determines the advertising campaign of the second advertisement based on the first tracking parameter in the second advertisement event.

In another possible implementation, the server stores a correspondence between an advertisement and an advertising campaign. That the server determines an advertising campaign campaign of the first advertisement corresponding to the first advertisement event, and determines an advertising campaign of the second advertisement corresponding to the second advertisement event includes: The server determines the advertising campaign of the first advertisement based on the correspondence and the first advertisement corresponding to the first advertisement event. The server determines the advertising campaign of the second advertisement based on the correspondence and the second advertisement corresponding to the second advertisement event.

In another possible implementation, the method may further include: The first terminal sends the conversion event to the server when receiving a conversion operation performed by the user on the second advertisement.

In another possible implementation, the unified identity is pre-configured in the first terminal.

In another possible implementation, before the first terminal sends the first advertisement event to the server, the method may further include: The first terminal generates the unified identity.

In another possible implementation, before the server receives the conversion event from the first terminal, the method may further include: The first terminal sends the unified identity to a second terminal. The second terminal receives the unified identity. The second terminal plays a third advertisement, and sends a third advertisement event to the server. The third advertisement event includes a second advertisement slot identifier and the unified identity, and the second advertisement slot identifier includes information used to identify the second terminal. The server receives the third advertisement event. In this way, after receiving the conversion event, the server may determine an advertising campaign of the third advertisement corresponding to the third advertisement event; and determine, based on the unified identity and the first tracking parameter in the conversion event, that the advertising campaign of the third advertisement corresponding to the third advertisement event is the same as the advertising campaign indicated by the first tracking parameter, determine that the third advertisement event is related to the conversion event, and determine, based on the third advertisement event, a degree of contribution of the third advertisement played by the second terminal to the user behavior conversion. The first terminal sends the unified identity corresponding to the user to the second terminal, so that the second terminal can participate in advertisement attribution analysis based on the unified identity. This implements cross-device advertisement attribution analysis between another terminal of the user and the advertising device.

In another possible implementation, the third advertisement event further includes a third tracking parameter. That the server determines an advertising campaign of the third advertisement corresponding to the third advertisement event includes: The server determines the advertising campaign of the third advertisement based on the third tracking parameter in the third advertisement event.

In another possible implementation, that the server determines an advertising campaign of the third advertisement corresponding to the third advertisement event includes: The server determines the advertising campaign of the third advertisement based on the correspondence and the third advertisement corresponding to the third advertisement event.

In another possible implementation, that the first terminal sends the unified identity to a second terminal may include: The first terminal sends the unified identity to the second terminal through a relay device.

In another possible implementation, that the first terminal determines, based on the orientation information in the wireless signal, a position and a movement direction of the first terminal, and preset exposure duration, that the first advertisement played by the advertising device is effectively exposed to a user of the first terminal may include: The first terminal determines, based on the orientation information, and the position and the movement direction of the first terminal, that an orientation of the first terminal relative to the advertising device meets a preset condition. The first terminal determines duration in which the first advertisement played by the advertising device is exposed to the user of the first terminal. When determining that the exposure duration is greater than the preset exposure duration, the first terminal determines that the first advertisement played by the advertising device is effectively exposed to the user of the first terminal. That an orientation of the first terminal relative to the advertising device meets a preset condition includes: a distance between the first terminal and the advertising device is within a preset distance range, the first terminal is located on a side of the orientation of the advertising device, and an included angle between the movement direction of the first terminal and the orientation of the advertising device is within a preset included angle range.

In another possible implementation, that the first terminal generates the unified identity may include: The first terminal generates the unified identity when determining to establish a trusted connection to the second terminal.

In another possible implementation, that the first terminal generates the unified identity may include: The first terminal generates the unified identity when determining to establish a trusted connection to the relay device.

In another possible implementation, after the server receives the first advertisement event from the first terminal, the method may further include: The server updates, based on the first advertisement event, a historical preference of the user associated with the unified identity. An updated historical preference indicates that the user is interested in the first advertisement. Alternatively, when the server does not store a historical preference of the user corresponding to the unified identity, the server may generate, based on the first advertisement event, the historical preference of the user corresponding to the unified identity. The first advertisement event is used to indicate that the advertisement played by the advertising device is effectively exposed to the user. In this way, the server may add, to the historical preference of the user based on the first advertisement event that carries the unified identity, an advertisement that the user pays attention to on the advertising device, so that the advertisement played by the advertising device can also be associated with the user.

In another possible implementation, before the first terminal plays the second advertisement, the method may further include: The first terminal sends a first advertisement request to the server. The first advertisement request includes the unified identity and the first advertisement slot identifier, and is used to request an advertisement resource. The server receives the first advertisement request, and obtains, based on the first advertisement request, an updated historical preference corresponding to the unified identity. The server sends a first advertisement response to the first terminal based on the updated historical preference. The first terminal receives the first advertisement response from the server. The first advertisement response includes an advertisement resource of the second advertisement. The advertising campaign of the second advertisement is the same as the advertising campaign of the first advertisement. When the first terminal requests an advertisement resource, the unified identity is added, so that the server can return, to the first terminal based on the unified identity, an advertisement having a same advertising campaign as an advertisement played by the advertising device. This implements cross-device advertisement multi-screen linkage between the advertising device and a personal device of the user.

In another possible implementation, before the second terminal plays the third advertisement, the method may further include: The second terminal sends a second advertisement request to the server. The second advertisement request includes the unified identity and the second advertisement slot identifier, and is used to request an advertisement resource. The server obtains, based on the second advertisement request, an updated historical preference corresponding to the unified identity. The server sends a second advertisement response to the second terminal based on the updated historical preference, and the second terminal receives the second advertisement response from the server. The second advertisement response includes an advertisement resource of the third advertisement. The advertising campaign of the third advertisement is the same as the advertising campaign of the first advertisement. When the second terminal requests an advertisement resource, the unified identity is added, so that the server can return, to the second terminal based on the unified identity, an advertisement having a same advertising campaign as an advertisement played by the advertising device. This implements cross-device advertisement multi-screen linkage between the advertising device and a personal device of the user.

According to a second aspect, an embodiment of this application provides an advertisement attribution method. The method may include: A first terminal receives a wireless signal that is broadcast by an advertising device. The wireless signal includes an identifier of the advertising device and orientation information of the advertising device, and the orientation information is used to indicate a position and an orientation of the advertising device. The first terminal determines, based on the orientation information in the wireless signal, a position and a movement direction of the first terminal, and effective exposure duration, that a first advertisement played by the advertising device is effectively exposed to a user of the first terminal. The first terminal sends a first advertisement event to a server. The first advertisement event includes the identifier of the advertising device and a unified identity, the unified identity corresponds to the user of the first terminal, and the first advertisement event is used by the server to determine, after the server receives a conversion event related to the first advertisement event, a degree of contribution of the first advertisement played by the advertising device to user behavior conversion. The first terminal plays a second advertisement. The second advertisement and the first advertisement have a same advertising campaign. The first terminal sends a second advertisement event to the server. The second advertisement event includes a first advertisement slot identifier and the unified identity, the first advertisement slot identifier includes information used to identify the first terminal, and the second advertisement event is used by the server to determine, after the server receives the conversion event related to the second advertisement event, a degree of contribution of the second advertisement played by the first terminal to the user behavior conversion.

According to the foregoing technical solution, after receiving the wireless signal that is broadcast by the advertising device and determining, based on the wireless signal, that the user pays attention to an advertisement played by the advertising device, the first terminal reports an advertisement event to the server, to indicate that the advertisement played by the advertising device is effectively exposed to the user. The advertisement event carries the unified identity associated with the user, so that the advertisement played by the advertising device can also be associated with the user, and the advertisement played by the advertising device can participate in advertisement attribution analysis. This implements advertisement attribution analysis of the advertising device. The first terminal also adds the unified identity when reporting the advertisement event to the server. Therefore, after the user behavior conversion occurs, the server may determine, based on the unified identity, an advertisement event of an advertisement played by each device (for example, the advertising device and a core terminal), so as to determine a degree of contribution of the advertisement played by each device to the user behavior conversion. This implements cross-device advertisement attribution analysis between the advertising device and a personal device of the user.

In a possible implementation, the wireless signal further includes a second tracking parameter, the first advertisement event further includes the second tracking parameter, and the second tracking parameter in the first advertisement event is used by the server to determine that the first advertisement event is related to the conversion event; and the second advertisement event further includes a first tracking parameter, and the first tracking parameter in the second advertisement event is used by the server to determine that the second advertisement event is related to the conversion event.

In another possible implementation, the method may further include: The first terminal sends the conversion event to the server when receiving a conversion operation performed by the user on the second advertisement. The conversion event includes the unified identity and the first tracking parameter, and is used by the server to determine an advertisement event related to the conversion event.

In another possible implementation, the unified identity is pre-configured in the first terminal.

In another possible implementation, before the first terminal sends the first advertisement event to the server, the method may further include: The first terminal generates the unified identity.

In another possible implementation, the method may further include: The first terminal sends the unified identity to a second terminal, so that the second terminal sends a third advertisement event that carries the unified identity to the server when playing a third advertisement. An advertising campaign of the third advertisement is the same as the advertising campaign of the first advertisement, so that the server determines, based on the third advertisement event after receiving the conversion event related to the third advertisement event, a degree of contribution of the third advertisement played by the second terminal to the user behavior conversion. The first terminal sends the unified identity corresponding to the user to the second terminal, so that the second terminal can participate in advertisement attribution analysis based on the unified identity. This implements cross-device advertisement attribution analysis between another terminal of the user and the advertising device.

In another possible implementation, that the first terminal sends the unified identity to a second terminal may include: The first terminal sends the unified identity to the second terminal through a relay device.

In another possible implementation, that the first terminal generates the unified identity may include: The first terminal generates the unified identity when determining to establish a trusted connection to the second terminal.

In another possible implementation, that the first terminal generates the unified identity may include: The first terminal generates the unified identity when determining to establish a trusted connection to the relay device.

In another possible implementation, that the first terminal determines, based on the orientation information in the wireless signal, a position and a movement direction of the first terminal, and preset exposure duration, that a first advertisement played by the advertising device is effectively exposed to a user of the first terminal may include: The first terminal determines, based on the orientation information, and the position and the movement direction of the first terminal, that an orientation of the first terminal relative to the advertising device meets a preset condition. The first terminal determines duration in which the first advertisement played by the advertising device is exposed to the user of the first terminal. When determining that the exposure duration is greater than the preset exposure duration, the first terminal determines that the first advertisement played by the advertising device is effectively exposed to the user of the first terminal. That an orientation of the first terminal relative to the advertising device meets a preset condition includes: a distance between the first terminal and the advertising device is within a preset distance range, the first terminal is located on a side of the orientation of the advertising device, and an included angle between the movement direction of the first terminal and the orientation of the advertising device is within a preset included angle range.

In another possible implementation, before the first terminal plays the second advertisement, the method may further include: The first terminal sends a first advertisement request to the server. The first advertisement request includes the unified identity and the first advertisement slot identifier, and is used to request an advertisement resource. The first terminal receives a first advertisement response from the server. The first advertisement response includes an advertisement resource of the second advertisement. When the first terminal requests an advertisement resource, the unified identity is added, so that the server can return, to the first terminal based on the unified identity, an advertisement having a same advertising campaign as an advertisement played by the advertising device. This implements cross-device advertisement multi-screen linkage between the advertising device and a personal device of the user.

According to a third aspect, an embodiment of this application provides an advertisement attribution method. The method may include: A second terminal receives a unified identity from a first terminal. The unified identity corresponds to a user of the first terminal. The second terminal plays a third advertisement. The third advertisement and a first advertisement have a same advertising campaign, and the first advertisement is an advertisement played by an advertising device. The second terminal sends a third advertisement event to a server. The third advertisement event includes a second advertisement slot identifier and the unified identity, the second advertisement slot identifier includes information used to identify the second terminal, and the third advertisement event is used by the server to determine, after the server receives a conversion event related to the third advertisement event, a degree of contribution of the third advertisement played by the second terminal to user behavior conversion.

According to the foregoing technical solution, when reporting an advertisement event to the server, the second terminal adds the unified identity corresponding to the user of the first terminal. After the user behavior conversion occurs, the server may determine, based on the unified identity, an advertisement event of an advertisement played by the second terminal, so as to determine a degree of contribution of the advertisement played by the second terminal to the user behavior conversion. This implements cross-device advertisement attribution analysis.

In a possible implementation, the third advertisement event further includes a third tracking parameter, and the third tracking parameter in the third advertisement event is used by the server to determine that the third advertisement event is related to the conversion event.

In another possible implementation, that a second terminal receives a unified identity from a first terminal may include: The second terminal receives the unified identity sent by the first terminal through a relay device.

In another possible implementation, before the second terminal plays the third advertisement, the method may further include: The second terminal sends a second advertisement request to the server. The second advertisement request includes the unified identity and the second advertisement slot identifier, and is used to request an advertisement resource. The second terminal receives a second advertisement response from the server. The second advertisement response includes an advertisement resource of the third advertisement. When the second terminal requests an advertisement resource, the unified identity is added, so that the server can return, to the second terminal based on the unified identity, an advertisement having a same advertising campaign as an advertisement played by the advertising device. This implements cross-device advertisement multi-screen linkage between the advertising device and a personal device of the user.

According to a fourth aspect, an embodiment of this application provides an advertisement attribution method. The method may include: A server receives a first advertisement event from a first terminal. The first advertisement event includes an identifier of an advertising device and a unified identity, and the unified identity corresponds to a user of the first terminal. The server receives a second advertisement event from the first terminal. The second advertisement event includes a first advertisement slot identifier and the unified identity, and the first advertisement slot identifier includes information used to identify the first terminal. The server receives a conversion event from the first terminal. The conversion event includes the unified identity and a first tracking parameter. The server determines an advertising campaign of a first advertisement corresponding to the first advertisement event, and determines an advertising campaign of a second advertisement corresponding to the second advertisement event. The first advertisement is played by the advertising device, and the second advertisement is played by the first terminal. The server determines, based on the unified identity and the first tracking parameter in the conversion event, that the advertising campaign of the first advertisement corresponding to the first advertisement event is the same as an advertising campaign indicated by the first tracking parameter and the advertising campaign of the second advertisement corresponding to the second advertisement event is the same as the advertising campaign indicated by the first tracking parameter, and determines that the first advertisement event and the second advertisement event are related to the conversion event. The server determines, based on the first advertisement event and the second advertisement event, a degree of contribution of the first advertisement played by the advertising device to user behavior conversion and a degree of contribution of the second advertisement played by the first terminal to the user behavior conversion.

According to the foregoing technical solution, the server receives, from the first terminal, an advertisement event used to indicate that an advertisement played by the advertising device is effectively exposed to the user. The advertisement event carries the unified identity associated with the user, so that the advertisement played by the advertising device can also be associated with the user, and the advertisement played by the advertising device can participate in advertisement attribution analysis. This implements advertisement attribution analysis of the advertising device. The server receives an advertisement event that is reported by the first terminal and that is used to indicate that an advertisement played by the first terminal is exposed to the user or the user clicks an advertisement. The advertisement event also carries the unified identity. Therefore, after the user behavior conversion occurs, the server may determine, based on the unified identity, an advertisement event of an advertisement played by each device (for example, the advertising device and a core terminal), so as to determine a degree of contribution of the advertisement played by each device to the user behavior conversion. This implements cross-device advertisement attribution analysis between the advertising device and a personal device of the user.

In a possible implementation, the first advertisement event further includes a second tracking parameter, the second advertisement event further includes the first tracking parameter, and the second tracking parameter is added by the advertising device to a wireless signal and sent to the first terminal. That the server determines an advertising campaign campaign of a first advertisement corresponding to the first advertisement event, and determines an advertising campaign of a second advertisement corresponding to the second advertisement event includes: The server determines the advertising campaign of the first advertisement based on the second tracking parameter in the first advertisement event. The server determines the advertising campaign of the second advertisement based on the first tracking parameter in the second advertisement event.

In another possible implementation, the server stores a correspondence between an advertisement and an advertising campaign. That the server determines an advertising campaign campaign of a first advertisement corresponding to the first advertisement event, and determines an advertising campaign of a second advertisement corresponding to the second advertisement event includes: The server determines the advertising campaign of the first advertisement based on the correspondence and the first advertisement corresponding to the first advertisement event. The server determines the advertising campaign of the second advertisement based on the correspondence and the second advertisement corresponding to the second advertisement event.

In another possible implementation, before the server receives the conversion event from the first terminal, the method may include: The server receives a third advertisement event from a second terminal. The third advertisement event includes a second advertisement slot identifier and the unified identity, and the second advertisement slot identifier includes information used to identify the second terminal. In this way, after receiving the conversion event, the server may determine an advertising campaign of a third advertisement corresponding to the third advertisement event. The third advertisement is played by the second device. The server determines, based on the unified identity and the first tracking parameter in the conversion event, that the advertising campaign of the third advertisement corresponding to the third advertisement event is the same as the advertising campaign indicated by the first tracking parameter, determines that the third advertisement event is related to the conversion event, and determines, based on the third advertisement event, a degree of contribution of the third advertisement played by the second terminal to the user behavior conversion. An advertisement event received by the server from the second terminal also carries the unified identity corresponding to the user of the first terminal. After the user behavior conversion occurs, the server may determine, based on the unified identity, an advertisement event of an advertisement played by the second terminal, so as to determine a degree of contribution of the advertisement played by the second terminal to the user behavior conversion. This implements cross-device advertisement attribution analysis.

In another possible implementation, the third advertisement event further includes a third tracking parameter. That the server determines an advertising campaign of a third advertisement corresponding to the third advertisement event includes: The server determines the advertising campaign of the third advertisement based on the third tracking parameter in the third advertisement event.

In another possible implementation, that the server determines an advertising campaign of a third advertisement corresponding to the third advertisement event includes: The server determines the advertising campaign of the third advertisement based on the correspondence and the third advertisement corresponding to the third advertisement event.

In another possible implementation, after the server receives the first advertisement event from the first terminal, the method may further include: The server updates, based on the first advertisement event, a historical preference of the user associated with the unified identity. An updated historical preference indicates that the user is interested in the first advertisement. The first advertisement event is used to indicate that the advertisement played by the advertising device is effectively exposed to the user. In this way, the server may add, to the historical preference of the user based on the first advertisement event that carries the unified identity, an advertisement that the user pays attention to on the advertising device, so that the advertisement played by the advertising device can also be associated with the user.

In another possible implementation, before the server receives the second advertisement event from the first terminal, the method may further include: The server receives a first advertisement request from the first terminal. The first advertisement request includes the unified identity and the first advertisement slot identifier, and is used to request an advertisement resource. The server obtains, based on the first advertisement request, the updated historical preference corresponding to the unified identity. The server sends a first advertisement response to the first terminal based on the updated historical preference. The first advertisement response includes an advertisement resource of the second advertisement. When the first terminal requests an advertisement resource, the server returns, to the first terminal based on the added unified identity, an advertisement having a same advertising campaign as an advertisement played by the advertising device. This implements cross-device advertisement multi-screen linkage between the advertising device and a personal device of the user.

In another possible implementation, the method may further include: The server receives a second advertisement request from the second terminal. The second advertisement request includes the unified identity and the second advertisement slot identifier, and is used to request an advertisement resource. The server obtains, based on the second advertisement request, the updated historical preference corresponding to the unified identity. The server sends a second advertisement response to the second terminal based on the updated historical preference. The second advertisement response includes an advertisement resource of the third advertisement. When the second terminal requests an advertisement resource, the server returns, to the second terminal based on the added unified identity, an advertisement having a same advertising campaign as an advertisement played by the advertising device. This implements cross-device advertisement multi-screen linkage between the advertising device and a personal device of the user.

According to a fifth aspect, an embodiment of this application provides an advertisement attribution method. The method may include: An advertising device plays a first advertisement. The advertising device broadcasts a wireless signal. The wireless signal includes an identifier of the advertising device and orientation information of the advertising device, the orientation information is used to indicate a position and an orientation of the advertising device, the wireless signal is used by a first terminal to determine whether the first advertisement played by the advertising device is effectively exposed to a user, and send an advertisement event including a unified identity to a server when the first terminal determines that the first advertisement is effectively exposed, and the unified identity corresponds to the user of the first terminal, and is used by the server to determine, after the server receives a conversion event related to the advertisement event, a degree of contribution of the first advertisement played by the advertising device to user behavior conversion.

According to the foregoing technical solution, when playing an advertisement, the advertising device broadcasts a wireless signal, so that a device around the advertising device, for example, the first terminal, can receive the wireless signal that is broadcast by the advertising device, so as to determine, based on the wireless signal, that the user pays attention to the advertisement played by the advertising device, and then report an advertisement event to the server, to indicate that the advertisement played by the advertising device is effectively exposed to the user. The advertisement event carries the unified identity associated with the user, so that the advertisement played by the advertising device can also be associated with the user, and the advertisement played by the advertising device can participate in advertisement attribution analysis. This implements advertisement attribution analysis of the advertising device, and implements cross-device advertisement attribution analysis between the advertising device and a personal device of the user.

In a possible implementation, the wireless signal further includes a second tracking parameter, and the advertisement event further includes the second tracking parameter, and is used by the server to determine that the advertisement event is related to the conversion event.

According to a sixth aspect, an embodiment of this application provides a terminal. The terminal may be a first terminal. The first terminal includes one or more processors, a memory, a display, and a communications module. The memory is configured to store one or more programs, and the one or more processors are configured to run the one or more programs, so that the first terminal performs the method according to any one of the second aspect and the possible implementations of the second aspect.

According to a seventh aspect, an embodiment of this application provides a terminal. The terminal may be a second terminal. The second terminal includes one or more processors, a memory, a display, and a communications module. The memory is configured to store one or more programs, and the one or more processors are configured to run the one or more programs, so that the second terminal performs the method according to any one of the third aspect and the possible implementations of the third aspect.

According to an eighth aspect, an embodiment of this application provides a computer-readable storage medium, including computer instructions. When the computer instructions are run on a terminal such as the foregoing first terminal, the first terminal is enabled to perform the method according to any one of the second aspect and the possible implementations of the second aspect.

According to a ninth aspect, an embodiment of this application provides a computer-readable storage medium, including computer instructions. When the computer instructions are run on a terminal such as the foregoing second terminal, the second terminal is enabled to perform the method according to any one of the third aspect and the possible implementations of the third aspect.

According to a tenth aspect, an embodiment of this application provides a computer program product. When the computer program product runs on a computer, the computer is enabled to perform the method according to the second aspect or the third aspect.

According to an eleventh aspect, an embodiment of this application provides a server. The server may include one or more processors, a memory, and a communications module. The memory is configured to store one or more programs, and the one or more processors are configured to run the one or more programs, so that the server performs the method according to any one of the fourth aspect and the possible implementations of the fourth aspect.

According to a twelfth aspect, an embodiment of this application provides a computer-readable storage medium, including computer instructions. When the computer instructions are run on a server, the server is enabled to perform the method according to any one of the fourth aspect and the possible implementations of the fourth aspect.

According to a thirteenth aspect, an embodiment of this application provides a computer program product. When the computer program product runs on a computer, the computer is enabled to perform the method according to the fourth aspect.

According to a fourteenth aspect, an embodiment of this application provides an advertising device. The advertising device may include one or more processors, a memory, a display, a wireless communications module, and a mobile communications module. The memory is configured to store one or more programs, and the one or more processors are configured to run the one or more programs, so that the advertising device performs the method according to the fifth aspect.

According to a fifteenth aspect, an embodiment of this application provides a computer-readable storage medium, including computer instructions. When the computer instructions are run on an advertising device, the advertising device is enabled to perform the method according to the fifth aspect.

According to a sixteenth aspect, an embodiment of this application provides a computer program product. When the computer program product runs on a computer, the computer is enabled to perform the method according to the fifth aspect.

According to a seventeenth aspect, an embodiment of this application provides an advertising system. The advertising system may include an advertising device, a first terminal, and a server. The advertising device is configured to: play a first advertisement, and broadcast a wireless signal. The wireless signal includes an identifier of the advertising device and orientation information of the advertising device, and the orientation information is used to indicate a position and an orientation of the advertising device. The first terminal is configured to: receive the wireless signal, determine, based on the orientation information in the wireless signal, a position and a movement direction of the first terminal, and preset exposure duration, that the first advertisement played by the advertising device is effectively exposed to a user of the first terminal, send a first advertisement event to the server, where the first advertisement event includes the identifier of the advertising device and a unified identity, and the unified identity corresponds to the user of the first terminal; and play a second advertisement, and send a second advertisement event to the server, where the second advertisement event includes a first advertisement slot identifier and the unified identity, and the first advertisement slot identifier includes information used to identify the first terminal. The server is configured to: receive the first advertisement event, and receive the second advertisement event. The server is further configured to: receive a conversion event from the first terminal, where the conversion event includes the unified identity and a first tracking parameter; determine an advertising campaign campaign of the first advertisement corresponding to the first advertisement event, and determine an advertising campaign of the second advertisement corresponding to the second advertisement event; determine, based on the unified identity and the first tracking parameter in the conversion event, that the advertising campaign of the first advertisement corresponding to the first advertisement event is the same as an advertising campaign indicated by the first tracking parameter and the advertising campaign of the second advertisement corresponding to the second advertisement event is the same as the advertising campaign indicated by the first tracking parameter, and determine that the first advertisement event and the second advertisement event are related to the conversion event; and determine, based on the first advertisement event and the second advertisement event, a degree of contribution of the first advertisement played by the advertising device to user behavior conversion and a degree of contribution of the second advertisement played by the first terminal to the user behavior conversion.

In a possible implementation, the first advertisement event further includes a second tracking parameter, the second advertisement event further includes the first tracking parameter, and the second tracking parameter is added by the advertising device to a wireless signal and sent to the first terminal. The server is specifically configured to determine the advertising campaign of the first advertisement based on the second tracking parameter in the first advertisement event. The server determines the advertising campaign of the second advertisement based on the first tracking parameter in the second advertisement event.

In another possible implementation, the server stores a correspondence between an advertisement and an advertising campaign. The server is specifically configured to determine the advertising campaign of the first advertisement based on the correspondence and the first advertisement corresponding to the first advertisement event. The server determines the advertising campaign of the second advertisement based on the correspondence and the second advertisement corresponding to the second advertisement event.

In another possible implementation, the first terminal is further configured to send the conversion event to the server when receiving a conversion operation performed by the user on the second advertisement.

In another possible implementation, the unified identity is pre-configured in the first terminal.

In another possible implementation, the first terminal is further configured to generate the unified identity.

In another possible implementation, the advertising system may further include a second terminal. The first terminal is further configured to send the unified identity to the second terminal. The second terminal is configured to: receive the unified identity, play a third advertisement, and send a third advertisement event to the server. The third advertisement event includes a second advertisement slot identifier and the unified identity, and the second advertisement slot identifier includes information used to identify the second terminal. The server is further configured to: receive the third advertisement event; determine an advertising campaign of the third advertisement corresponding to the third advertisement event; and determine, based on the unified identity and the first tracking parameter in the conversion event, that the advertising campaign of the third advertisement corresponding to the third advertisement event is the same as the advertising campaign indicated by the first tracking parameter, determine that the third advertisement event is related to the conversion event, and determine, based on the third advertisement event, a degree of contribution of the third advertisement played by the second terminal to the user behavior conversion.

In another possible implementation, the third advertisement event further includes a third tracking parameter. The server is specifically configured to determine the advertising campaign of the third advertisement based on the third tracking parameter in the third advertisement event.

In another possible implementation, the server is specifically configured to determine the advertising campaign of the third advertisement based on the correspondence and the third advertisement corresponding to the third advertisement event.

In another possible implementation, the advertising system further includes a relay device. The first terminal is specifically configured to send the unified identity to the second terminal through the relay device.

In another possible implementation, the first terminal is specifically configured to determine, based on the orientation information, and the position and the movement direction of the first terminal, that an orientation of the first terminal relative to the advertising device meets a preset condition. The first terminal determines duration in which the first advertisement played by the advertising device is exposed to the user of the first terminal. When determining that the exposure duration is greater than the preset exposure duration, the first terminal determines that the first advertisement played by the advertising device is effectively exposed to the user of the first terminal. That an orientation of the first terminal relative to the advertising device meets a preset condition includes: a distance between the first terminal and the advertising device is within a preset distance range, the first terminal is located on a side of the orientation of the advertising device, and an included angle between the movement direction of the first terminal and the orientation of the advertising device is within a preset included angle range.

In another possible implementation, the first terminal is specifically configured to generate the unified identity when determining to establish a trusted connection to the second terminal.

In another possible implementation, the first terminal is specifically configured to generate the unified identity when determining to establish a trusted connection to the relay device.

In another possible implementation, the server is further configured to update, based on the first advertisement event, a historical preference of the user associated with the unified identity. An updated historical preference indicates that the user is interested in the first advertisement. Alternatively, when the server does not store a historical preference of the user corresponding to the unified identity, the server is further configured to generate, based on the first advertisement event, the historical preference of the user corresponding to the unified identity. The first advertisement event is used to indicate that the advertisement played by the advertising device is effectively exposed to the user.

In another possible implementation, the first terminal is further configured to send a first advertisement request to the server. The first advertisement request includes the unified identity and the first advertisement slot identifier, and is used to request an advertisement resource. The server is further configured to: receive the first advertisement request; obtain, based on the first advertisement request, an updated historical preference corresponding to the unified identity; and send a first advertisement response to the first terminal based on the updated historical preference. The first terminal is further configured to receive the first advertisement response from the server. The first advertisement response includes an advertisement resource of the second advertisement. The advertising campaign of the second advertisement is the same as the advertising campaign of the first advertisement.

In another possible implementation, the second terminal is further configured to send a second advertisement request to the server. The second advertisement request includes the unified identity and the second advertisement slot identifier, and is used to request an advertisement resource. The server is further configured to: obtain, based on the second advertisement request, the updated historical preference corresponding to the unified identity; and send a second advertisement response to the second terminal based on the updated historical preference. The second terminal is further configured to receive the second advertisement response from the server. The second advertisement response includes an advertisement resource of the third advertisement. The advertising campaign of the third advertisement is the same as the advertising campaign of the first advertisement.

It should be noted that the first terminal in this application may be a core terminal in embodiments, and the second terminal in this application may be a trusted terminal in embodiments.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in embodiments may be combined in any proper manner. Persons skilled in the art understand that an embodiment may be implemented without one or more specific technical features, technical solutions, or beneficial effects in a specific embodiment. In other embodiments, additional technical features and beneficial effects may be further identified in a specific embodiment that does not reflect all embodiments.

BRIEF DESCRIPTION OF THE DRAWINGS

FIG. 6A-1 to FIG. 6A-3 are a schematic flowchart of an advertisement attribution method according to an embodiment of this application;

FIG. 7A to FIG. 7E are a schematic flowchart of another advertisement attribution method according to an embodiment of this application.

DETAILED DESCRIPTION OF ILLUSTRATIVE EMBODIMENTS

Advertisement attribution analysis is the main means for a brand advertiser to perform advertisement promotion effect evaluation. In addition, with development of mobile internet and internet of things (internet of things, IOT) technologies, an advertisement play device includes a terminal such as a TV (or referred to as a smart TV) or an internet device (such as a mobile phone, a tablet computer, or a notebook computer), an advertising device (such as an electronic billboard), or the like. Therefore, advertisement attribution analysis should comprehensively consider an advertisement played by each advertisement play device, in other words, cross-device advertisement attribution analysis should be performed.

However, because the advertisement played by the advertising device (which is referred to as an outdoor advertisement) cannot be associated with a user, the advertisement cannot participate in advertisement attribution analysis. Consequently, the advertising device cannot implement cross-device advertisement attribution analysis with another advertisement play device (for example, the foregoing terminal).

In embodiments of this application, cross-device advertisement attribution may mean: When a plurality of devices play a plurality of advertisements having a same advertising campaign (advertising campaign), after user behavior conversion occurs, a degree of contribution of an advertisement played by each of the plurality of devices to the user behavior conversion may be determined through advertisement attribution analysis. It should be noted that themes of content communicated by advertisements having a same advertising campaign are the same in embodiments. For example, if an advertisement 1, an advertisement 2, and an advertisement 3 have a same advertising campaign, themes of content communicated by the advertisement 1, the advertisement 2, and the advertisement 3 are the same, for example, all are advertisements about a mobile phone brand. A plurality of advertisements (or a series of advertisements) having a same advertising campaign may mean that the plurality of advertisements are associated with each other, or the plurality of advertisements are a same advertisement.

Figure 1:
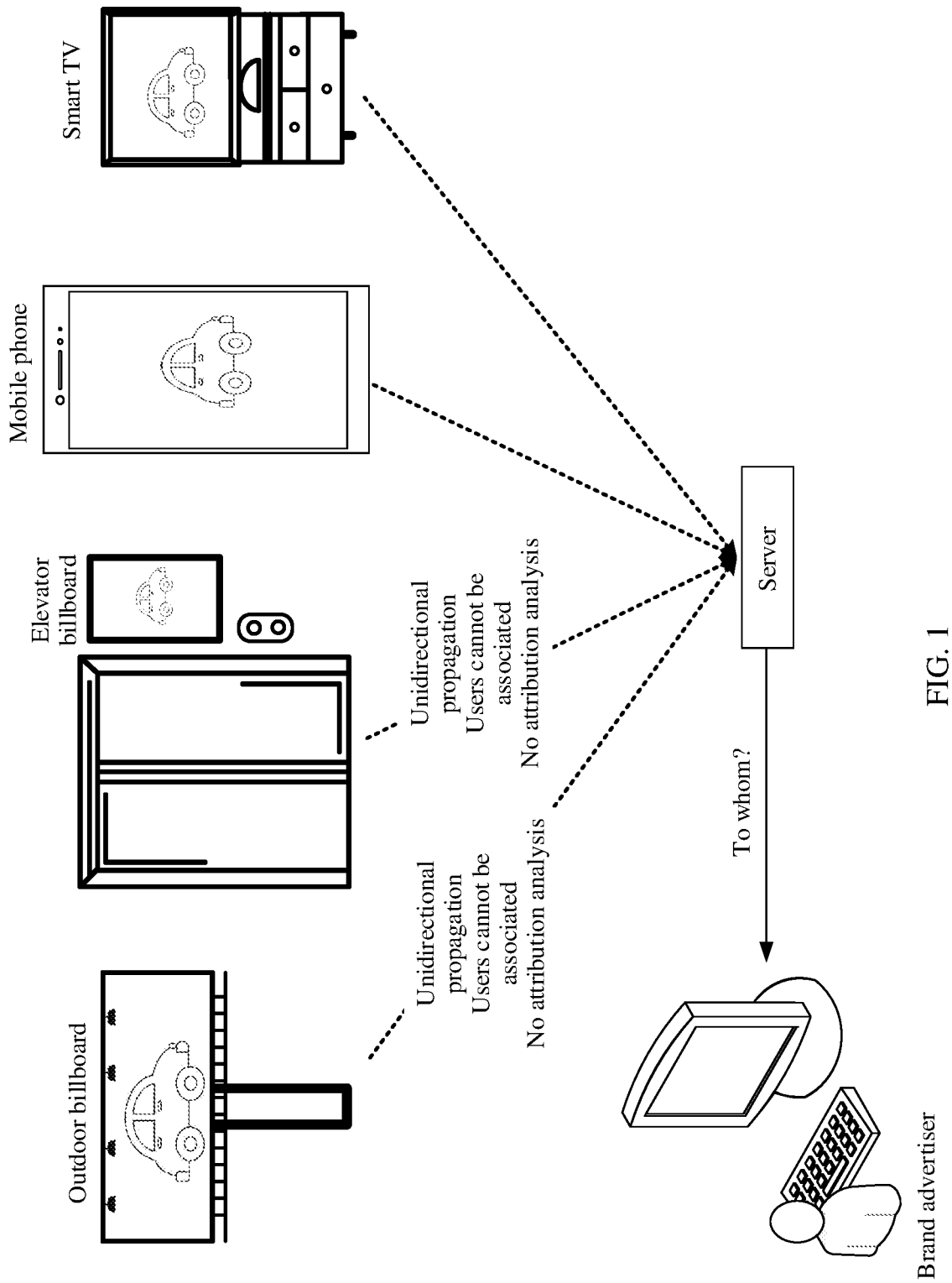
FIG. 1 is a schematic diagram of a cross-device advertisement attribution scenario in the conventional technology.

For example, as shown in FIG. 1, advertising devices are electronic billboards, including an electronic billboard disposed outdoors (which is referred to as an outdoor billboard) and an electronic billboard disposed in an elevator (which is referred to as an elevator billboard). Advertisements of a brand of car are played by the outdoor billboard, the elevator billboard, a mobile phone, and a smart TV. For the advertisements played by the outdoor billboard and the elevator billboard, because propagation modes of the advertisements are unidirectional propagation, the advertisements cannot be associated with users. Consequently, there is no way to know which users pay attention to these advertisements, or to know how many users experience behavior conversion (for example, purchase this brand of car) because they pay attention to these advertisements. In other words, after users purchase this brand of car, the electronic billboard cannot participate in cross-device advertisement attribution analysis, for example, a degree of contribution of the advertisements played by the outdoor billboard and the elevator billboard to the user's purchase of this brand of car cannot be determined. Consequently, a brand advertiser cannot perform value measurement and cannot perform placement optimization.

In the conventional technology, for an advertisement played by an advertising device, a brand advertiser may collect user feedback in a manual offline questionnaire survey manner, for example, whether users pay attention to an advertisement played by an outdoor billboard or an elevator billboard, and advertisements that are played by specific devices and that users watch to experience behavior conversion. Then, a corresponding attribution analysis result is obtained after manual sorting and analysis, for example, a degree of contribution of the advertisement played by the outdoor billboard to user behavior conversion, and a degree of contribution of the advertisement played by the elevator billboard to the user behavior conversion. However, in this manner, only a relatively small amount of user sampling data is collected, and a relatively large deviation exists in accuracy. Consequently, a finally obtained attribution analysis result also has a relatively large deviation.

In addition, in the conventional technology, an advertisement played by an internet device supports advertisement attribution analysis. Currently, the following two solutions may be used for advertisement attribution analysis of the advertisement played by the internet device.

Solution 1: When playing an advertisement, an internet device, for example, a mobile phone, reports an advertisement event that carries an open advertising identifier (open advertising ID, OAID) and a device internet protocol (internet protocol, IP) address of the mobile phone to a server, and reports a conversion event that carries the same OAID and the same device IP address to the server after user behavior conversion occurs, so that the server associates an advertisement conversion link with an advertisement placement link based on the OAID and the device IP address, to determine a degree of contribution of an advertisement placed in each advertisement placement link to the user behavior conversion. This implements advertisement attribution analysis.

Figure 2:
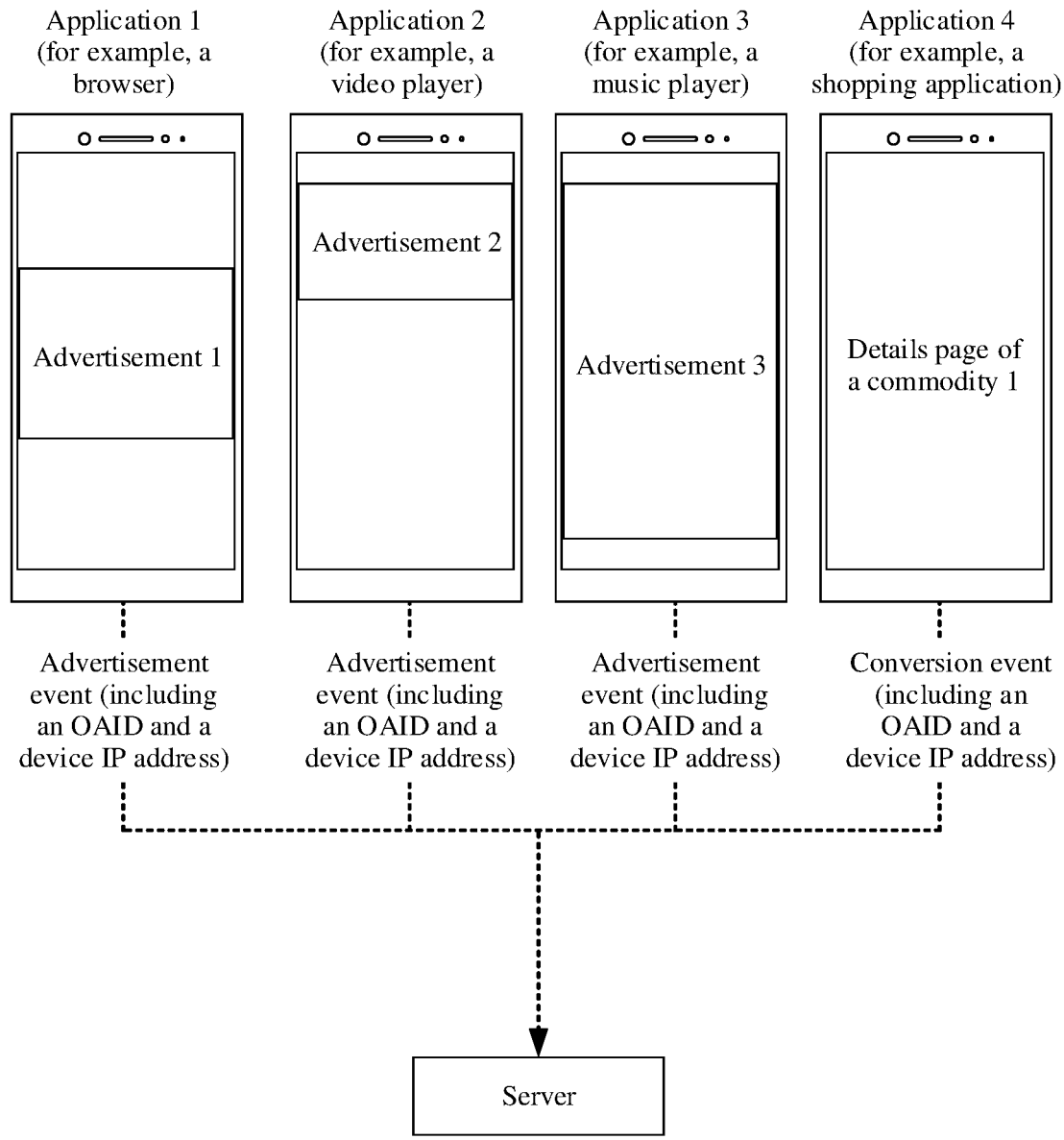
FIG. 2 is a schematic diagram of a single-device advertisement attribution scenario in the conventional technology.

For example, as shown in FIG. 2, an application 1 (such as a browser), an application 2 (such as a video player), and an application 3 (such as a music player) are installed on a mobile phone of a user. These applications each include an advertisement slot for displaying an advertisement. When the user starts these applications, the mobile phone may send an advertisement request to a server, and play a corresponding advertisement in a corresponding advertisement slot based on an advertisement response returned by the server. For example, when the user starts the application 1, the mobile phone plays an advertisement 1 in a corresponding advertisement slot based on an advertisement response of the server. When the user starts the application 2, the mobile phone plays an advertisement 2 in a corresponding advertisement slot based on an advertisement response of the server. When the user starts the application 3, the mobile phone plays an advertisement 3 in a corresponding advertisement slot based on an advertisement response of the server. The advertisement 1, the advertisement 2, and the advertisement 3 have a same advertising campaign. For example, the advertisement 1, the advertisement 2, and the advertisement 3 are advertisements related to a commodity 1.

When the mobile phone separately plays the advertisement 1, the advertisement 2, and the advertisement 3, the mobile phone may report an advertisement event to the server, to indicate that the corresponding advertisement is exposed to the user, the user clicks the advertisement, or the like. The advertisement event carries information such as an OAID and a device IP address of the mobile phone. Then, if user behavior conversion occurs, for example, the mobile phone shown in FIG. 2 includes an application 4 (for example, a shopping application), the user opens a details page of the commodity 1 in the shopping application of the mobile phone. After the user opens the details page of the commodity 1, the mobile phone may report a conversion event to the server. The conversion event includes the information such as the OAID and the device IP address of the mobile phone. In this way, the server may determine an advertisement event of each advertisement placement link based on the OAID and the device IP address that are carried in a conversion event, and perform attribution analysis by using an attribution model, to obtain an advertisement attribution analysis result, in other words, attribute contribution of the current conversion event (for example, opening the details page of the commodity 1) to an application of each advertisement placement link.

However, in the solution 1, the OAID is only effective on a same device, for example, the advertising ID of the foregoing mobile phone cannot be used without the device. Therefore, a degree of contribution of only an advertisement placed in an application in the device to the user behavior conversion can be determined based on the corresponding OAID, to implement advertisement attribution analysis. In other words, the solution 1 cannot be used to implement cross-device advertisement attribution analysis.

Solution 2: A same account is used to log in to applications in a plurality of internet devices such as a mobile phone, a notebook computer, and a tablet computer. Therefore, when displaying an advertisement, the plurality of internet devices report an advertisement event that carries the account to a server, and report a conversion event that also carries the account to the server after user behavior conversion occurs, so that the server can associate an advertisement conversion link with an advertisement placement link based on the account, to determine a degree of contribution of an advertisement placed in each advertisement placement link to the user behavior conversion. This implements advertisement attribution analysis. It may be understood that this solution can implement cross-device advertisement attribution analysis.

Figure 3:
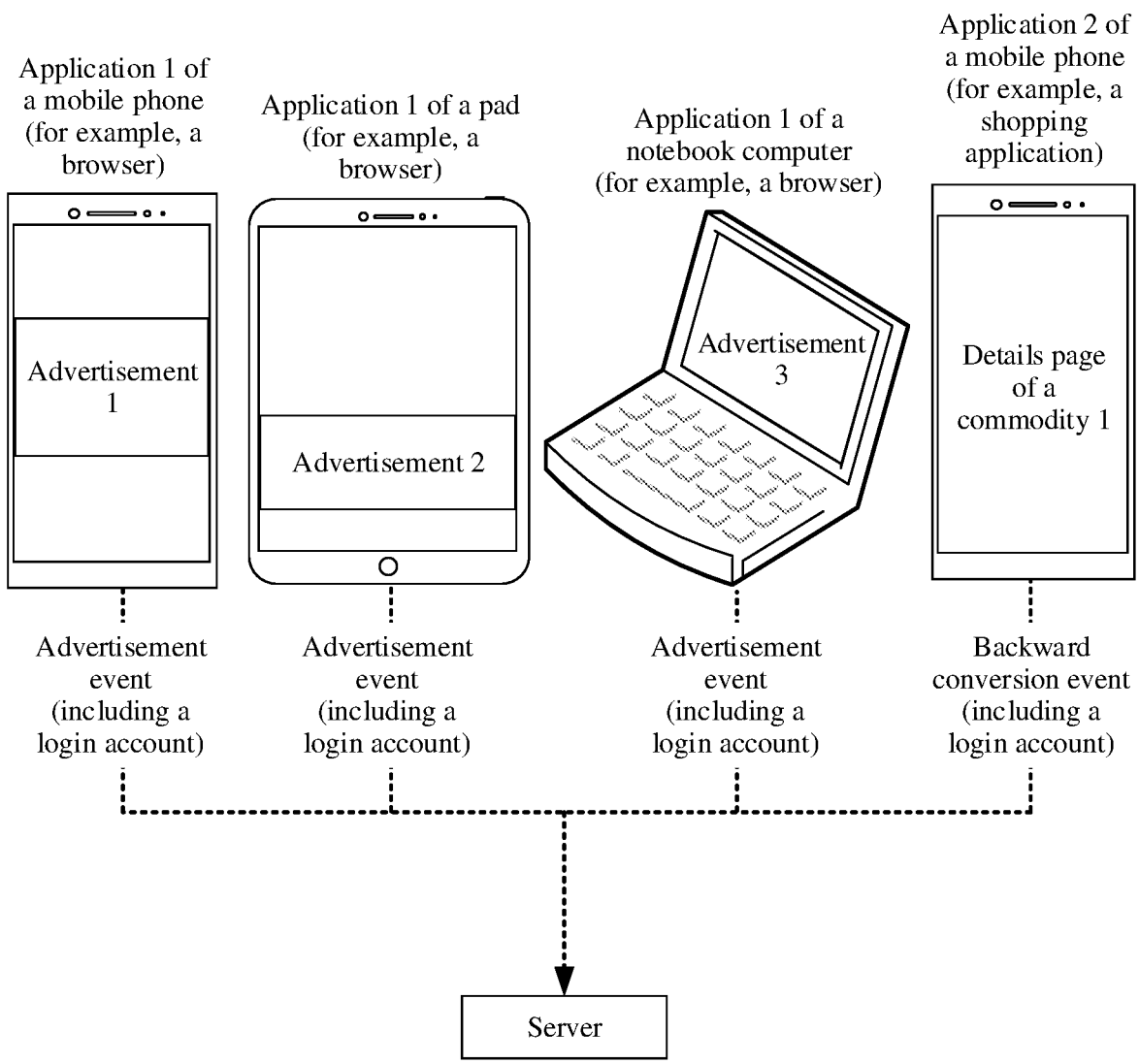
FIG. 3 is a schematic diagram of another cross-device advertisement attribution scenario in the conventional technology.

For example, as shown in FIG. 3, an application 1 (such as a browser) is installed in a mobile phone of a user, and the application 1 is also installed in a tablet computer (pad) and a notebook computer. In addition, a same account is used to log in to the application 1 in the mobile phone, the pad, and the notebook computer. Moreover, the application 1 in each device includes an advertisement slot for displaying an advertisement. When the user starts an application in a device (for example, the mobile phone, the pad, or the notebook computer), the corresponding device may send an advertisement request to a server, and play a corresponding advertisement in a corresponding advertisement slot based on an advertisement response returned by the server. For example, when the user starts the browser in the mobile phone, the mobile phone plays an advertisement 1 in a corresponding advertisement slot based on an advertisement response of the server. When the user starts the browser in the pad, the pad plays an advertisement 2 in a corresponding advertisement slot based on an advertisement response of the server. When the user starts the browser in the notebook computer, the notebook computer plays an advertisement 3 in a corresponding advertisement slot based on an advertisement response of the server. As described in the example shown in FIG. 2, the advertisement 1, the advertisement 2, and the advertisement 3 have a same advertising campaign.

For example, the advertisement 1, the advertisement 2, and the advertisement 3 are advertisements related to the commodity 1.

When playing the advertisement 1, the advertisement 2, and the advertisement 3, the corresponding devices (for example, the mobile phone, the pad, and the notebook computer) each may further report an advertisement event to the server, to indicate that the corresponding advertisement is exposed to the user, the user clicks the advertisement, or the like. The advertisement event carries information such as a login account of the browser. Then, if user behavior conversion occurs, for example, the mobile phone shown in FIG. 3 includes an application 2 (for example, a shopping application), the user opens a details page of the commodity 1 in the shopping application of the mobile phone. After the user opens the details page of the commodity 1, the mobile phone may report a conversion event to the server. The conversion event includes the information such as the login account of the browser. In this way, the server may determine an advertisement event of each advertisement placement link based on the account carried in a conversion event, and perform attribution analysis by using an attribution model, to obtain an advertisement attribution analysis result, in other words, attribute contribution of the current conversion event (for example, opening the details page of the commodity 1) to a device and an application of each advertisement placement link.

It may be understood that a prerequisite for implementing cross-device advertisement attribution analysis in the solution 2 is that a same account is used to log in to applications in these devices. However, the account can only be used to log in to a personal device of the user, and cannot be used to log in to a public-oriented device such as the foregoing advertising device. In other words, the solution 2 cannot implement cross-device advertisement attribution analysis between the advertising device and another advertisement play device (for example, the foregoing terminal). In addition, for the solution 2, because different accounts are usually used for different applications in a same terminal of a user, in other words, one account cannot completely cover all applications in a terminal, the solution 2 cannot implement advertisement attribution analysis covering all devices and all services. In addition, even if a terminal is a personal device of a user, when the terminal and another terminal of the user are not logged in to by using a same account, cross-device advertisement attribution analysis cannot be implemented based on the account.

Embodiments of this application provide an advertisement attribution method. The method is applied to a cross-device advertisement attribution analysis process. In this embodiment, an advertising device (for example, an electronic billboard) broadcasts a wireless signal, so that a terminal (for example, a mobile phone of a user) can determine, based on the wireless signal, a position and a movement direction of the terminal, and preset exposure duration, that an advertisement played by the advertising device is effectively exposed to the user, and then report an advertisement event to a server. The advertisement event is used to indicate that the advertisement played by the advertising device is effectively exposed to the user. In addition, the advertisement event carries an identifier associated with the user, which is referred to as a unified identity in embodiments, so that the advertisement played by the advertising device can also be associated with the user. Moreover, the terminal also adds the unified identity when reporting the advertisement event to the server. Therefore, after user behavior conversion occurs, the server may determine, based on the unified identity, an advertisement event of an advertisement played by each device (for example, the advertising device and the terminal), so as to determine a degree of contribution of the advertisement played by each device to the user behavior conversion. This implements cross-device advertisement attribution analysis between the advertising device and the terminal.

In addition, for advertisements displayed in advertisement slots of different applications in the terminal, the terminal adds a same identifier such as the unified identity when reporting an advertisement event. This implements advertisement attribution analysis covering all devices and all services. Moreover, the solution provided in this embodiment does not depend on whether the terminal is logged in to by using an account. Therefore, even if a device and another device are not logged in to by using a same account, cross-device advertisement attribution analysis can also be implemented only when a same identifier such as the unified identity is added to a to-be-sent advertisement event.

The following describes implementations of embodiments of this application in detail with reference to the accompanying drawings.

Figure 4:
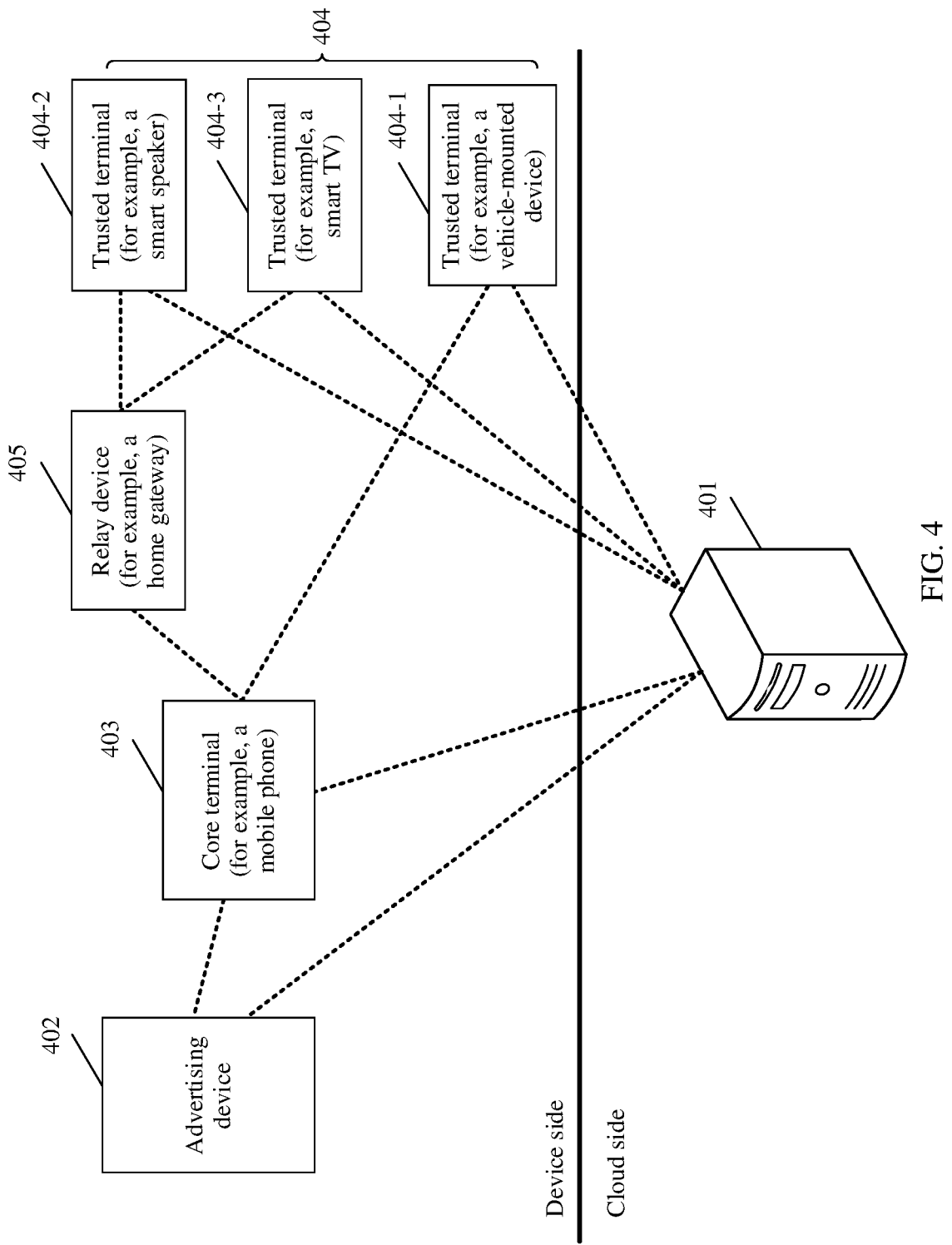
FIG. 4 is a simplified schematic diagram of an advertising system according to an embodiment of this application.

FIG. 4 is a simplified schematic diagram of an advertising system according to an embodiment of this application. As shown in FIG. 4, the advertising system may include at least a server 401, an advertising device 402, and a core terminal 403.

The server 401 is a device that is deployed on a network side (or a cloud side) and that is configured to provide an advertisement resource for an advertisement requester. The server 401 may be an advertisement server or an application server, or may be another type of server. This is not limited in this embodiment of this application.

The server 401 may further provide an advertising platform for a brand advertiser (or a customer), so that the brand advertiser places an advertisement. For example, the brand advertiser triggers an advertisement placement task by using the advertising platform. After receiving an advertisement request from the advertisement requester such as the advertising device 402 or the core terminal 403, the server 401 may return a corresponding advertisement resource to the advertisement requester based on the advertisement placement task. The advertisement resource may be advertisement content of the advertisement, or may be a link for downloading advertisement content.

In some embodiments of this application, the server 401 may be further configured to implement cross-device advertisement attribution analysis based on an advertisement event reported by each device. It should be noted that the server 401 in this embodiment of this application may be one server, or may be a server cluster including a plurality of servers. This is not specifically limited in this embodiment. In some other embodiments of this application, a server configured to provide an advertisement resource and an advertising platform may be different from a server configured to perform attribution analysis. In other words, the foregoing server 401 may be configured to provide an advertisement resource and an advertising platform, and another server different from the server 401 performs attribution analysis, for example, implements cross-device advertisement attribution analysis based on an advertisement event reported by each device. The following embodiments of this application are described by using an example in which a server configured to provide an advertisement resource and an advertising platform is the same as a server configured to perform attribution analysis.

The advertising device 402 is an electronic device that is disposed in public space and that plays an advertisement to the public, for example, an electronic billboard. The advertising device 402 can periodically download and update an advertisement resource in the server 401, and play a corresponding advertisement. In some embodiments, the advertising device 402 may include components such as a display and an audio player (for example, a speaker). These components can work together to play an advertisement. In addition, in an example, the public space may include various public places such as a highway roadside, a community square, an airport, an elevator, and a staircase.

The core terminal 403 may also be referred to as a core device, and is a mobile device that is heavily dependent on by a user and that is a personal device of the user. In some scenarios, the user may have a plurality of terminals. In these scenarios, "heavily dependent on by a user" may indicate a highest use frequency of the user or a highest frequency of performing service interaction with the server 401. In other words, when the user has a plurality of terminals, the core terminal 403 may be a terminal that is used most frequently in the plurality of terminals of the user, or a terminal that performs service interaction with the server 401 most frequently.

For example, the core terminal 403 may be a device such as a mobile phone, a tablet computer, a handheld computer, a notebook computer, a cellular phone, a personal digital assistant (personal digital assistant, PDA), a wearable device (such as a band, a smartwatch, or smart glasses), a vehicle-mounted device, a game console, or an augmented reality (augmented reality, AR)/virtual reality (virtual reality, VR) device. A specific form of the core terminal 403 is not specially limited in this embodiment. It should be noted that a first terminal in this application may be the core terminal 403 in this embodiment, or may be another device. This is not specifically limited in this embodiment.

In this embodiment of this application, the core terminal 403 of the user may be configured to automatically generate an identifier, for example, a unified identity. The unified identity corresponds to the core terminal 403, and may be associated with the user who uses the core terminal 403, in other words, may correspond to the user of the core terminal 403. Unified identities associated with different users are different.

In this embodiment, the unified identity is a newly defined identifier, and is an identifier newly added to the conventional technology. The unified identity and an identifier in the conventional technology may exist simultaneously and independently.

It may be understood that the unified identity may be an identifier different from the identifier in the conventional technology. For example, the unified identity may be represented by using a brand new character string. For example, the unified identity may include a random number, or include two parts: a prefix and a random number. The random number may be a character string of 256 bits or another length. The prefix may be a character string used to distinguish between different equipment vendors (for example, Huawei or other equipment vendors). Alternatively, the unified identity is a newly defined identifier, but the unified identity may use an identifier in the conventional technology, that is, the unified identity may be an identifier in the conventional technology. The core terminal 403 may use the identifier in the conventional technology as the newly defined unified identity. For example, the core terminal 403 is a mobile phone. The unified identity may be an existing device serial number of the mobile phone, for example, an international mobile equipment identity (international mobile equipment identity, IMEI). The unified identity and the device serial number of the mobile phone are two types of identifiers that exist simultaneously and independently. For another example, the core terminal 403 is a mobile phone. The unified identity may be a media access control (media access control, MAC) address of the mobile phone, an integrate circuit card identity (integrate circuit card identity, ICCID), or another existing identifier. For still another example, the core terminal 403 is a mobile phone. The unified identity may be an OAID of the mobile phone. Alternatively, the unified identity may be an identifier related to an identifier in the conventional technology. For example, the core terminal 403 may generate the unified identity based on the identifier in the conventional technology. For example, the core terminal 403 is a mobile phone. The mobile phone may extract some content of an existing identifier such as a device serial number (for example, an IMEI), a MAC address, an ICCID, or an OAID of the mobile phone, and use the extracted content as the unified identity. For still another example, the core terminal 403 is a mobile phone. The mobile phone may combine existing identifiers of the mobile phone to generate the unified identity.

In addition, in some embodiments of this application, the unified identity may be an identifier preset when the core terminal 403 is delivered from a factory, and the core terminal 403 may obtain the unified identity when being powered on for the first time. It may also be understood that the core terminal 403 generates the unified identity when being powered on for the first time.

In some other embodiments of this application, the unified identity may be an identifier generated after the core terminal 403 is powered on for the first time. For example, the core terminal 403 generates the unified identity after determining that a preset condition is met. For example, the core terminal 403 is a mobile phone 1. When determining that the mobile phone 1 establishes a trusted connection to another device for the first time, the mobile phone 1 generates a unified identity, for example, a unified identity 1. Specifically, the mobile phone 1 may generate the unified identity 1 in a process of establishing the trusted connection to the another device, or may generate the unified identity 1 after establishing the trusted connection to the another device.

For example, the mobile phone 1 requests to access a relay device 405, for example, a Wi-Fi network provided by a wireless fidelity (wireless fidelity, Wi-Fi) router (or referred to as a wireless router). After detecting a Wi-Fi password entered by the user, the mobile phone 1 sends the Wi-Fi password to the Wi-Fi router. After verifying that the Wi-Fi password is valid, the Wi-Fi router establishes a Wi-Fi connection to the mobile phone 1. Because the Wi-Fi connection is a connection established based on a user operation such as an operation of entering a Wi-Fi password by the user, the Wi-Fi connection is a trusted connection authenticated by the user. The mobile phone 1 may generate the unified identity 1 after establishing the trusted connection to the Wi-Fi router. The unified identity 1 corresponds to the mobile phone 1, or corresponds to the user of the mobile phone 1, for example, a user 1.

For another example, the mobile phone 1 requests to establish a Bluetooth connection to a vehicle-mounted device. The user separately performs a Bluetooth pairing operation on the mobile phone 1 and the vehicle-mounted device, and the mobile phone 1 establishes the Bluetooth connection to the vehicle-mounted device. Because the Bluetooth connection is a connection established based on a user operation such as an operation of performing pairing by the user, the Bluetooth connection is a trusted connection authenticated by the user. The mobile phone 1 may generate the unified identity 1 after establishing the trusted connection to the vehicle-mounted device. The unified identity 1 corresponds to the mobile phone 1, or corresponds to the user 1 of the mobile phone 1.

In some other embodiments of this application, the core terminal 403 generates a unified identity after determining that a same user has used the core terminal for a period of time. For example, the core terminal 403 is a mobile phone. After a user purchases a mobile phone, the user may not use the mobile phone but give the mobile phone to another user. Therefore, the newly purchased mobile phone may not generate a unified identity temporarily. The mobile phone may determine, based on a preset algorithm model and a use characteristic such as a use habit, a use manner, or a use frequency of the user, that the same user has used the mobile phone for a period of time, and then generate a unified identity corresponding to the user. In some other embodiments of this application, the core terminal 403 may generate a unified identity according to an instruction of a user. For example, the core terminal 403 is a mobile phone. The user may trigger a corresponding option on a setting menu of the mobile phone, to indicate the mobile phone to generate a unified identity.

In this embodiment of this application, the advertising device 402 may further include a wireless communications module, for example, a Bluetooth module or a wireless fidelity (wireless fidelity, Wi-Fi) module. The advertising device 402 may send a wireless signal in a broadcast manner by using a wireless communications module. The wireless signal may include an identifier of the advertising device 402 and orientation information of the advertising device 402. The orientation information is used to indicate a position (for example, longitude and latitude) and an orientation of the advertising device 402.

When the user, for example, the user 1, approaches the advertising device 402 with the core terminal 403 (for example, the mobile phone 1 of the user 1), the core terminal 403 may automatically receive the wireless signal. When determining, based on the wireless signal and the position (for example, the longitude and the latitude) and a movement direction of the core terminal 403, that an orientation of the core terminal 403 relative to the advertising device 402 meets a preset condition, and duration in which the orientation meets the preset condition is greater than preset exposure duration, the core terminal 403 determines that an advertisement played by the advertising device 402 is effectively exposed to the user 1, in other words, determines that the user 1 pays attention to (or watches) the advertisement played by the advertising device 402. After determining that the user 1 pays attention to the advertisement played by the advertising device 402, the core terminal 403 reports an advertisement event (for example, an advertisement event 1) to the server 401. The advertisement event 1 may be an effective exposure event, and is used to indicate that the advertisement played by the advertising device 402 is effectively exposed to the user 1. The advertisement event 1 carries the unified identity associated with the user 1, for example, the unified identity 1.

In addition, in a process in which the user, for example, the user 1, uses the core terminal 403 (for example, the user 1 uses the mobile phone 1), when the core terminal 403 plays an advertisement, the core terminal 403 also sends an advertisement event (for example, an advertisement event 2) that carries the unified identity 1 to the server 401, to indicate that the advertisement played by the core terminal 403 is exposed to the user 1 or the user clicks the advertisement.

After the user 1 performs behavior conversion, the server 401 may obtain, based on the unified identity 1 associated with the user 1, an advertisement event associated with the behavior conversion. For example, the advertisement event 1 and the advertisement event 2 are used for advertisement attribution analysis. In this way, degrees of contribution of the advertisement played by the advertising device 402 and the advertisement played by the core terminal 403 to the behavior conversion of the user 1 are determined. This implements cross-device advertisement attribution analysis between the advertising device 402 and the core terminal 403.

Similarly, a core terminal of another user such as a user 2 (a core terminal or a core device of the user 2) also generates a unified identity associated with the user 2, that is, a unified identity used to identify the user 2 using the core terminal, for example, a unified identity 2. When the user 2 approaches the advertising device 402 with the core terminal, the core terminal may also receive the wireless signal that is broadcast by the advertising device 402. When determining that the advertisement played by the advertising device 402 is effectively exposed to the user 2, the core terminal of the user 2 reports an advertisement event that carries the unified identity such as the unified identity 2 associated with the user 2 to the server 401, for example, an effective exposure event. In addition, when the user 2 uses the core terminal of the user 2, the core terminal of the user 2 also sends an advertisement event that carries the unified identity 2 to the server 401. In this way, after the user 2 performs behavior conversion, the server 401 may obtain, based on the unified identity 2, an advertisement event associated with the behavior conversion, to perform advertisement attribution analysis. In other words, by using the solution in this embodiment, the server 401 may implement user-centric cross-device advertisement attribution analysis based on a unified identity associated with a user.

The advertising system may further include another terminal, for example, a trusted terminal 404.

The trusted terminal 404 may also be referred to as a trusted device, and is a user-trusted device that can perform service interaction with the core terminal 403. The trusted terminal 404 may be a personal device of the user. It should be noted that, in this embodiment, a home public device may also be considered as a personal device of the user.

For example, the trusted terminal 404 may be a smart home device such as a smart TV or a smart speaker, a vehicle-mounted device, or a wearable device such as a band, a smartwatch, or smart glasses. Alternatively, the trusted terminal 404 may be a mobile phone, a tablet computer, a desktop computer, a laptop computer, a handheld computer, a notebook computer, a cellular phone, a PDA (such as a barcode scanner, a radio frequency identification (radio frequency identification devices, RFID) reader/writer, or a point-of-sale (point-of-sale, POS) terminal), a game console, an AR/VR device, or the like. A specific form of the trusted terminal 404 is not specially limited in this embodiment. It should be noted that a second terminal in this application may be the trusted terminal 404 in this embodiment, or may be another device. This is not specifically limited in this embodiment.

In some embodiments, the trusted terminal 404 and the core terminal 403 may directly establish a connection by using a wireless communications protocol, to perform service interaction. For example, the trusted terminal 404 and the core terminal 403 may directly establish a Bluetooth connection by using a Bluetooth protocol. For another example, the trusted terminal 404 and the core terminal 403 may establish Wi-Fi direct by using a Wi-Fi protocol. For example, as shown in FIG. 4, the trusted terminal 404 is a trusted terminal 404-1, for example, a vehicle-mounted device. The vehicle-mounted device and the core terminal 403 may directly establish a Bluetooth connection by using a Bluetooth protocol, to perform service interaction.

In some other embodiments, the trusted terminal 404 and the core terminal 403 may indirectly establish a connection by using a wireless communications protocol, to perform service interaction. For example, the advertising system may further include the relay device 405. The relay device 405 is a user-trusted device that can perform secure access for route distribution. The relay device 405 may be a gateway routing device (or referred to as a home gateway or a Wi-Fi router) deployed at user's home, and may enable another device such as the core terminal 403 or the trusted terminal 404 to access the internet by providing a wireless network. In this embodiment, the trusted terminal 404 and the core terminal 403 may establish a connection through the relay device 405 by using the wireless communications protocol. For example, both the trusted terminal 404 and the core terminal 403 may access a Wi-Fi network provided by the relay device 405. In this way, the trusted terminal 404 and the core terminal 403 may perform service interaction through the relay device 405. For example, the trusted terminal 404 is a trusted terminal 404-2 (for example, a smart speaker) or a trusted terminal 404-3 (for example, a smart TV). The smart speaker, the smart TV, and the core terminal 403 may all access the Wi-Fi network provided by the relay device 405. Then, the smart speaker and the core terminal 403 may perform service interaction through the relay device 404, and the smart TV and the core terminal 403 may also perform service interaction through the relay device 404.

In this embodiment of this application, when establishing a connection to the trusted terminal 404, the core terminal 403 may transfer the unified identity generated by the core terminal 403 to the trusted terminal 404, so that the trusted terminal 404 stores the unified identity. For example, when establishing a connection to the trusted terminal 404-1, the core terminal 403 transfers the unified identity to the trusted terminal 404-1 for storage. For another example, when accessing the wireless network provided by the relay device 405, the core terminal 403 transfers the unified identity to the relay device 405 for storage. When the trusted terminal 404-2 (or the trusted terminal 404-3) accesses the wireless network provided by the relay device 405, the relay device 405 transfers the unified identity to the trusted terminal 404-2 (or the trusted terminal 404-3) for storage. Alternatively, if the trusted terminal 404-2 and the trusted terminal 404-3 have accessed the wireless network provided by the relay device 405, when the core terminal 403 accesses the wireless network provided by the relay device 405, the core terminal 403 may transfer the unified identity to the relay device 405, so that the relay device 404 broadcasts the unified identity to the trusted terminal 404-2 and the trusted terminal 404-3 that have accessed the wireless network provided by the relay device for storage.

In a process in which the user uses the trusted terminal 404, when the trusted terminal 404 plays an advertisement, the trusted terminal 404 also sends an advertisement event (for example, an advertisement event 3) that carries the unified identity to the server 401, to indicate that the advertisement played by the trusted terminal 404 is exposed to the user or the user clicks the advertisement. In this way, after the user performs behavior conversion, the server 401 may determine, based on the unified identity, a degree of contribution of an advertisement played by the trusted terminal 404 to the user behavior conversion. This implements cross-device advertisement attribution analysis between the advertising device 402, the core terminal 403, and the trusted terminal 404.

It should be noted that FIG. 4 is shown and described by using an example in which the advertising system includes the advertising device 402. In some other embodiments, the advertising system may not include the advertising device 402, but the advertising system includes the core terminal 403 and at least one trusted terminal 404. In other words, the advertising system includes the server 401, the core terminal 403, and the at least one trusted terminal 404. In this embodiment, when reporting an advertisement event to the server, each terminal may add the unified identity associated with the user. Therefore, after user behavior conversion occurs, the server 401 obtains, based on the unified identity associated with the user, the advertisement event associated with the behavior conversion, to perform advertisement attribution analysis, so as to determine a degree of contribution of each terminal to the user behavior conversion. In other words, cross-device advertisement attribution analysis can be implemented without depending on a terminal login account.

Figure 5A:
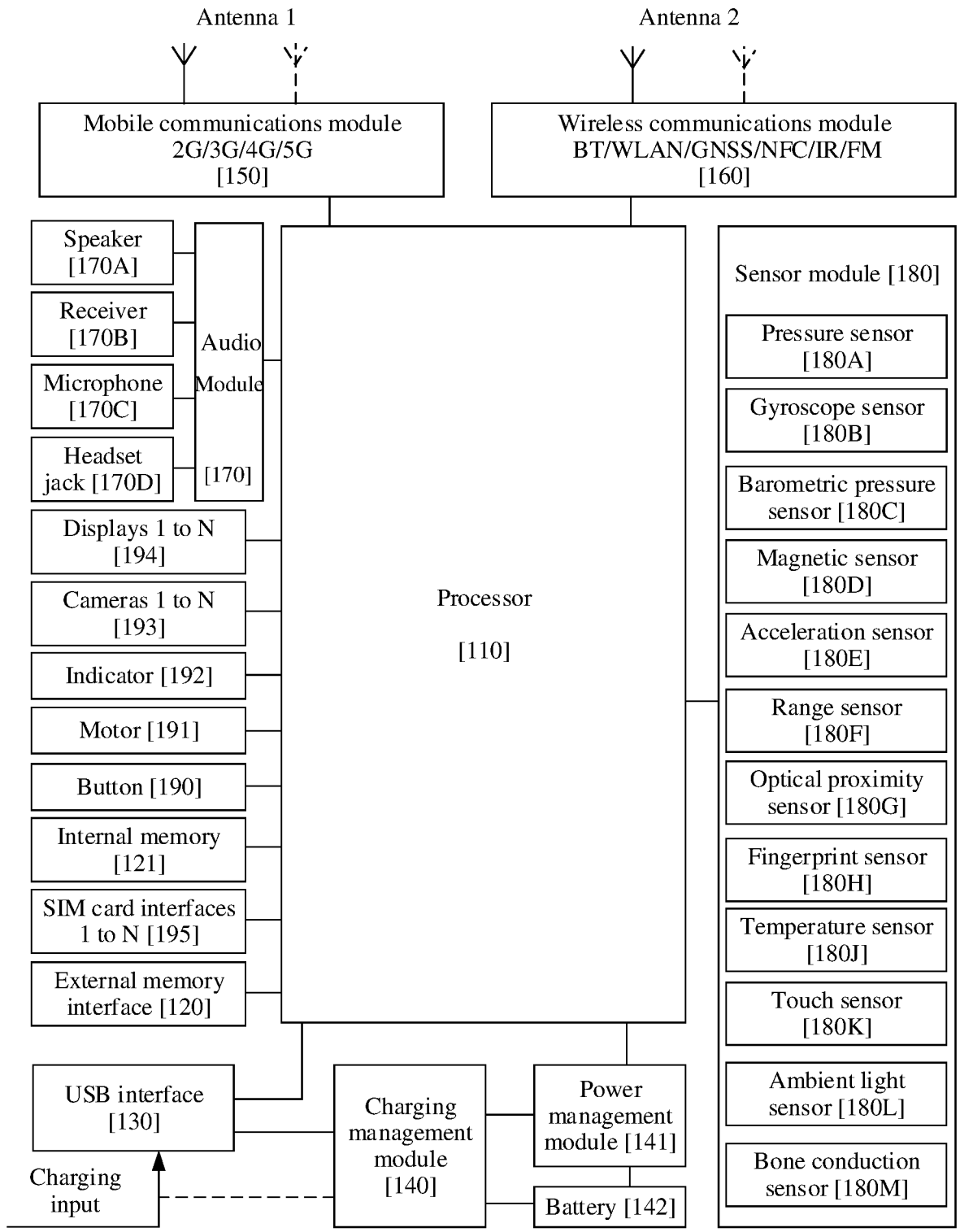
FIG. 5A is a schematic diagram of a structure of a mobile phone according to an embodiment of this application.

In this embodiment, an example in which the core terminal 403 is a mobile phone is used. FIG. 5A is a schematic diagram of a structure of a mobile phone according to an embodiment of this application.

As shown in FIG. 5A, the mobile phone may include a processor 110, an internal memory 121, an antenna 1, an antenna 2, a mobile communications module 150, a wireless communications module 160, an audio module 170, a speaker 170A, a display 194, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the mobile phone. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that is applied to the mobile phone and that includes 2G/3G/4G/5G or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. For example, in this embodiment of this application, the mobile phone may send an advertisement event that carries a unified identity to a server by using the mobile communications module 150. The mobile phone may further send an advertisement request to the server by using the mobile communications module 150, and receive an advertisement resource and the like returned by the server. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, and the like), or displays an image or a video through the display 194, for example, displays an advertisement. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that is applied to the mobile phone and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2. For example, in this embodiment of this application, the mobile phone may communicate with another terminal (for example, a trusted terminal) by using the wireless communications module 160, for example, transfer the unified identity to the trusted terminal. For another example, the mobile phone receives a wireless signal that is broadcast by an advertising device.

In some embodiments, in the mobile phone, the antenna 1 and the mobile communications module 150 are coupled, and the antenna 2 and the wireless communications module 160 are coupled, so that the mobile phone can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The mobile phone implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone may include one or N displays 194, where N is a positive integer greater than 1. For example, in this embodiment of this application, the mobile phone may play an advertisement on the display 194 for a user to watch.

The video codec is configured to compress or decompress a digital video. The mobile phone may support one or more video codecs. In this way, the mobile phone can play or record videos in a plurality of coding formats, for example, moving picture experts group (moving picture experts group, MPEG)1, MPEG2, MPEG3, and MPEG4.

The internal memory 121 may be configured to store computer-executable program code, and the executable program code includes instructions. The processor 110 runs the instructions stored in the internal memory 121, to perform various function applications of the mobile phone and process data. The internal memory 121 may include a program storage area and a data storage area. The program storage area may store an operating system, an application required by at least one function (for example, a sound playing function and an image playing function), and the like. The data storage area may store data (for example, audio data or an address book) created when the mobile phone is used, and the like. In addition, the internal memory 121 may include a high-speed random access memory, or may include a nonvolatile memory, for example, at least one magnetic disk storage device, a flash memory, or a universal flash storage (universal flash storage, UFS).

The mobile phone may implement an audio function such as advertisement audio playing by using the audio module 170, the speaker 170A, the application processor, and the like.

The audio module 170 is configured to convert digital audio information into an analog audio signal output, and is also configured to convert an analog audio input into a digital audio signal. The audio module 170 may be further configured to code and decode audio signals. In some embodiments, the audio module 170 may be disposed in the processor 110, or some function modules of the audio module 170 are disposed in the processor 110. The speaker 170A, also referred to as a "horn", is configured to convert an audio electrical signal into a sound signal. The mobile phone may listen to music or answer a hands-free call by using the speaker 170A. For example, in this embodiment of this application, the mobile phone may play audio data of an advertisement by using the speaker 170A.

In some embodiments, as shown in FIG. 5A, the mobile phone may further include an external memory interface 120, a universal serial bus (universal serial bus, USB) interface 130, a charging management module 140, a power management module 141, a battery 142, a receiver 170B, a microphone 170C, a headset interface 170D, a sensor module 180, a button 190, a motor 191, an indicator 192, a camera 193, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the mobile phone. In some other embodiments, the mobile phone may include more or fewer components than those shown in the figure, or combine some components, or split some components, or may have different component arrangements. The components shown in the figure may be implemented through hardware, software, or a combination of software and hardware.

Figure 5B:
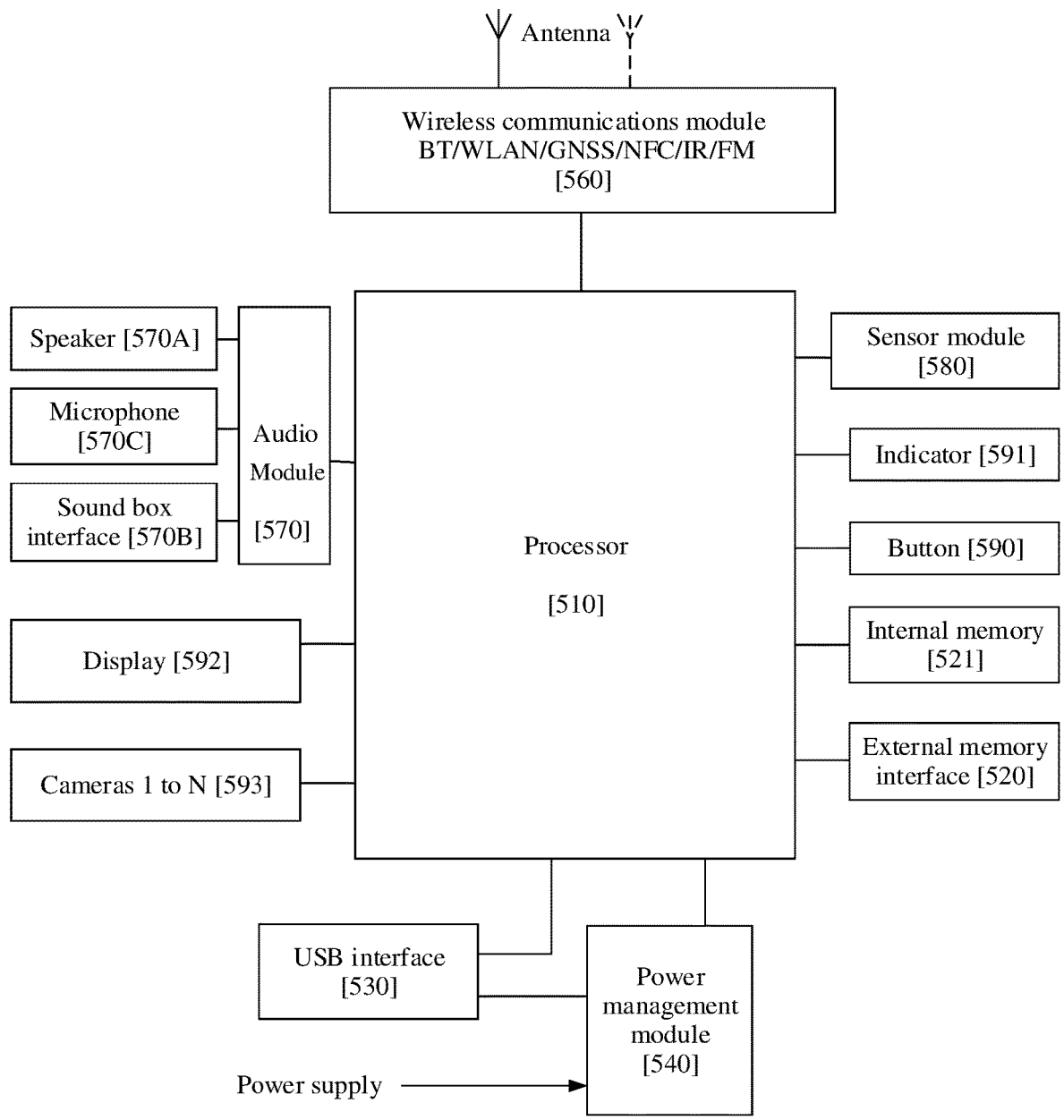
FIG. 5B is a schematic diagram of a structure of a smart TV according to an embodiment of this application.

In this embodiment, an example in which the trusted terminal 404 is a smart TV is used. FIG. 5B is a schematic diagram of a structure of a smart TV according to an embodiment of this application.

As shown in FIG. 5B, the smart TV may include a processor 510, an internal memory 521, an antenna, a wireless communications module 560, an audio module 570, a speaker 570A, a button 590, an indicator 591, a display 592, and the like.

The processor 510 may include one or more processing units. For example, the processor 510 may include an AP, a modem processor, a GPU, an ISP, a controller, a memory, a video codec, a DSP, a baseband processor, and/or an NPU. Different processing units may be independent components, or may be integrated into one or more processors. A memory may be further disposed in the processor 510, and is configured to store instructions and data.

A wireless communication function of the smart TV may be implemented by using the antenna, the wireless communications module 560, and the like. The wireless communications module 560 may provide a wireless communication solution that is applied to the smart TV and that includes a WLAN (for example, a Wi-Fi network), a BT, a GNSS, FM, NFC, IR, or the like.

The wireless communications module 560 may be one or more components integrating at least one communications processing module. The wireless communications module 560 receives an electromagnetic wave through the antenna, performs frequency modulation and filtering processing on the electromagnetic wave signal, and sends a processed signal to the processor 510. The wireless communications module 560 may further receive a to-be-sent signal from the processor 510, perform frequency modulation and amplification on the signal, and convert a processed signal into an electromagnetic wave for radiation through the antenna. In some embodiments, the antenna and the wireless communications module 560 in the smart TV are coupled, so that the smart TV can communicate with a network and another device by using a wireless communications technology. For example, in this embodiment of this application, the smart TV may communicate with the foregoing relay device by using the wireless communications module 560, for example, receive the unified identity from the relay device. Certainly, the smart TV may also communicate with another terminal such as the foregoing core terminal by using the wireless communications module 560.

The smart TV implements a display function by using the GPU, the display 592, the application processor, and the like. The GPU is a microprocessor for image processing, and is connected to the display 592 and the application processor. The GPU is configured to: perform mathematical and geometric computation, and render an image. The processor 510 may include one or more GPUs that execute program instructions to generate or change display information.

The display 592 is configured to display an image, a video, and the like. For example, in this embodiment of this application, the smart TV may display an advertisement by using the display 592. The display 592 includes a display panel. The display panel may be an LCD, an OLED, an AMOLED, an FLED, a mini-LED, a micro-LED, a micro-OLED, a QLED, or the like.

The video codec is configured to compress or decompress a digital video. The smart TV may support one or more video codecs. In this way, the smart TV may play or record videos in a plurality of coding formats, for example, MPEG1, MPEG2, MPEG3, and MPEG4.

The internal memory 521 may be configured to store computer-executable program code, and the executable program code includes instructions. The processor 510 runs the instructions stored in the internal memory 521, to perform various function applications of the smart TV and process data. The internal memory 521 may include a program storage area and a data storage area. The program storage area may store an operating system, an application required by at least one function (for example, a sound playing function and an image playing function), and the like. The data storage area may store data (for example, audio data) created when the smart TV is used, and the like. In addition, the internal memory 521 may include a high-speed random access memory, or may include a nonvolatile memory, for example, at least one magnetic disk storage device, a flash memory, or a UFS.

The smart TV may implement an audio function such as advertisement audio playing by using the audio module 570, the speaker 570A, the application processor, and the like. The audio module 570 is configured to convert digital audio information into an analog audio signal output, and is also configured to convert an analog audio input into a digital audio signal. The audio module 570 may be further configured to code and decode audio signals. In some embodiments, the audio module 570 may be disposed in the processor 510, or some function modules of the audio module 570 are disposed in the processor 510. The speaker 570A, also referred to as a "horn", is configured to convert an audio electrical signal into a sound signal. The microphone 570C, also referred to as a "mike" or a "microphone", is configured to convert a sound signal into an electrical signal.

The button 590 includes a power button, a volume button, or the like. The button 590 may be a mechanical button, or may be a touch button. The smart TV may receive a key input, and generate a key signal input related to user settings and function control of the smart TV.

The indicator 591 may be an indicator light, and may be configured to indicate that the smart TV is in a power-on mode, a standby mode, a power-off mode, or the like. For example, if the indicator light is off, it may indicate that the smart TV is in the power-off mode; if the indicator light is green or blue, it may indicate that the smart TV is in the power-on mode; and if the indicator light is red, it may indicate that the smart TV is in the standby mode.

In some embodiments, as shown in FIG. 5B, the smart TV may further include an external memory interface 520, a USB interface 530, a power management module 540, a sound box interface 570B, a microphone 570C, a sensor module 580, 1 to N cameras 593 (N is an integer greater than 1), and the like. The sensor module 580 may include a range sensor, an optical proximity sensor, a fingerprint sensor, a temperature sensor, a touch sensor, an ambient light sensor, and the like. In some other embodiments, the smart TV may not include the camera, in other words, the camera 593 is not disposed in the smart TV. The smart TV may be externally connected to the camera 593 through an interface (for example, the USB interface 530). The external camera 593 may be fastened to the smart TV by using an external fastener (for example, a camera support with a clip). For example, the external camera 593 may be fastened to an edge such as an upper edge of the display 592 of the smart TV by using the external fastener.

It may be understood that the structure shown in this embodiment does not constitute a specific limitation on the smart TV. In some other embodiments, the smart TV may include more or fewer components than those shown in the figure, or combine some components, or split some components, or may have different component arrangements. The components shown in the figure may be implemented through hardware, software, or a combination of software and hardware.

In addition, in this embodiment, the smart TV may be further connected to a network box such as a set-top box through an interface. In this way, the smart TV may implement interaction with the foregoing server by using the set-top box, for example, send an advertisement request to the server and receive an advertisement response from the server.

In some embodiments, the smart TV is provided with a remote control. The remote control is configured to control the smart TV. The remote control may include a plurality of buttons, such as a power button, a volume button, and a plurality of other selection buttons. The button on the remote control may be a mechanical button, or may be a touch button. The remote control may receive a key input, generate a key signal input related to user settings and function control of the smart TV, and send a corresponding control signal to the smart TV, so as to control the smart TV. For example, the remote control may send a control signal to the smart TV by using an infrared signal or the like. The remote control may further include a battery storage cavity that is configured to mount a battery and supply power to the remote control.

Figure 5C:
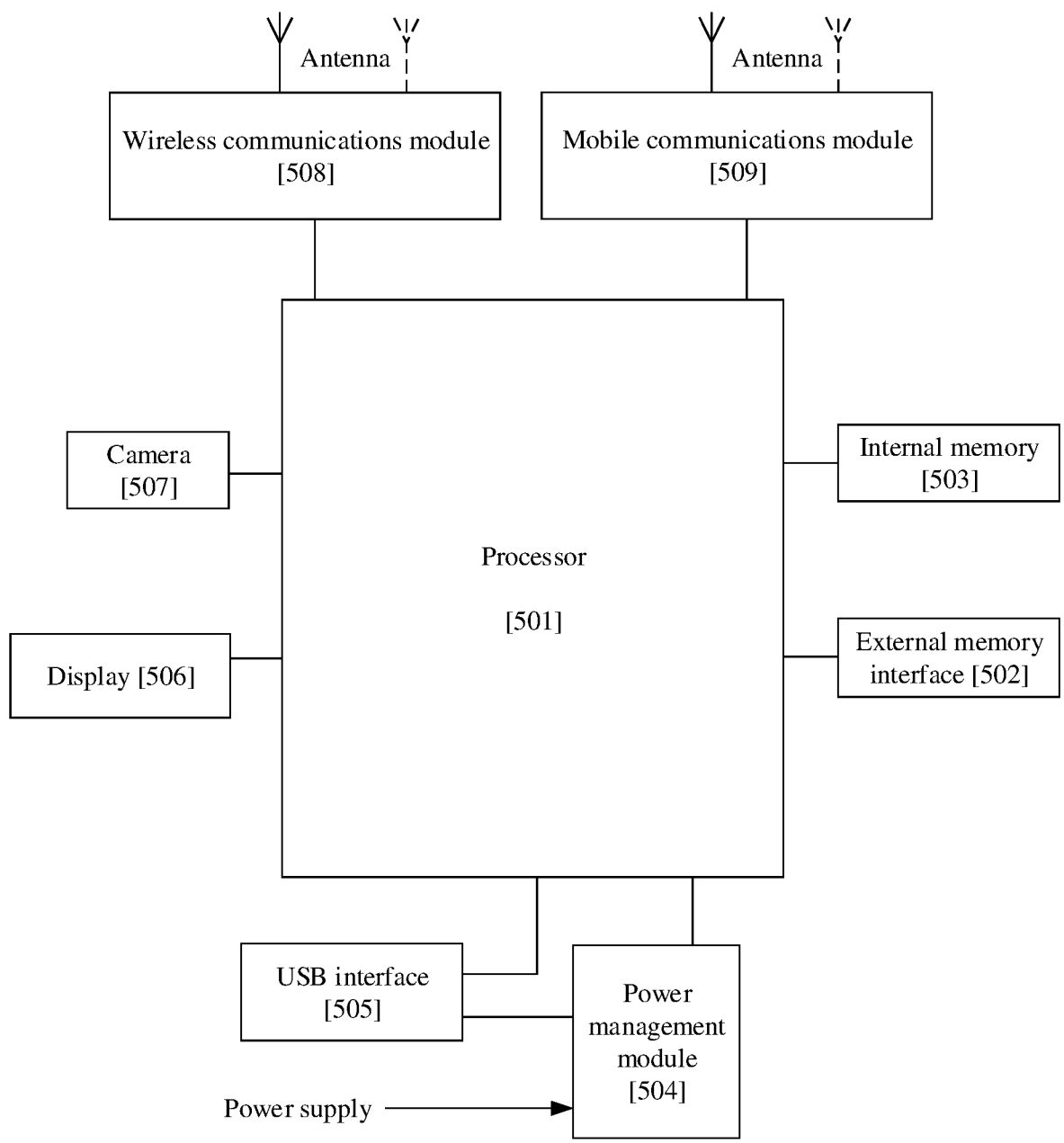
FIG. 5C is a schematic diagram of a structure of an electronic billboard according to an embodiment of this application.

In this embodiment, an example in which the advertising device 402 is an electronic billboard is used. FIG. 5C is a schematic diagram of a structure of an electronic billboard according to an embodiment of this application.

As shown in FIG. 5C, the electronic billboard may include a processor 501, an internal memory 503, a USB interface 505, a power management module 504, an antenna, a wireless communications module 508, a display 506, and the like.

The processor 501 may include one or more processing units. For example, the processor 501 may include an AP, a modem processor, a GPU, an ISP, a controller, a memory, a video codec, a DSP, a baseband processor, and/or an NPU. Different processing units may be independent components, or may be integrated into one or more processors. A memory may be further disposed in the processor 501, and is configured to store instructions and data.

The power management module 504 is configured to connect to a power supply. The power management module 504 may be further connected to the processor 501, the internal memory 503, the display 506, the wireless communications module 508, and the like. The power management module 504 receives an input of the power supply through the USB interface 505, and supplies power to the processor 501, the internal memory 503, the display 506, the wireless communications module 508, and the like. In some embodiments, the power management module 504 may alternatively be disposed in the processor 501.

A wireless communication function of the electronic billboard may be implemented by using the antenna, the wireless communications module 508, and the like. The wireless communications module 508 may provide a wireless communication solution that is applied to the electronic billboard and that includes a WLAN (for example, a Wi-Fi network), Bluetooth (BT), a GNSS, or the like.

The wireless communications module 508 may be one or more components integrating at least one communications processing module. The wireless communications module 508 receives an electromagnetic wave through the antenna, performs frequency modulation and filtering processing on the electromagnetic wave signal, and sends a processed signal to the processor 501. The wireless communications module 508 may further receive a to-be-sent signal from the processor 501, perform frequency modulation and amplification on the signal, and convert a processed signal into an electromagnetic wave for radiation through the antenna. In some embodiments, the antenna and the wireless communications module 508 in the electronic billboard are coupled, so that the electronic billboard can communicate with a network and another device by using a wireless communications technology. For example, the wireless communications module 508 in this embodiment of this application may be a Bluetooth module or a Wi-Fi module. The wireless communications module 508 is configured to broadcast a wireless signal in this embodiment of this application.

Optionally, as shown in FIG. 5C, the electronic billboard may further include a mobile communications module 509. The mobile communications module 509 may be configured to receive an advertisement resource from a server.

The electronic billboard implements a display function by using the GPU, the display 506, the application processor, and the like. The GPU is a microprocessor for image processing, and is connected to the display 506 and the application processor. The GPU is configured to: perform mathematical and geometric computation, and render an image. The processor 501 may include one or more GPUs that execute program instructions to generate or change display information.

The display 506 is configured to display an image, a video, and the like. The display 506 includes a display panel. The display panel may be an LCD, an OLED, an AMOLED, an FLED, a mini-LED, a micro-LED, a micro-OLED, a QLED, or the like. For example, in this embodiment of this application, the display 506 is configured to display an advertisement.

The video codec is configured to compress or decompress a digital video. The electronic billboard may support one or more video codecs. In this way, the electronic billboard may play or record videos in a plurality of coding formats, for example, MPEG1, MPEG2, MPEG3, and MPEG4.

The internal memory 503 may be configured to store computer-executable program code, and the executable program code includes instructions. The processor 501 runs the instructions stored in the internal memory 503, to perform various function applications of the electronic billboard and process data. The internal memory 503 may include a program storage area and a data storage area. The program storage area may store an operating system, an application required by at least one function (for example, a sound playing function and an image playing function), and the like. The data storage area may store data (for example, an advertisement play record or a received advertisement resource) created when the electronic billboard is used, and the like. In addition, the internal memory 503 may include a high-speed random access memory, or may include a nonvolatile memory, for example, at least one magnetic disk storage device, a flash memory, or a UFS.

In some embodiments, as shown in FIG. 5C, the electronic billboard may further include an external memory interface 502, a camera 507, and the like.

It may be understood that the structure shown in this embodiment does not constitute a specific limitation on the electronic billboard. In some other embodiments, the electronic billboard may include more or fewer components than those shown in the figure, or combine some components, or split some components, or may have different component arrangements. The components shown in the figure may be implemented through hardware, software, or a combination of software and hardware.

Figure 5D:
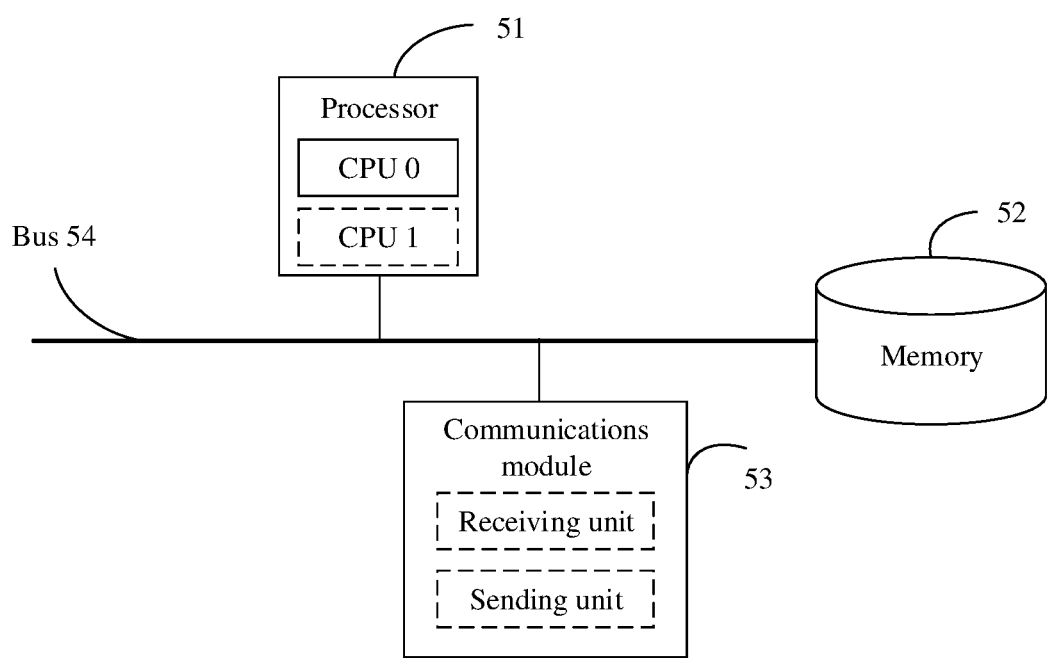
FIG. 5D is a schematic diagram of a structure of a server according to an embodiment of this application.

FIG. 5D is a schematic diagram of a structure of a server according to an embodiment of this application. As shown in FIG. 5D, the server may include one or more processors 51, a memory 52, and a communications module 53. The processor 51, the memory 52, and the communications module 53 may be connected through a bus 54.

The processor 51 is a control center of the server, and may be a general-purpose central processing unit (central processing unit, CPU), another general-purpose processor, or the like. The general-purpose processor may be a microprocessor, any conventional processor, or the like. In an example, the processor 51 may include one or more CPUs, for example, a CPU 0 and a CPU 1 that are shown in FIG. 5D.

The memory 52 may be a ROM or another type of static storage device capable of storing static information and instructions, a random access memory (random access memory, RAM) or another type of dynamic storage device capable of storing information and instructions, an electrically erasable programmable read-only memory (electrically erasable programmable read-only memory, EEPROM), a magnetic disk storage medium or another magnetic storage device, or any other medium capable of carrying or storing expected program code in a form of an instruction or a data structure and capable of being accessed by a computer, but is not limited thereto. In a possible implementation, the memory 52 may be independent of the processor 51. The memory 52 may be connected to the processor 51 through the bus 54, and is configured to store instructions or program code. When invoking and executing the instructions or the program code stored in the memory 52, the processor 51 can implement a method provided in embodiments of this application. In another possible implementation, the memory 52 may alternatively be integrated with the processor 51.

The communications module 53 may also be referred to as a communications interface, and is configured to connect the server to another device (for example, the foregoing core terminal or the foregoing trusted terminal) through a communications network. The communications network may be an Ethernet, a radio access network (radio access network, RAN), a WLAN, or the like. The communications module 53 may include a receiving unit configured to receive data and a sending unit configured to send data.

The bus 54 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 5D, but this does not mean that there is only one bus or only one type of bus.

It should be noted that the structure shown in FIG. 5D does not constitute a limitation on the server. In addition to the components shown in FIG. 5D, the server may include more or fewer components than those shown in the figure, or combine some components, or have different component arrangements.

All technical solutions in the following embodiments may be implemented in a device that has the foregoing hardware architecture.

Embodiment 1

Figures 1, 6A:
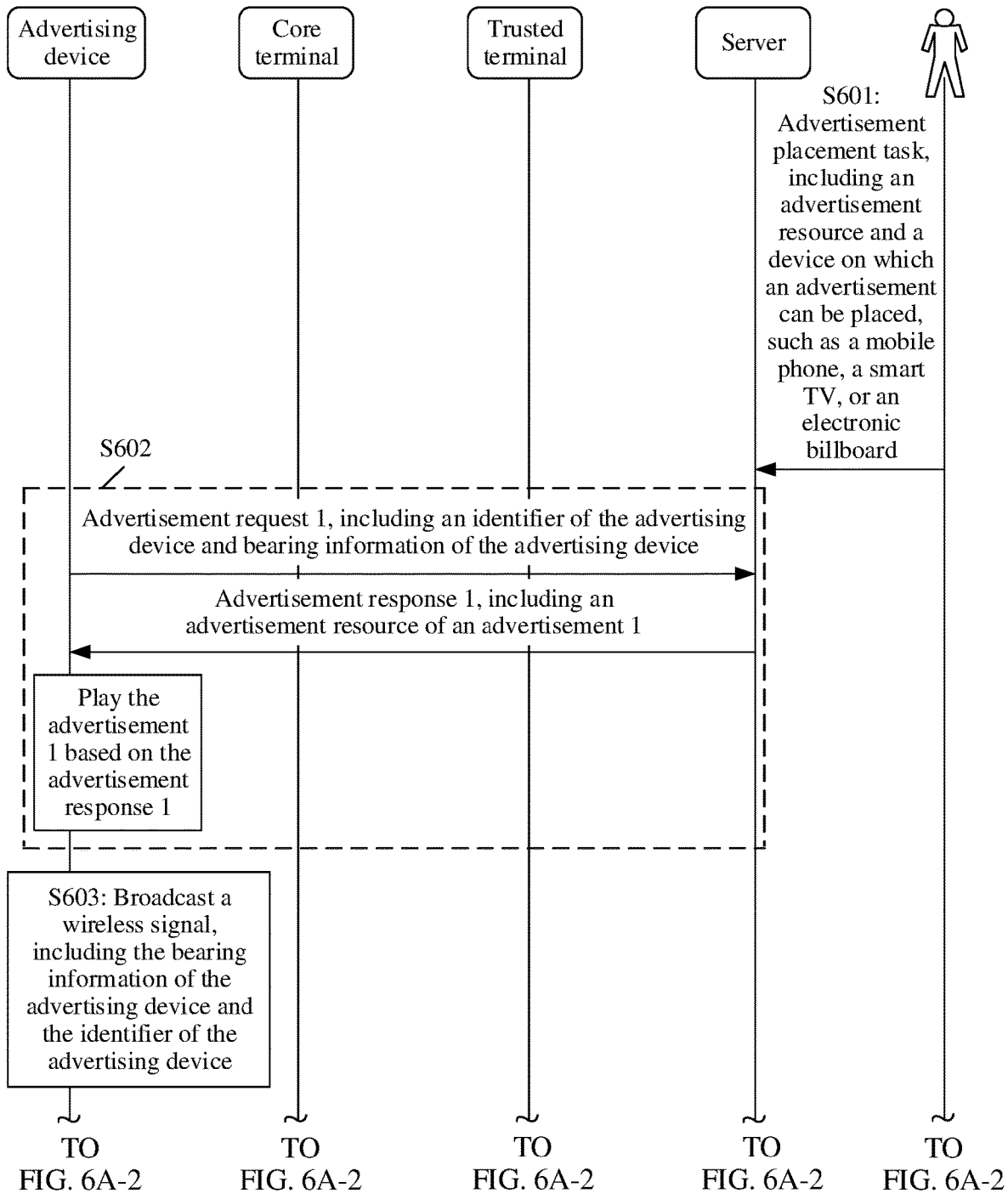
Figures 2, 6A:
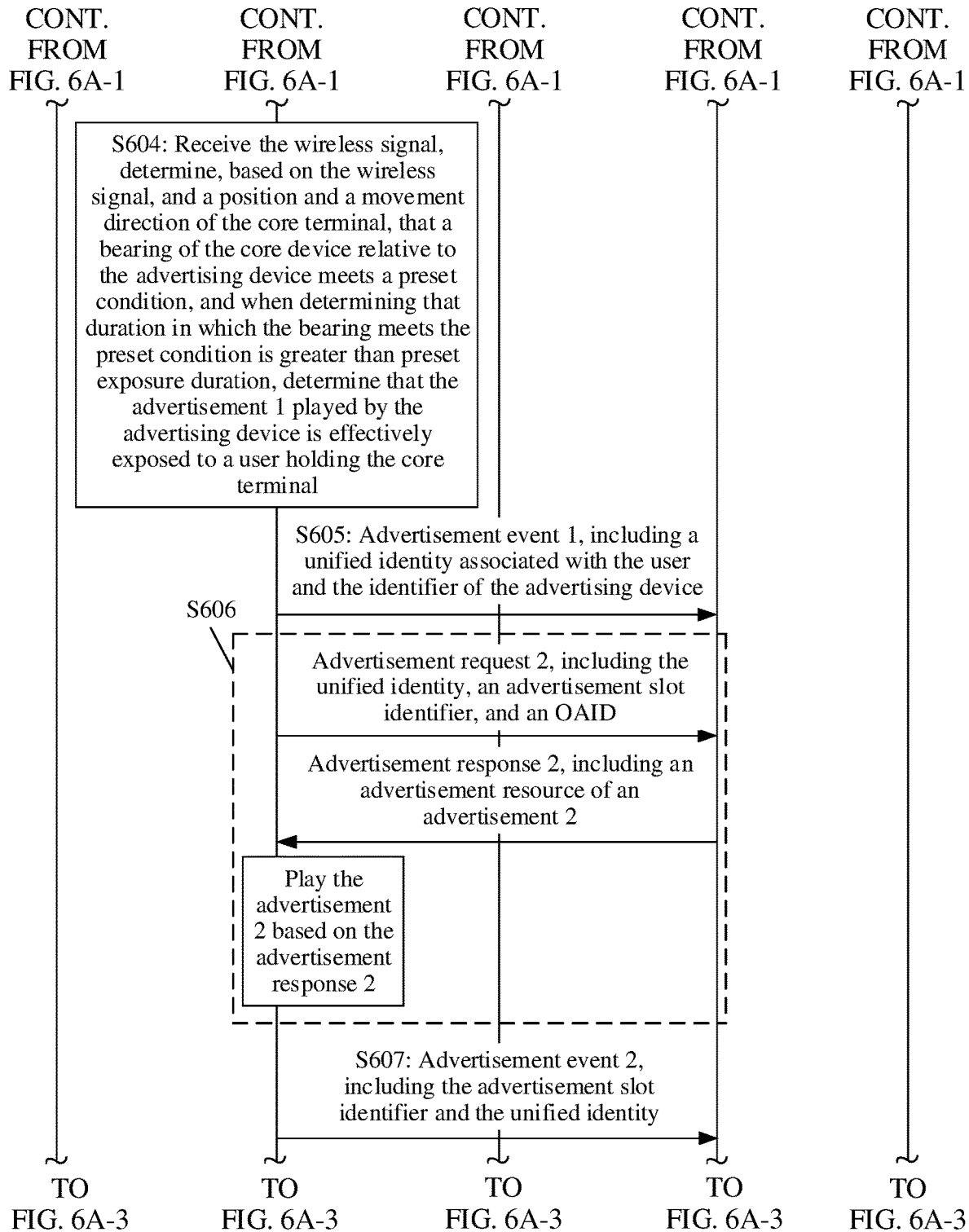
Figures 3, 6A:
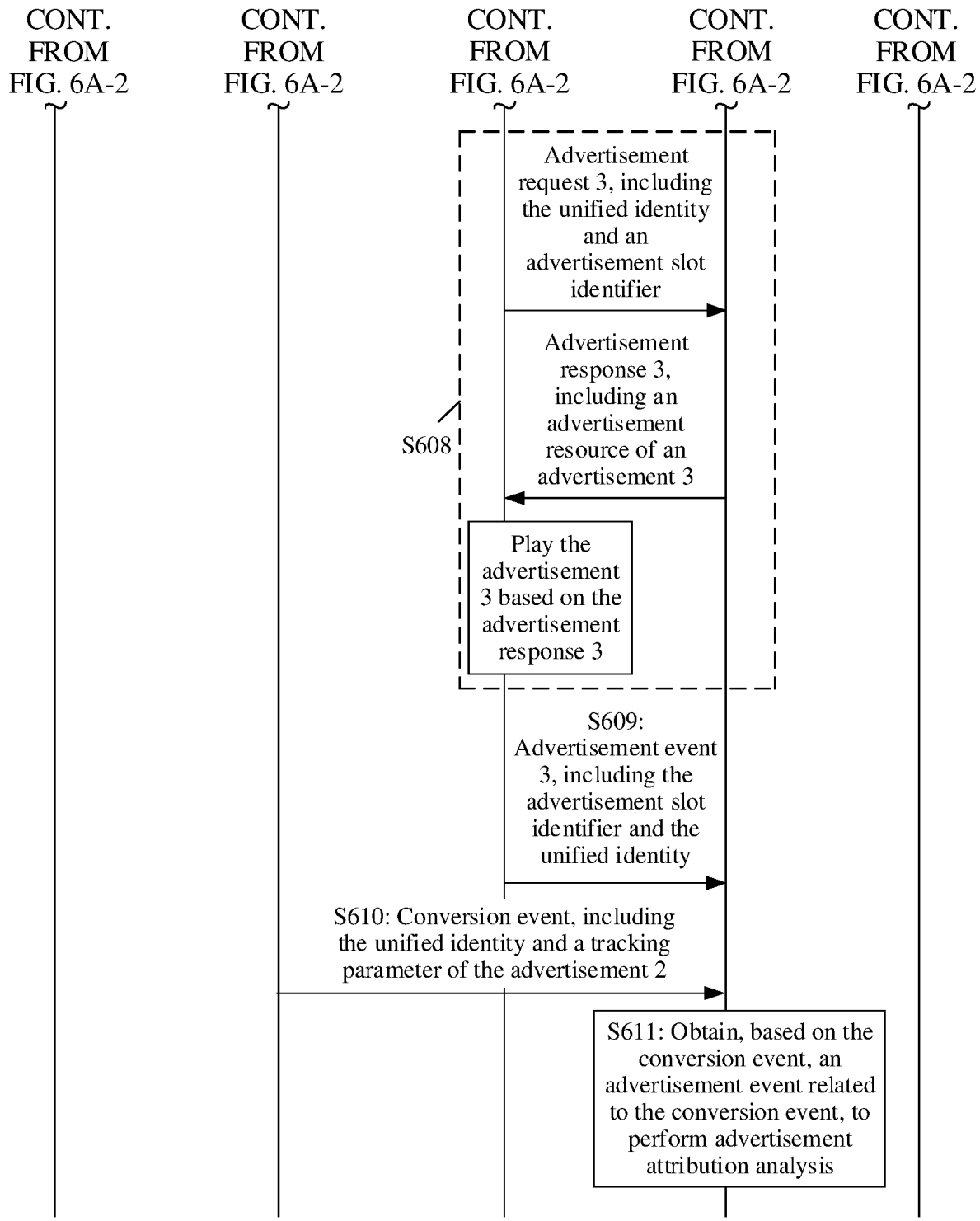

FIG. 6A-1 to FIG. 6A-3 is a schematic flowchart of an advertisement attribution method according to Embodiment 1 of this application. With reference to the advertising system shown in FIG. 4, the method provided in this embodiment is described in detail below by using an example in which a server configured to provide an advertisement resource and an advertising platform is the same as a server configured to perform attribution analysis. As shown in FIG. 6A-1 to FIG. 6A-3, the method may include the following steps.

S601: A server receives an advertisement placement task of a brand advertiser.

The server may be deployed on a network side to provide an advertisement resource for an advertisement requester (that is, a device having an advertisement play requirement). The server may further provide an advertising platform for the brand advertiser to perform advertisement placement. For example, an advertiser of a brand H may trigger an advertisement placement task by using the advertising platform provided by the server, and the advertisement placement task may include an advertisement resource of a mobile phone of the brand H. The advertisement placement task may further include a device on which the advertisement resource of the mobile phone of the brand H can be placed: a terminal such as an internet device (such as a mobile phone, a tablet computer, and a notebook computer) and a smart TV, an advertising device (such as an electronic billboard), and the like. In this embodiment, the advertisement resource may be advertisement content of an advertisement, or may be a link for downloading advertisement content. This is not specifically limited in this embodiment.

S602: The server receives an advertisement request 1 of an advertising device, and returns an advertisement response 1 to the advertising device, and the advertising device plays an advertisement 1 based on the advertisement response 1.

The advertisement request 1 may include an identifier of the advertising device. The advertisement request 1 may further include orientation information of the advertising device, and the orientation information is used to indicate a position (for example, longitude and latitude) and an orientation of the advertising device. The advertisement response 1 may include an advertisement resource provided by the server for the advertising device.

For example, the advertisement requester may send an advertisement request to the server to obtain a corresponding advertisement resource and play the advertisement resource. For example, the advertisement requester is an advertising device, such as an electronic billboard. The electronic billboard may periodically send the advertisement request 1 to the server to request an advertisement resource. The advertisement request 1 may include an identifier of the electronic billboard. The advertisement request 1 may further include orientation information of the electronic billboard, to indicate a position and an orientation of the electronic billboard. After receiving the advertisement request 1 of the electronic billboard, the server may determine, based on an advertisement inventory schedule, an advertisement that can be scheduled to the electronic billboard, for example, the server determines that an advertisement of the mobile phone of the brand H in the example of S601 can be scheduled to the electronic billboard. Then, the server may send the advertisement response 1 to the electronic billboard. The advertisement response 1 includes the advertisement resource of the advertisement of the mobile phone of the brand H. After receiving the advertisement response 1, the electronic billboard may play the corresponding advertisement based on the advertisement resource carried in the advertisement response 1, for example, the advertisement 1. The advertisement 1 is an advertisement of the mobile phone of the brand H.

Figure 6B:
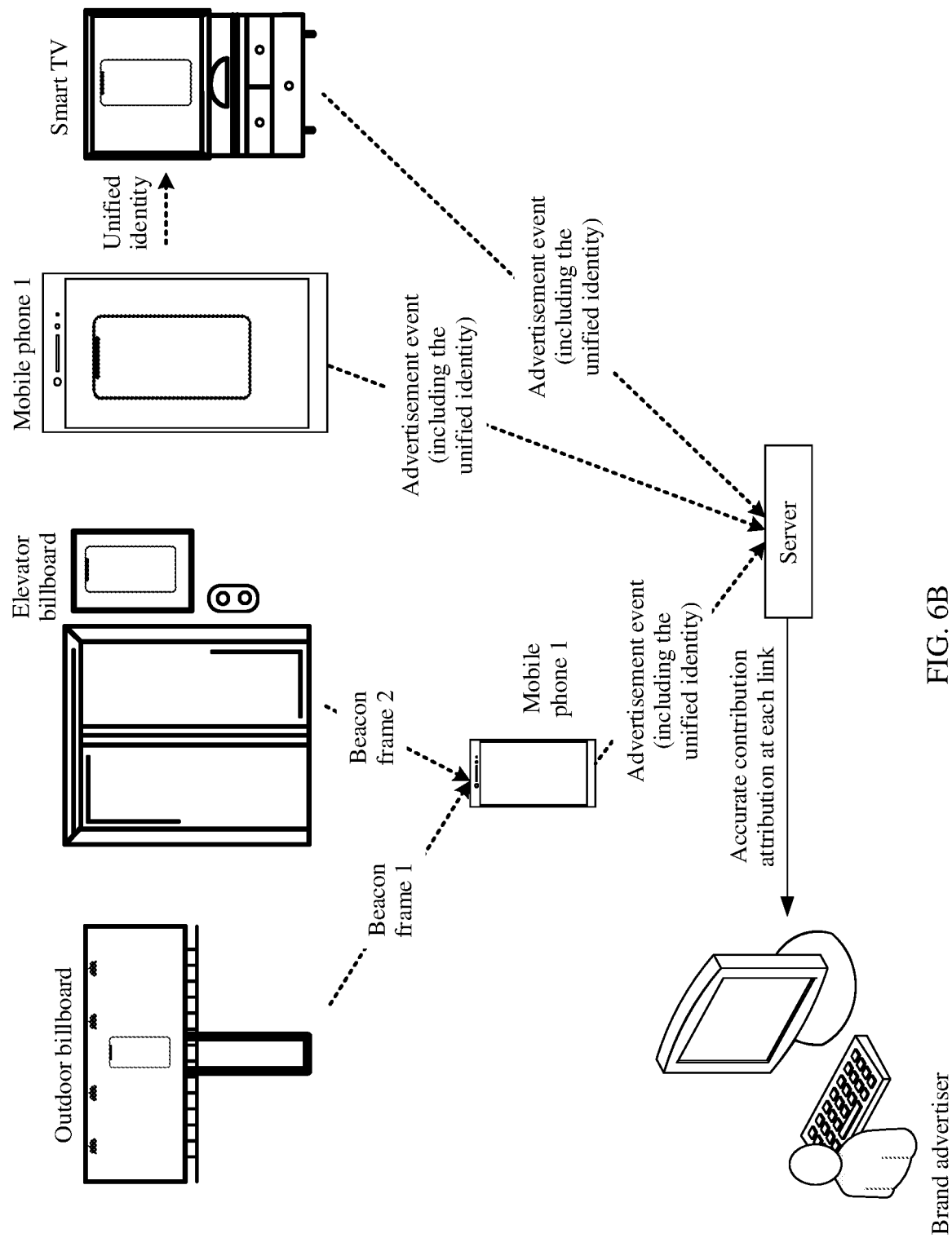
FIG. 6B is a schematic diagram of a cross-device advertisement attribution scenario according to an embodiment of this application.

For example, as shown in FIG. 6B, the server returns an advertisement 1-1 of the mobile phone of the brand H to an outdoor billboard based on an advertisement request sent by the outdoor billboard, and the outdoor billboard plays the advertisement 1-1 of the mobile phone of the brand H. For another example, as shown in FIG. 6B, the server may further return an advertisement 1-2 of the mobile phone of the brand H to an elevator billboard based on an advertisement request sent by the elevator billboard, and the elevator billboard plays the advertisement 1-2 of the mobile phone of the brand H. The advertisement 1-1 and the advertisement 1-2 have a same advertising campaign. For example, themes of content communicated by the advertisement 1-1 and the advertisement 1-2 both are about the mobile phone of the brand H.

S603: The advertising device broadcasts a wireless signal.

The wireless signal may include the orientation information of the advertising device and the identifier of the advertising device. The wireless signal may further include a tracking parameter of the advertisement 1 that is being played by the advertising device, to determine an advertising campaign of the advertisement 1. The wireless signal may further include an identifier of the advertisement 1, and the like. The tracking parameter of the advertisement 1 in this embodiment may be a second tracking parameter in this application.

For example, when playing an advertisement, the advertising device may send a wireless signal to surroundings in a broadcast manner. The wireless signal may be a beacon (beacon) frame, for example, a Wi-Fi beacon frame in a Wi-Fi protocol or a Bluetooth beacon frame in a Bluetooth protocol. Still with reference to the example in S602, when playing the advertisement of the mobile phone of the brand H, the electronic billboard may broadcast a beacon frame. The beacon frame carries the identifier of the electronic billboard and the orientation information of the electronic billboard, to indicate the position and the orientation of the electronic billboard. The beacon frame may further carry a tracking parameter of the advertisement of the mobile phone of the brand H that is being played by the electronic billboard, to determine an advertising campaign of the advertisement. The beacon frame may further carry an identifier of the advertisement of the mobile phone of the brand H that is being played by the electronic billboard.

For example, with reference to FIG. 6B, when playing the advertisement 1-1 of the mobile phone of the brand H, the outdoor billboard may broadcast a beacon frame 1. The beacon frame 1 carries an identifier, a position, and an orientation that are of the outdoor billboard. The beacon frame 1 may further carry a tracking parameter of the advertisement 1-1. The beacon frame 1 may further carry an identifier of the advertisement 1-1. The tracking parameter of the advertisement 1-1 is used to determine the advertising campaign of the advertisement 1-1. When playing the advertisement 1-2 of the mobile phone of the brand H, the elevator billboard may broadcast a beacon frame 2. The beacon frame 2 carries an identifier, a position, and an orientation that are of the elevator billboard. The beacon frame 2 may further carry a tracking parameter of the advertisement 1-2. The tracking parameter of the advertisement 1-2 is used to determine the advertising campaign of the advertisement 1-2. The beacon frame 2 may further carry an identifier of the advertisement 1-2.

S604: A core terminal receives the wireless signal, determines, based on the wireless signal, and a position and a movement direction of the core terminal, that an orientation of the core device relative to the advertising device meets a preset condition, and when determining that duration in which the orientation meets the preset condition is greater than preset exposure duration, determines that the advertisement 1 played by the advertising device is effectively exposed to a user holding the core terminal.

As described in the embodiment shown in FIG. 4, the core terminal is a mobile device that is heavily dependent on by the user and that is a personal device of the user. For example, the core terminal may be a mobile phone, or a wearable device such as a band, a smartwatch, or smart glasses. For another example, the core terminal may be a vehicle-mounted device.

When the advertising device broadcasts the wireless signal, if a terminal (for example, the core terminal) approaches the advertising device, the core terminal may receive (or detect) the wireless signal that is broadcast by the advertising device. Then, the core terminal may determine, based on the received wireless signal, the position and the movement direction of the core terminal, and the preset exposure duration, whether the advertisement 1 currently played by the advertising device is effectively exposed to the user holding the core terminal, in other words, may determine whether the user pays attention to or watches the advertisement 1 currently played by the advertising device. When determining that the advertisement 1 currently played by the advertising device is effectively exposed to the user holding the core terminal, the core terminal performs S605.

For example, with reference to the example in S603, when approaching the electronic billboard with the core terminal (for example, a mobile phone 1), a user 1 may detect the beacon frame that is broadcast by the electronic billboard. The mobile phone 1 may obtain a position and a movement direction of the mobile phone 1. Then, the mobile phone 1 determines, based on the position and the orientation of the electronic billboard that are indicated by the orientation information carried in the beacon frame, the obtained position and movement direction of the mobile phone 1, and the preset exposure duration, whether the advertisement of the mobile phone of the brand H that is played by the electronic billboard is effectively exposed to the user 1 holding the mobile phone 1. If the advertisement of the mobile phone of the brand H that is played by the electronic billboard is effectively exposed to the user 1 holding the mobile phone 1, S605 is performed.

Figure 6C:
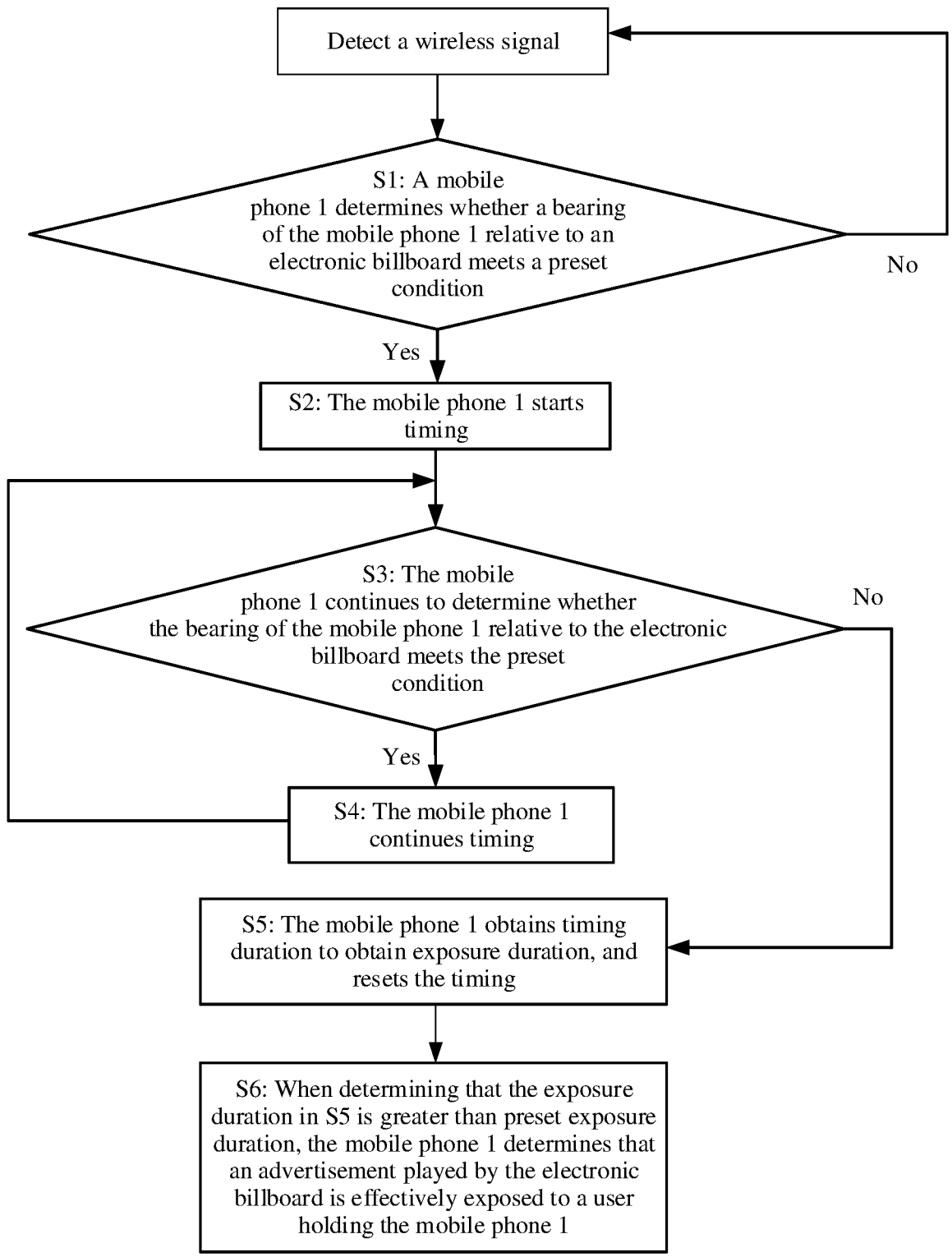
FIG. 6C is a schematic flowchart of determining effective exposure according to an embodiment of this application.

In an example, in this embodiment, as shown in FIG. 6C, that the mobile phone 1 determines, based on the position and the orientation of the electronic billboard that are indicated by the orientation information carried in the beacon frame, the obtained position and movement direction of the mobile phone 1, and the preset exposure duration, whether the advertisement played by the electronic billboard is effectively exposed to the user holding the mobile phone 1 may specifically include S1 to S6.

S1: The mobile phone 1 determines whether an orientation of the mobile phone 1 relative to the electronic billboard meets the preset condition.

That the orientation of the mobile phone 1 relative to the electronic billboard meets the preset condition may be specifically: a distance between the mobile phone 1 and the electronic billboard is within a preset distance range, the mobile phone 1 is located on a side of the orientation of the electronic billboard, and an included angle between the movement direction (or a movement track) of the mobile phone 1 and the orientation of the electronic billboard is within a preset included angle range.

After S1, if the orientation of the mobile phone 1 relative to the electronic billboard meets the preset condition, the mobile phone 1 may perform S2. If the orientation of the mobile phone 1 relative to the electronic billboard does not meet the preset condition, the mobile phone 1 may detect the wireless signal again.

S1 may include S1*a*, S1*b*, and S1*c*.

S1*a*: The mobile phone 1 determines, based on the position indicated by the orientation information carried in the beacon frame and the position of the mobile phone 1, whether the distance between the mobile phone 1 and the electronic billboard is within the preset distance range.

The beacon frame is a wireless signal that is from the electronic billboard and that is detected by the mobile phone 1. Specifically, the mobile phone 1 may collect the position of the mobile phone 1, and calculate a real-time distance between the position of the mobile phone 1 and the position of the electronic billboard based on the position of the mobile phone 1 and the position indicated by the orientation information in the beacon frame, in other words, calculate the real-time distance between the mobile phone 1 and the electronic billboard. Then, the mobile phone 1 may determine whether the real-time distance is within the preset distance range.

In this embodiment, it may be considered that, only within the preset distance range, the user can clearly watch the advertisement played by the electronic billboard. In other words, only when the mobile phone 1 is within the preset distance range, the user holding the mobile phone 1 may pay attention to the advertisement played by the electronic billboard. Therefore, if the distance between the mobile phone 1 and the electronic billboard is within the preset distance range, the advertisement played by the electronic billboard may be exposed to the user holding the mobile phone 1. In addition, it may be understood that, when the user holding the mobile phone 1 is located on the back of a display of the electronic billboard or the like, even if the distance between the mobile phone 1 and the electronic billboard is within the preset distance range, the user cannot watch the advertisement played by the electronic billboard. Therefore, after determining that the real-time distance is within the preset distance range in S1*a*, the mobile phone 1 may perform S1*b*.

If the distance between the mobile phone 1 and the electronic billboard is not within the preset distance range, the user of the mobile phone 1 may not clearly watch the advertisement played by the electronic billboard, and the electronic billboard does not generate exposure to the user holding the mobile phone 1. In this case, the mobile phone 1 may detect the wireless signal again.

S1*b*: The mobile phone 1 determines, based on the position and the orientation that are indicated by the orientation information carried in the beacon frame, and the position and the movement direction of the mobile phone 1, whether the mobile phone 1 is located on the side of the orientation of the electronic billboard.

Specifically, if the mobile phone 1 is located on the side of the orientation of the electronic billboard, it indicates that the user holding the mobile phone 1 is very likely to watch the advertisement played by the electronic billboard. In this case, the mobile phone 1 may perform S1*c*. Specifically, if the mobile phone 1 is located on another side of the orientation of the electronic billboard, it indicates that the user holding the mobile phone 1 cannot watch the advertisement played by the electronic billboard. In this case, the mobile phone 1 may detect the wireless signal again.

S1*c*: The mobile phone 1 determines whether the included angle between the movement direction of the mobile phone 1 and the orientation of the electronic billboard is within the preset included angle range.

It may be understood that, even if the distance between the mobile phone 1 and the electronic billboard is within the preset distance range, and the mobile phone 1 is located on the side of the orientation of the electronic billboard, when the included angle between the movement direction of the mobile phone 1 and the orientation of the electronic billboard is not within the preset included angle range, the user holding the mobile phone 1 may not necessarily watch the advertisement played by the electronic billboard. For example, (a) in FIG. 6D, (c) in FIG. 6D, (e) in FIG. 6D, (g) in FIG. 6D, and (i) in FIG. 6D each show a top view of the electronic billboard and a schematic diagram of the orientation of the electronic billboard and the movement direction of the mobile phone 1. A vector Z1 is used to indicate the orientation of the electronic billboard.

Figure 6D:
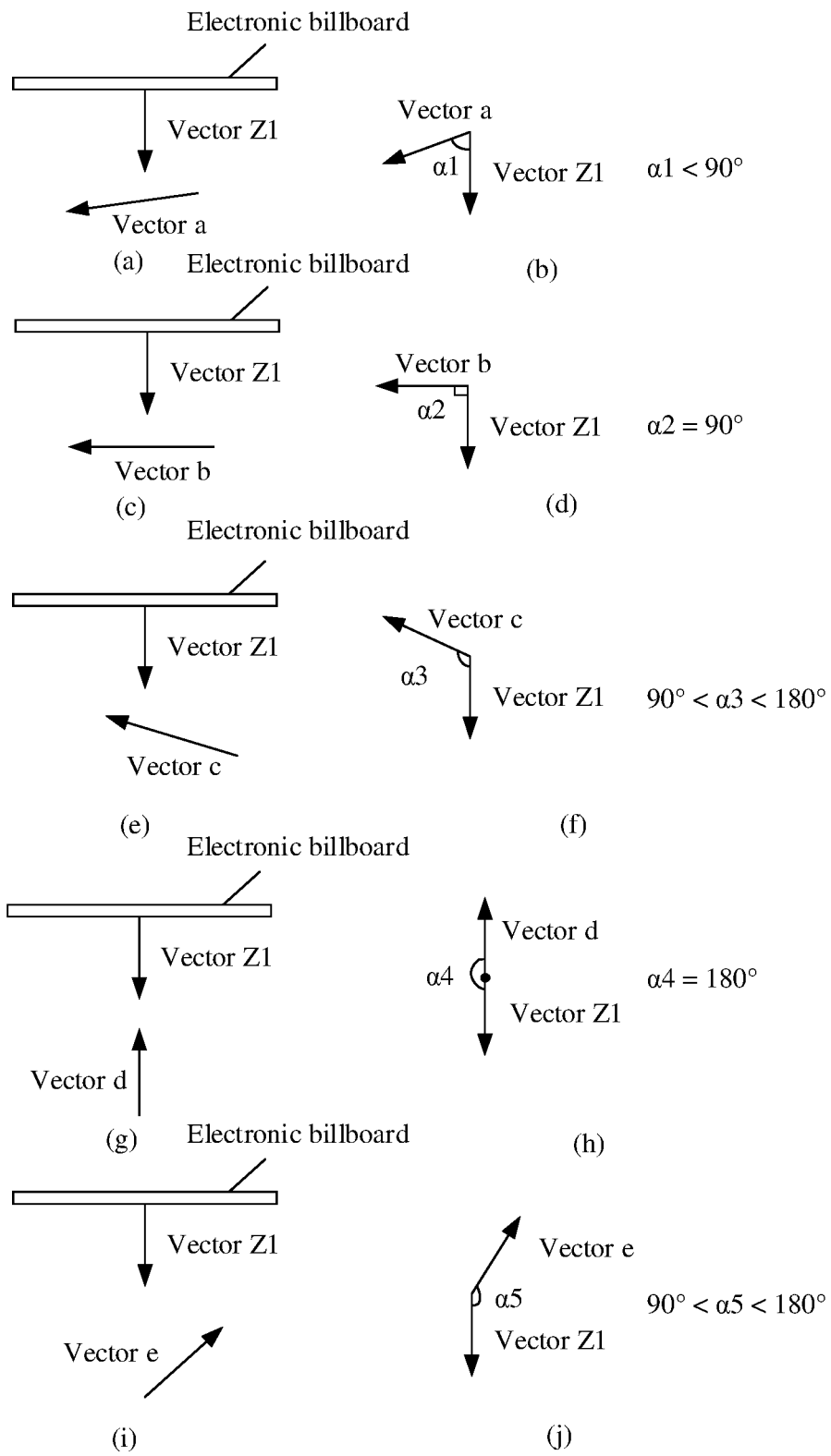
FIG. 6D is a schematic diagram of an orientation of an electronic billboard and a movement direction of a mobile phone according to an embodiment of this application.
Figure 7A:
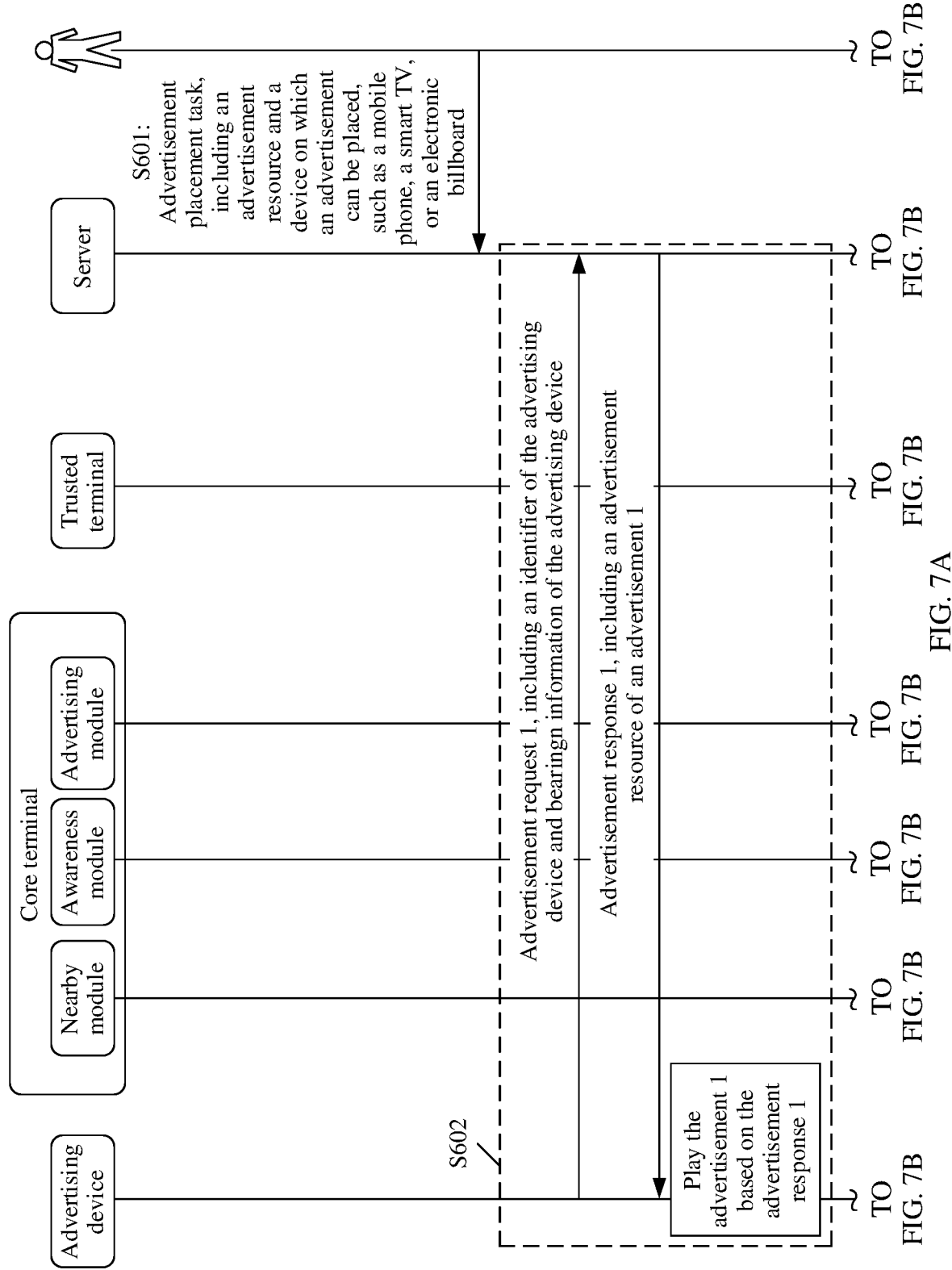
Figure 7C:
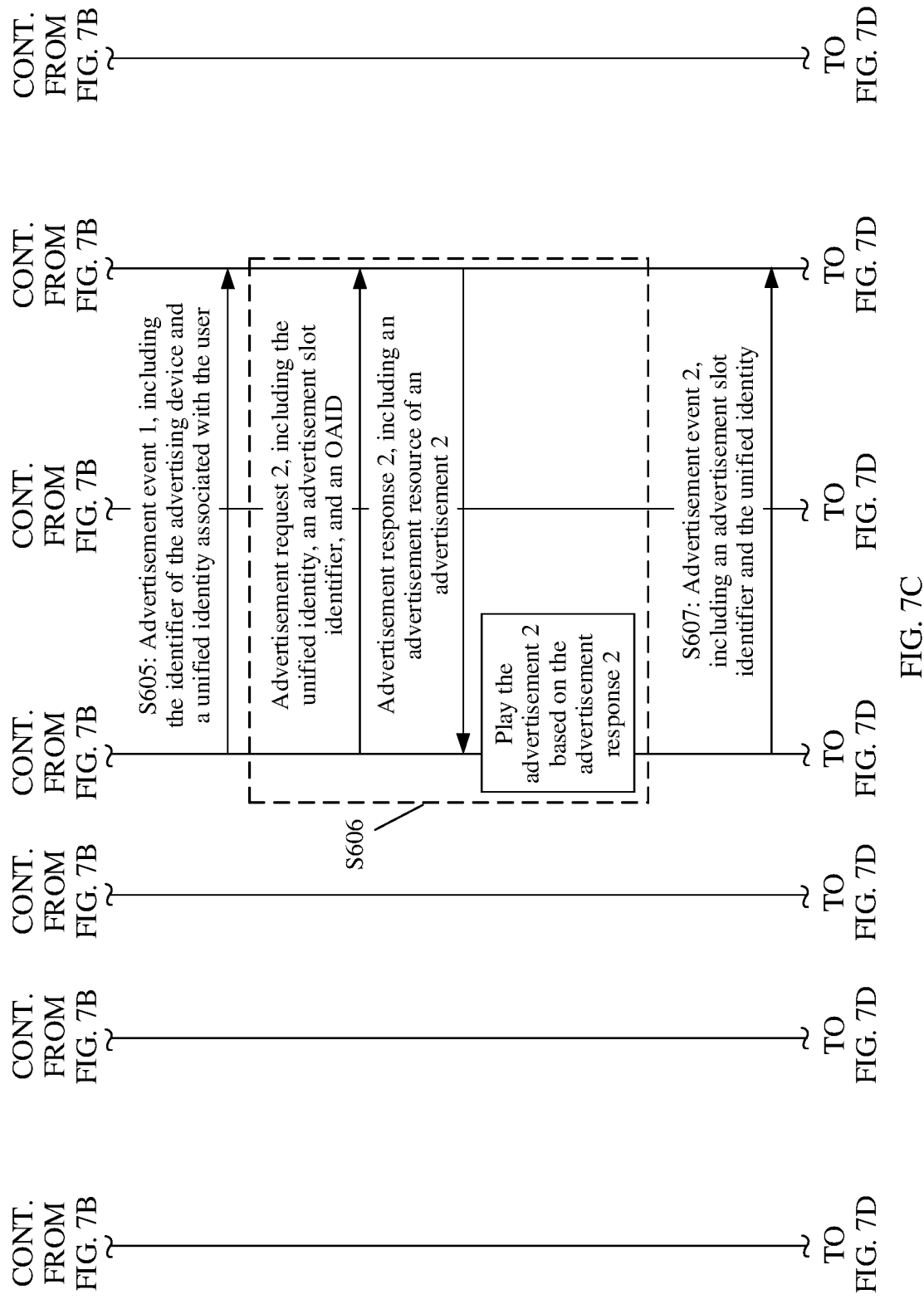
Figure 7D:
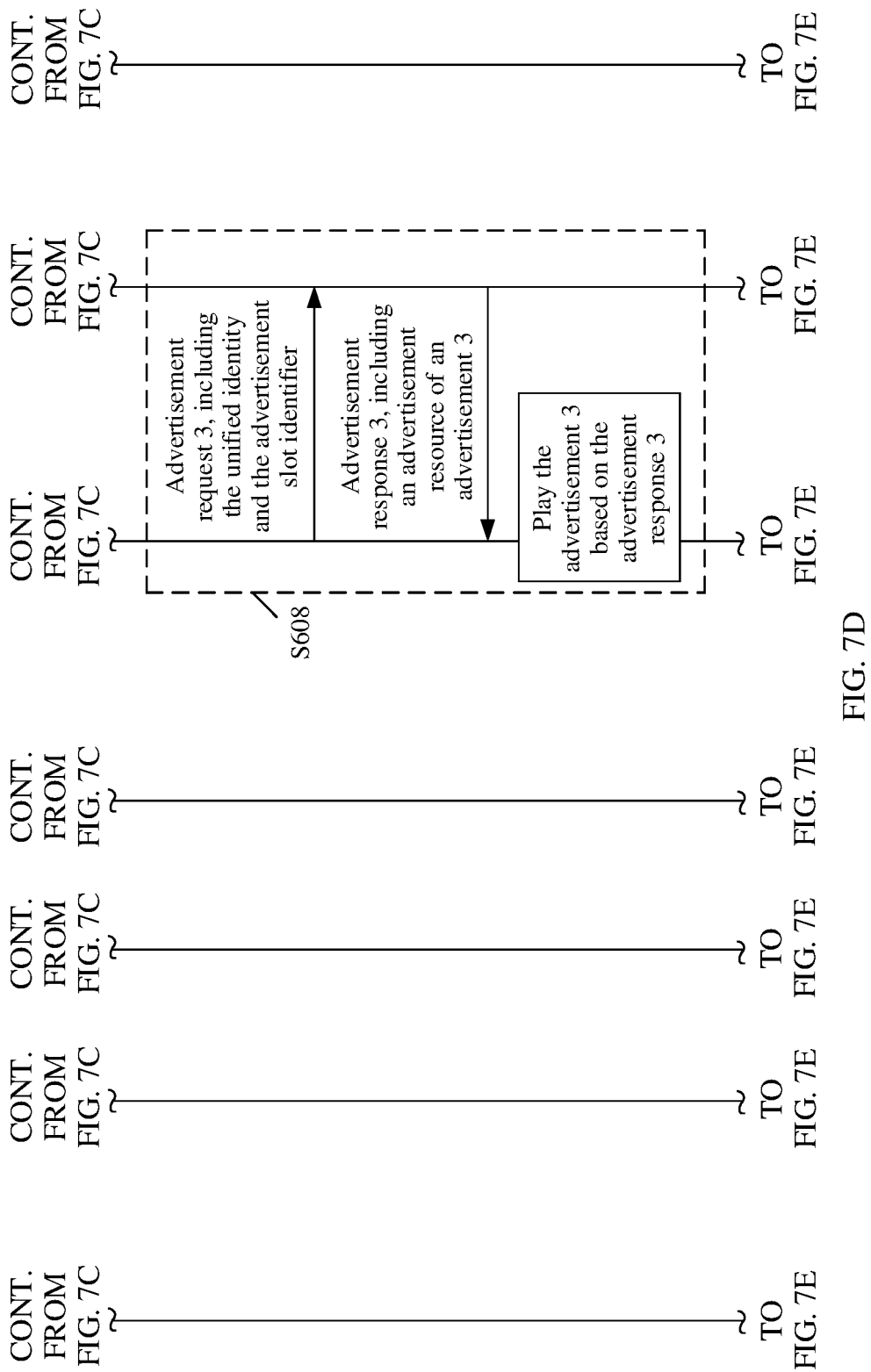
Figure 7E:
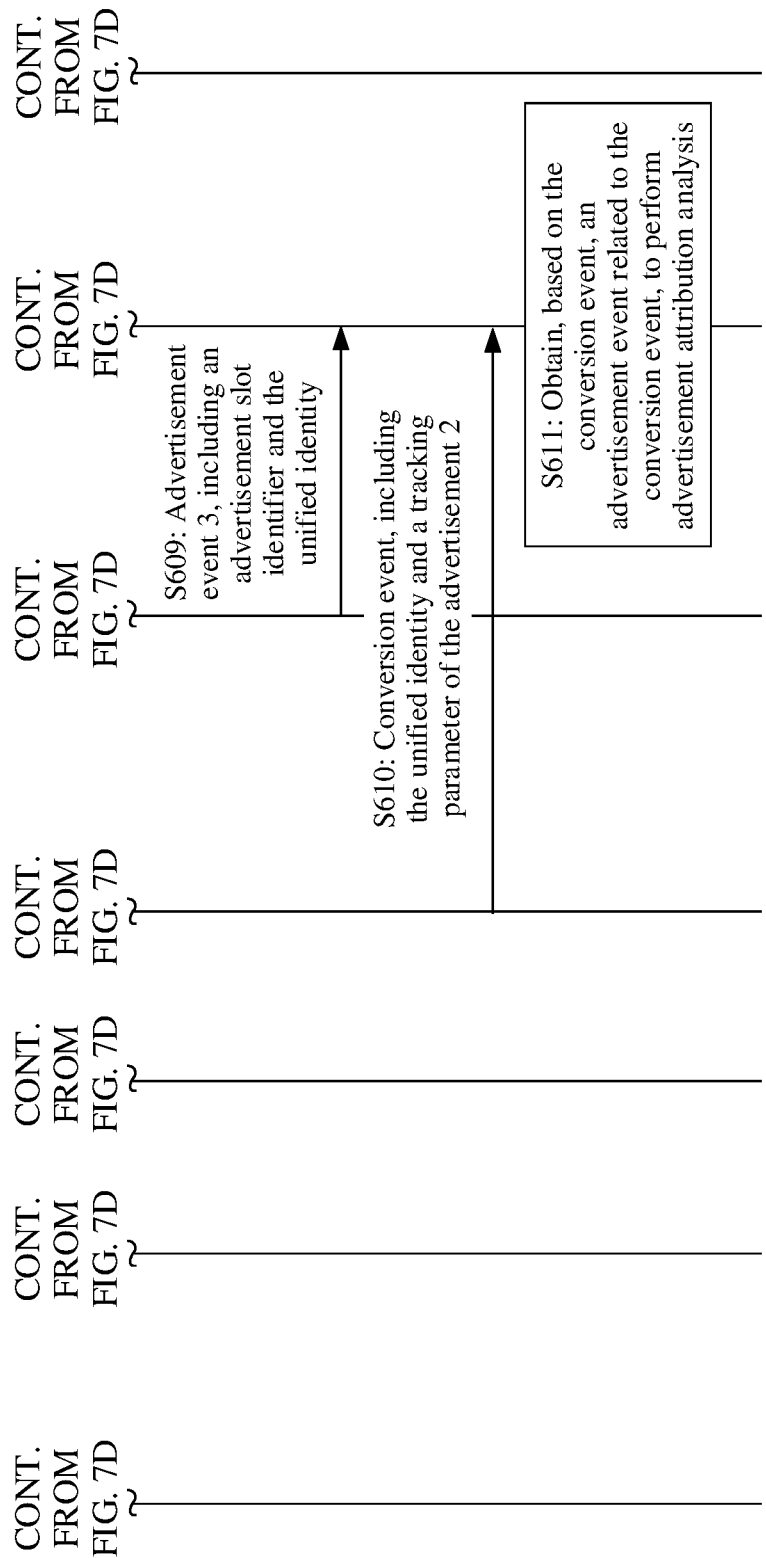

When the movement direction of the mobile phone 1 is a direction shown by a vector a shown in (a) in FIG. 6D, the included angle between the movement direction of the mobile phone 1 and the orientation of the electronic billboard is $\alpha 1$ shown in (b) in FIG. 6D, that is, an included angle between the vector a and the vector Z1. Herein, $\alpha 1 < 90°$. Usually, when the movement direction of the mobile phone 1 is the direction shown by the vector a shown in (a) in FIG. 6D, an orientation of the face of the user (that is, the user 1) holding the mobile phone is also the direction shown by the vector a. In this case, it is difficult for the user 1 to clearly and completely watch the advertisement played by the electronic billboard. Therefore, when the included angle between the movement direction of the mobile phone 1 and the orientation of the electronic billboard is less than 90°, the advertisement played by the electronic billboard is not effectively exposed to the user 1.

When the movement direction of the mobile phone 1 is a direction shown by a vector b shown in (c) in FIG. 6D, the included angle between the movement direction of the mobile phone 1 and the orientation of the electronic billboard is $\alpha 2$ shown in (d) in FIG. 6D, that is, an included angle between the vector b and the vector Z1. Herein, $\alpha 2 = 90°$. Usually, when the movement direction of the mobile phone is the direction shown by the vector b shown in (c) in FIG. 6D, an orientation of the face of the user 1 is also the direction shown by the vector b. In this case, it is difficult for the user 1 to clearly and completely watch the advertisement played by the electronic billboard. Therefore, when the included angle between the movement direction of the mobile phone 1 and the orientation of the electronic billboard is equal to 90°, the advertisement played by the electronic billboard is not effectively exposed to the user 1.

When the movement direction of the mobile phone 1 is a direction shown by a vector c shown in (e) in FIG. 6D, the included angle between the movement direction of the mobile phone 1 and the orientation of the electronic billboard is $\alpha 3$ shown in (f) in FIG. 6D, that is, an included angle between the vector c and the vector Z1. Herein, $90° < \alpha 3 < 1800$. Usually, when the movement direction of the mobile phone 1 is the direction shown by the vector c shown in (e) in FIG. 6D, an orientation of the face of the user 1 is also the direction shown by the vector c. In this case, the user 1 can clearly and completely watch the advertisement played by the electronic billboard. Therefore, when the included angle between the movement direction of the mobile phone 1 and the orientation of the electronic billboard is greater than 90° and less than 180°, the advertisement played by the electronic billboard may be effectively exposed to the user 1.

When the movement direction of the mobile phone 1 is a direction shown by a vector d shown in (g) in FIG. 6D, the included angle between the movement direction of the mobile phone 1 and the orientation of the electronic billboard is α4 shown in (h) in FIG. 6D, that is, an included angle between the vector d and the vector Z1. Herein, α4=180°. Usually, when the movement direction of the mobile phone 1 is the direction shown by the vector d shown in (g) in FIG. 6D, an orientation of the face of the user 1 is also the direction shown by the vector d. In this case, the user 1 can clearly and completely watch the advertisement played by the electronic billboard. Therefore, when the included angle between the movement direction of the mobile phone 1 and the orientation of the electronic billboard is equal to 1800, the advertisement played by the electronic billboard may be effectively exposed to the user 1.

When the movement direction of the mobile phone 1 is a direction shown by a vector e shown in (i) in FIG. 6D, the included angle between the movement direction of the mobile phone 1 and the orientation of the electronic billboard is α5 shown in (j) in FIG. 6D, that is, an included angle between the vector e and the vector Z1. Herein, 90°<α5<180°. Usually, when the movement direction of the mobile phone 1 is the direction shown by the vector e shown in (i) in FIG. 6D, an orientation of the face of the user 1 is also the direction shown by the vector e. In this case, the user 1 can clearly and completely watch the advertisement played by the electronic billboard. Therefore, when the included angle between the movement direction of the mobile phone 1 and the orientation of the electronic billboard is greater than 90° and less than 180°, the advertisement played by the electronic billboard may be effectively exposed to the user 1.

Therefore, after S1*c*, if the included angle between the movement direction of the mobile phone 1 and the orientation of the electronic billboard is within the preset included angle range, it indicates that the electronic billboard may generate exposure to the user holding the mobile phone 1. In this case, the mobile phone 1 may perform S2. If the included angle between the movement direction of the mobile phone 1 and the orientation of the electronic billboard is not within the preset included angle range, it indicates that the electronic billboard does not generate exposure to the user holding the mobile phone 1. In this case, the mobile phone 1 may detect the wireless signal again.

It should be noted that, in this embodiment of this application, when determining whether the orientation of the mobile phone 1 relative to the electronic billboard meets the preset condition, the mobile phone 1 may first determine whether the mobile phone 1 is located on the side of the orientation of the electronic billboard, or may first determine whether the distance between the mobile phone 1 and the electronic billboard is within the preset distance range, or may first determine whether the included angle between the movement direction of the mobile phone 1 and the orientation of the electronic billboard is within the preset included angle range. This is not limited in this embodiment of this application. In other words, a sequence of performing S1*a*, S1*b*, and S1*c* is not specifically limited in this embodiment. For example, in some embodiments, S1*a*, S1*b*, and S1*c* may be performed in a sequence of the foregoing examples. For another example, in some other embodiments, the mobile phone 1 may first perform S1*b*; after S1*b*, perform S1*a* if the mobile phone 1 is located on the side of the orientation of the electronic billboard; and after S1*a*, perform S1*c* if the distance between the mobile phone 1 and the electronic billboard is within the preset distance range.

S2: The mobile phone 1 starts timing.

The mobile phone 1 may include a timer. After S1, if the orientation of the mobile phone 1 relative to the electronic billboard meets the preset condition, the mobile phone 1 may start the timer. After the timer is started, the position and the movement direction of the mobile phone 1 may change, and the mobile phone 1 may continue to perform S3, to continue to determine whether the orientation of the mobile phone 1 relative to the electronic billboard meets the preset condition. In other words, after S2, the mobile phone 1 may perform S3.

S3: The mobile phone 1 continues to determine whether the orientation of the mobile phone 1 relative to the electronic billboard meets the preset condition.

It should be noted that, for specific implementation of S3, refer to the related descriptions in S1. Details are not described herein again in this embodiment of this application.

Specifically, after S3, if the orientation of the mobile phone 1 relative to the electronic billboard meets the preset condition, S4 is performed; or if the orientation of the mobile phone 1 relative to the electronic billboard does not meet the preset condition, S5 and S6 are performed.

S4: The mobile phone 1 continues timing, and performs S3.

It may be understood that, after S3, if the orientation of the mobile phone 1 relative to the electronic billboard meets the preset condition, it indicates that the user holding the mobile phone 1 is still paying attention to the advertisement played by the electronic billboard, in other words, the advertisement played by the electronic billboard is still exposed to the user holding the mobile phone 1. In this case, the timer may continue timing.

S5: The mobile phone 1 obtains timing duration to obtain exposure duration, and resets the timing.

It may be understood that, after S3, if the orientation of the mobile phone 1 relative to the electronic billboard does not meet the preset condition, it indicates that the user holding the mobile phone 1 does not pay attention to the advertisement played by the electronic billboard, in other words, the advertisement played by the electronic billboard is not exposed to the user holding the mobile phone 1. In this case, the mobile phone 1 may obtain the timing duration of the timer to obtain the exposure duration. In other words, the timing duration of the timer is the exposure duration.

S6: When determining that the exposure duration in S5 is greater than the preset exposure duration, the mobile phone 1 determines that the advertisement played by the electronic billboard is effectively exposed to the user holding the mobile phone 1.

When the mobile phone 1 determines that the exposure duration is greater than the preset exposure duration, it may be considered that the user continuously pays attention to the advertisement played by the electronic billboard, and therefore the mobile phone may determine that the advertisement played by the electronic billboard is effectively exposed to the user holding the mobile phone 1. Otherwise, the mobile phone 1 detects the wireless signal again. When the exposure duration in S5 is greater than the preset exposure duration, it may be considered that the advertisement played by the electronic billboard is effectively exposed to the user. Therefore, when the exposure duration is greater than the preset exposure duration, the exposure duration may also be used as effective exposure duration.

It should be noted that, in this embodiment, the preset exposure duration, the effective distance range, and the preset included angle range may be pre-configured in the core terminal (for example, the mobile phone 1), or may be added by the advertising device (for example, the electronic billboard) to the wireless signal and then delivered to the core terminal. This is not specifically limited in this embodiment.

S605: The core terminal sends an advertisement event 1 to the server, where the advertisement event 1 includes the identifier of the advertising device and a unified identity associated with the user.

The advertisement event 1 may further include the tracking parameter of the advertisement 1 that is being played by the advertising device, and the tracking parameter is used to determine the advertising campaign of the advertisement 1. A first advertisement event in this application may be the advertisement event 1 in this embodiment. A first advertisement in this application may be the advertisement 1 in this embodiment.

The advertisement event 1 may be an effective exposure event, and is used to indicate that the advertisement 1 played by the advertising device is effectively exposed to the user holding the core terminal. The unified identity is generated by the core terminal, corresponds to the user of the core terminal, and may be associated with the user of the core terminal, or is used to identify the user using the core terminal. The advertisement event 1 may further include one or more of the following information: the orientation information of the advertising device, the effective exposure duration, the identifier of the advertisement 1, and the like. The effective exposure duration is duration in which the foregoing preset condition is met, that is, duration in which the user pays attention to the advertisement played by the advertising device. In addition, when the unified identity is different from an OAID of the core terminal, the effective exposure event may further include the OAID.

For example, with reference to the example in S604, when the mobile phone 1 determines that the advertisement of the mobile phone of the brand H that is played by the electronic billboard is effectively exposed to the user 1 holding the mobile phone 1, the mobile phone 1 may send the advertisement event 1 that carries the identifier of the electronic billboard and the unified identity (for example, a unified identity 1) associated with the user 1 to the server. The advertisement event 1 may further include the tracking parameter of the advertisement of the mobile phone of the brand H that is being played by the electronic billboard, to determine the advertising campaign of the advertisement of the mobile phone of the brand H. For example, the unified identity 1 is different from the OAID of the mobile phone 1. The advertisement event 1 may further include the identifier of the electronic billboard, the orientation information used to indicate the position and the orientation of the electronic billboard, the OAID of the mobile phone 1, and the identifier of the advertisement of the mobile phone of the brand H.

For example, with reference to FIG. 6B, when the user 1 approaches the outdoor billboard with the mobile phone 1, the mobile phone 1 detects the beacon frame 1. In addition, the mobile phone 1 determines, based on the beacon frame 1, the position and the movement direction of the mobile phone, and the preset exposure duration, whether the advertisement 1-1 of the mobile phone of the brand H that is played by the outdoor billboard is effectively exposed to the user 1. When determining that the advertisement 1-1 is effectively exposed to the user 1, the mobile phone 1 reports an advertisement event that carries the identifier of the outdoor billboard and the unified identity 1 to the server. The advertisement event may further carry the tracking parameter used to determine the advertising campaign of the advertisement 1-1. When the user 1 approaches the elevator billboard with the mobile phone 1, the mobile phone 1 detects the beacon frame 2. In addition, the mobile phone 1 determines, based on the beacon frame 2, the position and the movement direction of the mobile phone, and the preset exposure duration, whether the advertisement 1-2 of the mobile phone of the brand H that is played by the elevator billboard is effectively exposed to the user 1. When determining that the advertisement 1-2 is effectively exposed to the user 1, the mobile phone 1 reports an advertisement event that carries the identifier of the elevator billboard and the unified identity 1 to the server. The advertisement event may further carry the tracking parameter used to determine the advertising campaign of the advertisement 1-2.

S606: The core terminal sends an advertisement request 2 to the server, receives an advertisement response 2 returned by the server, and plays an advertisement 2 based on the advertisement response 2.

The advertisement request 2 sent by the core terminal is used to request an advertisement resource from the server. In some embodiments, the advertisement request 2 may include an advertisement slot identifier. The advertisement request 2 may further include the foregoing unified identity. When the unified identity is different from an OAID, the advertisement request 2 may further include the OAID. The advertisement response 2 may include an advertisement resource provided by the server for the core terminal, for example, an advertisement resource of the advertisement 2. The advertisement slot identifier may be used to indicate information such as a device requesting an advertisement resource, an application, and an advertisement slot position. A second advertisement in this application may be the advertisement 2 in this embodiment. A first advertisement request in this application may be the advertisement request 2 in this embodiment. A first advertisement response in this application may be the advertisement response 2 in this embodiment.

Currently, a large proportion of commercial monetization models of many applications (such as a browser, a video application, and a shopping application) installed in the terminal (such as the core terminal) come from advertisements. Therefore, when the user uses the core terminal, for example, starts such an application of the core terminal, the core terminal may send the advertisement request 2 to the server.

In this embodiment, to provide a personalized advertisement service for the user, the server may store historical preferences of different users, to represent advertisements in which the users are interested. The historical preferences of the different users may be distinguished by using different identifiers. The identifier may be the foregoing unified identity. Alternatively, when the unified identity is different from an identifier in the conventional technology, the identifier may include only the unified identity, or may include the unified identity and another identifier in the conventional technology, for example, the OAID of the core terminal. For example, the identifier includes only the unified identity. Historical preferences of different users may be generated and updated based on an advertisement event that carries a corresponding unified identity and that is reported by each device. For example, when receiving the advertisement event 1 in S605, the server may update a historical preference of a corresponding user based on the unified identity carried in the advertisement event 1, so that an updated historical preference of the user indicates that the user is interested in the advertisement 1. In this way, the advertisement watched by the user on the advertising device may be continuously exposed on a personal device of the user. In addition, an example in which historical preferences of different users are distinguished by using different unified identities is still used. To enable the server to return an advertisement conforming to the historical preference of the user to the core terminal, the advertisement request 2 may carry the advertisement slot identifier and the unified identity associated with the user holding the core terminal. After receiving the advertisement request 2, the server may determine, based on the unified identity included in the advertisement request 2, the historical preference of the user holding the core terminal. Then, the server may return a corresponding advertisement response to the core terminal based on the historical preference of the user. An advertisement corresponding to the advertisement resource carried in the advertisement response, for example, the advertisement 2, conforms to the historical preference of the user. For example, the advertisement 2 may be an advertisement having a same advertising campaign as the advertisement 1 played by the advertising device in S602. After receiving the advertisement response 2, the core terminal may play the advertisement 2 based on the advertisement response 2. In this way, the advertisement watched by the user on the advertising device may be continuously exposed on the personal device of the user. It should be noted that, when the historical preference of the user that is stored in the server indicates that the user is interested in a plurality of advertisements, the server may perform click-through rate (click through rate, CTR) prediction and bidding ranking based on matching with a historical exposure situation of each advertisement and a placement targeting condition of the advertisement, so as to select one or more advertisements from the plurality of advertisements in which the user is interested and feed back the one or more advertisements to the core terminal.

For example, with reference to the example in S605, when the user 1 uses a browser of the mobile phone 1, the mobile phone 1 may send the advertisement request 2 to the server. The advertisement request 2 carries the unified identity 1 and the advertisement slot identifier (for example, a splash position of the browser). After receiving the advertisement request 2, the server may determine a historical preference of the user 1 based on the unified identity 1 carried in the advertisement request 2. For example, the historical preference of the user 1 indicates that the user 1 is interested in the advertisement of the mobile phone of the brand H. The server performs CTR prediction and bidding ranking based on matching between the historical preference of the user 1 and each of a historical advertisement exposure situation of the mobile phone of the brand H and a brand advertisement placement targeting condition, and decides whether to continue to expose a related advertisement of the mobile phone of the brand H in a splash advertisement slot of the browser of the mobile phone 1. If the server determines to continue to expose the related advertisement of the mobile phone of the brand H in the splash advertisement slot of the browser of the mobile phone 1, the server may return the advertisement response 2 to the mobile phone 1. The advertisement response 2 includes the related advertisement of the mobile phone of the brand H, for example, the advertisement resource of the advertisement 2. Then, the mobile phone 1 plays the advertisement 2 in the splash advertisement slot of the browser. Similarly, when the user 1 uses another application of the mobile phone 1 such as a video application or a shopping application, the mobile phone 1 also sends an advertisement request that carries the unified identity such as the unified identity 1 associated with the user 1 to the server. In this way, the server may also determine the historical preference of the user 1 based on the unified identity 1 carried in the advertisement request, so as to return the related advertisement of the mobile phone of the brand H.

For example, as shown in FIG. 6B, the mobile phone 1 sends the advertisement request 2 to the server. The server returns the advertisement 2 of the mobile phone of the brand H to the mobile phone 1 based on the advertisement request 2. The mobile phone 1 plays the advertisement 2 of the mobile phone of the brand H. The advertisement 2, the advertisement 1-1, and the advertisement 1-2 have a same advertising campaign.

S607: The core terminal sends an advertisement event 2 to the server, where the advertisement event 2 includes an advertisement slot identifier (for example, a first advertisement slot identifier in this application) and the unified identity.

The advertisement event 2 may further include the tracking parameter of the advertisement 2 that is being played by the core terminal, to determine the advertising campaign of the advertisement 2. The advertisement event 2 is used to indicate that the advertisement 2 played by the core terminal is exposed to the user holding the core terminal or the user holding the core terminal clicks the advertisement. A second advertisement event in this application may be the advertisement event 2 in this embodiment. The tracking parameter of the advertisement 2 in this embodiment may be a first tracking parameter in this application. The advertisement event 2 may further include an identifier of the advertisement 2, and the like. The advertisement slot identifier includes information used to identify the core terminal. In addition, when the unified identity is different from an OAID, the advertisement event 2 may further include the OAID. It should be noted that, in this embodiment, that the device such as the foregoing core terminal plays the advertisement 2 means that the advertisement 2 is exposed to the user. Only when the user watches the advertisement played by the device, it may be considered that the advertisement played by the device is effectively exposed to the user.

For example, with reference to the example in S606, when the mobile phone 1 of the user 1 displays the advertisement 2, the mobile phone 1 may send the advertisement event 2 that carries the advertisement slot identifier and the unified identity (for example, the unified identity 1) associated with the user 1 to the server. The advertisement event 2 may further carry the tracking parameter used to determine the advertising campaign of the advertisement 2. For example, the unified identity 1 is different from the OAID of the mobile phone 1. The advertisement event 2 may further include the identifier of the advertisement 2 and the OAID of the mobile phone 1. The advertisement event 2 is used to indicate that the advertisement 2 played by the mobile phone 1 is exposed to the user 1 or the user 1 clicks the advertisement 2. For example, when the user 1 performs a click-to-skip operation or a click-to-close operation on the advertisement 2 displayed on the mobile phone 1, the advertisement event 2 sent by the mobile phone 1 to the server may be used to indicate that the advertisement 2 played by the mobile phone 1 is exposed to the user 1. When the user 1 performs a click-to-open operation on the advertisement 2 displayed on the mobile phone 1, the advertisement event 2 sent by the mobile phone 1 to the server may be used to indicate that the user 1 clicks the advertisement 2 displayed on the mobile phone 1.

For example, with reference to FIG. 6B, when the mobile phone 1 plays the advertisement 2 of the mobile phone of the brand H, the mobile phone 1 reports an advertisement event that carries the advertisement slot identifier and the unified identity 1 to the server. The advertisement event may further carry the tracking parameter used to determine the advertising campaign of the advertisement 2. The advertisement event is used to indicate that the advertisement 2 of the mobile phone of the brand H that is played by the mobile phone 1 is exposed to the user 1 or the user 1 clicks the advertisement 2 of the mobile phone of the brand H.

For another device of the user, for example, a trusted terminal, to enable the another device to implement cross-device advertisement attribution analysis with the advertising device and the core terminal, the method provided in this embodiment of this application may further include S608 and S609.

S608: The trusted terminal sends an advertisement request 3 to the server, receives an advertisement response 3 returned by the server, and plays an advertisement 3 based on the advertisement response 3.

As described in the embodiment shown in FIG. 4, the trusted terminal is a user-trusted device that can perform service interaction with the core terminal. In an example, the trusted terminal may be a smart home device such as a smart TV or a smart speaker, or the trusted terminal may be a vehicle-mounted device or the like. A second advertisement request in this application may be the advertisement request 3 in this embodiment. A second advertisement response in this application may be the advertisement response 3 in this embodiment. A third advertisement in this application may be the advertisement 3 in this embodiment.

The advertisement request 3 sent by the trusted terminal is used to request an advertisement resource from the server. In some embodiments, the advertisement request 3 may include an advertisement slot identifier, and the advertisement request 3 may further include the unified identity. The advertisement slot identifier may be used to indicate information such as a device requesting an advertisement resource, an application, and an advertisement slot position. The advertisement response 2 may include an advertisement resource provided by the server for the trusted terminal, for example, an advertisement resource of the advertisement 3.

It should be noted that the unified identity carried in the advertisement request 3 may be sent by the core terminal to the trusted terminal and stored by the trusted terminal. For example, the core terminal is a mobile phone, and the trusted terminal is a smart home device such as a smart TV or a smart speaker. The user manually configures the mobile phone and the smart home device to access a wireless network provided by a relay device (for example, a home gateway) at home. Alternatively, when the mobile phone has accessed the wireless network provided by the home gateway but has not accessed the wireless network currently, and the smart home device has accessed the wireless network provided by the home gateway currently, after the user returns home, if a wireless function of the mobile phone is enabled, the mobile phone may automatically access the wireless network provided by the home gateway. In a process in which the mobile phone accesses the wireless network provided by the home gateway or after the mobile phone successfully accesses the wireless network provided by the home gateway, the mobile phone may send the unified identity generated by the mobile phone to the home gateway. Then, the home gateway sends the unified identity to the smart home device, so that the smart home device stores the unified identity.

For another example, the core terminal is a mobile phone, and the trusted terminal is a vehicle-mounted device. After entering a vehicle, the user may manually configure the mobile phone to establish a connection to the vehicle-mounted device. Alternatively, when the mobile phone has established a connection to the vehicle-mounted device, after the user enters the vehicle, and wireless functions (such as Bluetooth functions or Wi-Fi functions) of the mobile phone and the vehicle-mounted device are enabled, the mobile phone may automatically establish a connection to the vehicle-mounted device. In a process in which the mobile phone establishes a connection to the vehicle-mounted device or after the mobile phone successfully establishes a connection to the vehicle-mounted device, the mobile phone may send the unified identity generated by the mobile phone to the vehicle-mounted device, so that the vehicle-mounted device stores the unified identity.

When the user uses the trusted terminal, for example, turns on the smart TV or turns on the vehicle-mounted device, the trusted terminal may send the advertisement request 3 to the server. In this embodiment, with reference to the descriptions in S606, an example in which historical preferences of different users are distinguished by using different unified identities is used. To enable the server to return an advertisement conforming to the historical preference of the user to the trusted terminal, the advertisement request 3 may carry the advertisement slot identifier and the unified identity stored in the trusted terminal. After receiving the advertisement request 3, the server may determine, based on the unified identity included in the advertisement request 3, the historical preference of the user corresponding to the unified identity. Then, the server may return a corresponding advertisement response to the trusted terminal based on the historical preference of the user. An advertisement corresponding to the advertisement resource carried in the advertisement response, for example, the advertisement 3, conforms to the historical preference of the user. For example, the advertisement 3, the advertisement 1 played by the advertising device in S602, and the advertisement 2 played by the core terminal in S606 have a same advertising campaign. After receiving the advertisement response 3, the trusted terminal may play the advertisement 3 based on the advertisement response 3.

For example, with reference to the example in S606, the trusted terminal is a smart TV. The mobile phone 1 has accessed the wireless network provided by the home gateway but has not accessed the wireless network currently (for example, the user 1 leaves home), and the smart TV has accessed the wireless network provided by the home gateway currently. After the user 1 returns home, when the wireless function of the mobile phone 1 is enabled, the mobile phone 1 automatically accesses the wireless network provided by the home gateway. In a process in which the mobile phone 1 accesses the wireless network provided by the home gateway or after the mobile phone successfully accesses the wireless network provided by the home gateway, the mobile phone 1 may send the unified identity 1 to the home gateway. The home gateway sends the unified identity 1 to the smart TV. After receiving the unified identity 1, the smart TV stores the unified identity 1. After the user 1 turns on the smart TV, the smart TV may send the advertisement request 3 to the server. The advertisement request 3 carries the unified identity 1 and the advertisement slot identifier (for example, a home page of the TV). After receiving the advertisement request 3, the server may determine a historical preference of the user 1 based on the unified identity 1 carried in the advertisement request 3. For example, the historical preference of the user 1 indicates that the user 1 is interested in the advertisement of the mobile phone of the brand H. The server performs CTR prediction and bidding ranking based on matching between the historical preference of the user 1 and each of a historical advertisement exposure situation of the mobile phone of the brand H and a brand advertisement placement targeting condition, and decides whether to continue to expose a related advertisement of the mobile phone of the brand H on the home page of the smart TV. If the server determines to continue to expose the related advertisement of the mobile phone of the brand H on the home page of the smart TV, the server may return the advertisement response 3 to the smart TV. The advertisement response 3 includes the related advertisement of the mobile phone of the brand H, for example, the advertisement resource of the advertisement 3. Then, the smart TV plays the advertisement 3 on the home page.

For example, as shown in FIG. 6B, the smart TV sends the advertisement request 3 to the server. The server returns the advertisement 3 of the mobile phone of the brand H to the smart TV based on the advertisement request 3. The mobile phone 1 plays the advertisement 3 of the mobile phone of the brand H. The advertisement 3, the advertisement 1-1, the advertisement 1-2, and the advertisement 2 have a same advertising campaign.

S609: The trusted terminal sends an advertisement event 3 to the server, where the advertisement event 3 includes an advertisement slot identifier (for example, a second advertisement slot identifier in this application) and the unified identity.

The advertisement event 3 may further include a tracking parameter of the advertisement 3 that is being played by the trusted terminal. The tracking parameter of the advertisement 3 is used to determine the advertising campaign of the advertisement 3. The advertisement event 3 is used to indicate that the advertisement 3 played by the trusted terminal is exposed to the user or the user clicks the advertisement. The advertisement event 3 may further include an identifier of the advertisement 3, and the like. A third advertisement event in this application may be the advertisement event 3 in this embodiment. A third tracking parameter in this application may be the tracking parameter of the advertisement 3 in this embodiment.

For example, with reference to the example in S608, when the smart TV displays the advertisement 3, the smart TV may send the advertisement event 3 that carries the advertisement slot identifier and the unified identity (for example, the unified identity 1) associated with the user 1 to the server. The advertisement event 3 further carries the tracking parameter used to determine the advertising campaign of the advertisement 3. The advertisement event 3 may further include the identifier of the advertisement 3. The advertisement slot identifier includes information used to identify the trusted terminal. The advertisement event 3 is used to indicate that the advertisement 3 played by the smart TV is exposed to the user 1 or the user 1 clicks the advertisement 3. For example, when the user 1 performs a click-to-skip operation or a click-to-close operation on the advertisement 3 displayed on the smart TV, the advertisement event 3 sent by the smart TV to the server may be used to indicate that the advertisement 3 played by the smart TV is exposed to the user 1. When the user 1 performs a click-to-open operation on the advertisement 3 displayed on the smart TV, the advertisement event 3 sent by the smart TV to the server may be used to indicate that the user 1 clicks the advertisement 3 displayed on the smart TV.

For example, with reference to FIG. 6B, when the smart TV plays the advertisement 3 of the mobile phone of the brand H, the mobile phone 1 reports an advertisement event that carries the advertisement slot identifier and the unified identity 1 to the server. The advertisement event may further carry the tracking parameter used to determine the advertising campaign of the advertisement 3. The advertisement event is used to indicate that the advertisement 3 of the mobile phone of the brand H that is played by the smart TV is exposed to the user 1 or the user 1 clicks the advertisement 3 of the mobile phone of the brand H.

After the user performs, on the terminal such as the core terminal or the trusted terminal, behavior conversion (that is, a conversion operation) such as registration, adding to a shopping cart, or order placing and payment on a product displayed by a played advertisement, the terminal may send a corresponding conversion event to the server. For example, with reference to FIG. 6A-1 to FIG. 6A-3, the user performs a conversion operation on the core terminal. When the user performs a conversion operation on the advertisement 2 played by the core terminal, the core terminal may send a conversion event to the server. The conversion event carries the unified identity and the tracking parameter of the advertisement 2.

S610: The server receives the conversion event from the core terminal, where the conversion event includes the unified identity and the tracking parameter of the advertisement 2.

S611: The server obtains, based on the unified identity and the tracking parameter of the advertisement 2 that are included in the conversion event, an advertisement event related to the conversion event, so as to perform advertisement attribution analysis.

After receiving the conversion event, the server may obtain, based on the unified identity and the tracking parameter of the advertisement 2 that are carried in the conversion event, the advertisement event related to the conversion event. The advertisement event related to the conversion event means an advertisement event that includes the unified identity and that corresponds to an advertisement having a same advertising campaign as the advertisement 2. In this way, the server may obtain all advertisement events related to the conversion event or the user behavior conversion, for example, the advertisement event 1, the advertisement event 2, and the advertisement event 3. Then, the server may perform advertisement attribution analysis based on each advertisement event and a conversion attribution model, to determine degrees of contribution of advertisements played by devices in each advertisement placement link, that is, the advertising device, the core terminal, and the trusted terminal, to the user behavior conversion. In this embodiment, the conversion attribution model may be one of the following models: a linear attribution model, a last click (last click) attribution model, a U-shaped attribution model, and the like. Contribution degrees of each link determined by using different conversion attribution models may be different. In this embodiment, a conversion attribution model selected to perform advertisement attribution analysis is not limited herein, and may be selected according to a requirement of an actual scenario.

For example, after receiving the conversion event, the server may determine the advertising campaign of the advertisement 1 corresponding to the advertisement event 1, the advertising campaign of the advertisement 2 corresponding to the advertisement event 2, and the advertising campaign of the advertisement 3 corresponding to the advertisement event 3. Then, the server determines, based on the unified identity in the conversion event, that the unified identity included in the advertisement event 1 is the same as the unified identity in the conversion event, the unified identity included in the advertisement event 2 is the same as the unified identity in the conversion event, and the unified identity included in the advertisement event 3 is the same as the unified identity in the conversion event. The server determines, based on the tracking parameter in the conversion event, that the advertising campaign of the advertisement 1 corresponding to the advertisement event 1 is the same as the advertising campaign indicated by the tracking parameter in the conversion event, the advertising campaign of the advertisement 2 corresponding to the advertisement event 2 is the same as the advertising campaign indicated by the tracking parameter in the conversion event, and the advertising campaign of the advertisement 3 corresponding to the advertisement event 3 is the same as the advertising campaign indicated by the tracking parameter in the conversion event. In this way, the server may determine that the advertisement event 1, the advertisement event 2, and the advertisement event 3 are related to the conversion event. The server may determine, based on the advertisement event 1, the advertisement event 2, and the advertisement event 3, a degree of contribution of the advertisement 1 played by the advertising device to the user behavior conversion, a degree of contribution of the advertisement 2 played by the core terminal to the user behavior conversion, and a degree of contribution of the advertisement 3 played by the trusted terminal to the user behavior conversion.

This embodiment provides two implementations of determining an advertising campaign of an advertisement. When a server configured to provide an advertisement resource and an advertising platform is the same as a server configured to perform attribution analysis, the server usually stores a correspondence between an advertisement and an advertising campaign. In some embodiments, when a device reports an advertisement event to the server, to reduce traffic overheads of the device, the advertisement event usually does not carry a tracking parameter of an advertisement corresponding to the advertisement event. After receiving the advertisement event, the server may determine, based on the correspondence between an advertisement and an advertising campaign that is stored by the server, an advertising campaign of an advertisement corresponding to each advertisement event. For example, that the server determines the advertising campaign campaign of the advertisement 1 corresponding to the advertisement event 1 may specifically include: The server determines the advertising campaign of the advertisement 1 based on the correspondence and the advertisement 1 corresponding to the advertisement event 1. Similarly, that the server determines the advertising campaign campaign of the advertisement 2 corresponding to the advertisement event 2 may specifically include: The server determines the advertising campaign of the advertisement 2 based on the correspondence and the advertisement 2 corresponding to the advertisement event 2. That the server determines the advertising campaign campaign of the advertisement 3 corresponding to the advertisement event 3 may specifically include: The server determines the advertising campaign of the advertisement 3 based on the correspondence and the advertisement 3 corresponding to the advertisement event 3.

In some other embodiments, when reporting an advertisement event, the device may add a tracking parameter of an advertisement corresponding to the advertisement event. After receiving the advertisement event, according to a preset rule, the server may select to use the tracking parameter carried in the advertisement event or the correspondence that is stored by the server, to determine an advertising campaign of the advertisement corresponding to the advertisement event. For example, the preset rule is: when an advertisement event carries a tracking parameter, preferentially selecting to use the tracking parameter to determine an advertising campaign of an advertisement corresponding to the advertisement event. In this way, after receiving the advertisement event, the server may determine the advertising campaign of the advertisement based on the tracking parameter of the advertisement that is carried in the advertisement event. For example, that the server determines the advertising campaign campaign of the advertisement 1 corresponding to the advertisement event 1 may specifically include: The server determines the advertising campaign of the advertisement 1 based on the tracking parameter of the advertisement 1 in the advertisement event 1. Similarly, when the advertisement event 2 carries the tracking parameter of the advertisement 2, that the server determines the advertising campaign campaign of the advertisement 2 corresponding to the advertisement event 2 may specifically include: The server determines the advertising campaign of the advertisement 2 based on the tracking parameter of the advertisement 2 in the advertisement event 2. When the advertisement event 3 carries the tracking parameter of the advertisement 3, that the server determines the advertising campaign campaign of the advertisement 3 corresponding to the advertisement event 3 may specifically include: The server determines the advertising campaign of the advertisement 3 based on the tracking parameter of the advertisement 3 in the advertisement event 3.

For example, with reference to the example shown in FIG. 6B, the user 1 purchases the mobile phone of the brand H in the shopping application on the mobile phone 1. After the user 1 places an order on the mobile phone 1 for payment, the mobile phone 1 may send a conversion event to the server. The conversion event includes the unified identity 1 and the tracking parameter of the advertisement 2 displayed on the mobile phone 1. After receiving the conversion event, the server may obtain, based on the unified identity 1 and the tracking parameter of the advertisement 2 that are carried in the conversion event, an advertisement event related to behavior conversion of the user 1 or the conversion event, in other words, obtain all advertisement events including the unified identity and corresponding advertisements having a same advertising campaign as the advertisement 2, and perform advertisement attribution analysis based on the conversion attribution model, to determine degrees of contribution of advertisements played by devices in each advertisement placement link, that is, the outdoor billboard, the elevator billboard, the mobile phone 1, and the smart TV, to the behavior conversion of the user 1, so as to accurately attribute the behavior conversion of the user 1 to each link. Average contribution is used as an example. The server determines that the degrees of contribution of the advertisements played by the outdoor billboard, the elevator billboard, the mobile phone 1, and the smart TV to the behavior conversion of the user 1 each are 25%. Another example in which a later advertisement exposure time indicates higher contribution is used. A time sequence in which the user sees advertisements of the mobile phone of the brand H on the devices from morning to night is as follows: the outdoor billboard, the elevator billboard, the smart TV, and the mobile phone. It may be understood that, if an advertisement is first exposed on a device, the server first receives an advertisement event that the device exposes the advertisement. Therefore, the server may determine, in an advertisement event receiving sequence, that the degree of contribution of the advertisement played by the outdoor billboard to the behavior conversion of the user 1 is 12.5%, the degree of contribution of the advertisement played by the elevator billboard to the behavior conversion of the user 1 is 12.5%, the degree of contribution of the advertisement played by the smart TV to the behavior conversion of the user 1 is 25%, and the degree of contribution of the advertisement played by the mobile phone 1 to the behavior conversion of the user 1 is 50%.

In some embodiments of this application, to implement the foregoing functions, the core terminal includes corresponding hardware structures and/or software modules for performing the functions. In an example, the core terminal may include a nearby module, an awareness module, and an advertising module.

The nearby module may also be referred to as a nearby engine (nearby nearby engine), the awareness module may also be referred to as an awareness engine (awareness awareness engine), and the advertising module may also be referred to as an advertising engine (ads advertising engine). The core terminal may implement functions of the nearby engine, the awareness engine, and the advertising engine through a combination of software and hardware. For example, the core terminal may create a service process 1, and the service process 1 may invoke a wireless communications module (for example, a Bluetooth module or a Wi-Fi module) to implement the function of the nearby engine. For another example, the core terminal may create a service process 2, and the service process 2 may invoke a positioning module (for example, a GPS positioning module) to implement the function of the awareness engine. For another example, the core terminal may create a service process 3, and the service process 3 may invoke a processor and a communications module (for example, a wireless communications module or a mobile communications module) to implement the function of the advertising engine.

In this embodiment, the nearby module, the awareness module, and the advertising module may cooperate to implement S604, S605, S606, S607, and S610 in the foregoing method embodiment. For example, with reference to FIG. 6A-1 to FIG. 6A-3, as shown in FIG. 7A to FIG. 7E, S604 may specifically include: After the core terminal approaches the advertising device, the nearby module of the core terminal may detect the wireless signal that is broadcast by the advertising device. The nearby module reports the detected wireless signal to the advertising module of the core terminal. In addition, the advertising module subscribes to the position (for example, longitude and latitude) and the movement direction of the core terminal from the awareness module of the core terminal, and the awareness module detects the position and the movement direction of the core terminal in real time, and reports the position and the movement direction to the advertising module in real time. Then, the advertising module may determine, based on the wireless signal sent by the nearby module, the position and the movement direction of the core terminal that are reported by the awareness module, and the preset exposure duration, whether the advertisement 1 currently played by the advertising device is effectively exposed to the user holding the core terminal. When the advertising module determines that the advertisement 1 currently played by the advertising device is effectively exposed to the user holding the core terminal, S605 is performed, in other words, the advertising module reports the advertisement event 1 to the server. In addition, when the user uses an application of the core terminal, S606 may be performed, in other words, the advertising module sends the advertisement request 2 to the server, receives the advertisement response 2 sent by the server, plays the advertisement 2 based on the advertisement response 2; and then S607 is performed, in other words, the advertising module sends the advertisement event 2 to the server. After the user performs behavior conversion in the core terminal, S610 may be performed, in other words, the advertising module sends the conversion event to the server. For specific descriptions of S604, S605, S606, S607, and S610, and specific descriptions of other steps in FIG. 7A to FIG. 7E, refer to specific descriptions of corresponding steps in the embodiment shown in FIG. 6A-1 to FIG. 6A-3. Details are not described herein again.

According to the foregoing technical solution, the advertising device, for example, the electronic billboard, broadcasts a wireless signal, so that a surrounding personal device of the user, for example, the core terminal, can detect the wireless signal. In addition, after determining, based on the wireless signal, that the user pays attention to an advertisement played by the advertising device, the core terminal reports an advertisement event to the server, to indicate that the advertisement played by the advertising device is effectively exposed to the user. The advertisement event carries the unified identity associated with the user, so that the advertisement played by the advertising device can also be associated with the user, and the advertisement played by the advertising device can participate in advertisement attribution analysis. This implements advertisement attribution analysis of the advertising device. The core terminal also adds the unified identity when reporting the advertisement event to the server. Therefore, after the user behavior conversion occurs, the server may determine, based on the unified identity, an advertisement event of an advertisement played by each device (for example, the advertising device and the core terminal), so as to determine a degree of contribution of the advertisement played by each device to the user behavior conversion. This implements cross-device advertisement attribution analysis between the advertising device and the personal device of the user.

In addition, another terminal of the user, for example, the trusted terminal, also adds the unified identity when reporting the advertisement event. This implements cross-device advertisement attribution analysis between the advertising device and a plurality of personal devices of the user. For a same device, for example, the core terminal or the trusted terminal, when different applications included in the device display advertisements, the device adds a same identifier to the server, for example, the advertisement event of the unified identity, so that the server performs advertisement attribution analysis. This implements advertisement attribution analysis covering all devices and all services. Moreover, the solution provided in this embodiment does not depend on whether the terminal is logged in to by using an account. Therefore, even if a device and another device are not logged in to by using a same account, cross-device advertisement attribution analysis can also be implemented only when a same identifier such as the unified identity is added to a to-be-sent advertisement event.

Embodiment 2

For example, a server (which is referred to as, for example, a first server) configured to provide an advertisement resource and an advertising platform is different from a server (which is referred to as, for example, a second server) configured to perform attribution analysis. The advertisement attribution method provided in this embodiment may include the following steps.

Step 1: The first server receives an advertisement placement task of a brand advertiser.

Step 2: The first server receives an advertisement request 1 of an advertising device, and returns an advertisement response 1 to the advertising device, and the advertising device plays an advertisement 1 based on the advertisement response 1.

Step 3: The advertising device broadcasts a wireless signal. The wireless signal may include orientation information of the advertising device, an identifier of the advertising device, and a tracking parameter of the advertisement 1 that is being played by the advertising device, to determine an advertising campaign of the advertisement 1. The wireless signal may further include an identifier of the advertisement 1, and the like.

Step 4: A core terminal receives the wireless signal, determines, based on the wireless signal, and a position and a movement direction of the core terminal, that an orientation of the core device relative to the advertising device meets a preset condition, and when determining that duration in which the orientation meets the preset condition is greater than preset exposure duration, determines that the advertisement 1 played by the advertising device is effectively exposed to a user holding the core terminal.

Step 5: The core terminal sends an advertisement event 1 to the second server, where the advertisement event 1 includes the identifier of the advertising device, a unified identity associated with the user, and the tracking parameter of the advertisement 1 that is being played by the advertising device.

Step 6: The core terminal sends an advertisement request 2 to the first server, receives an advertisement response 2 returned by the first server, and plays an advertisement 2 based on the advertisement response 2.

Step 7: The core terminal sends an advertisement event 2 to the second server, where the advertisement event 2 includes an advertisement slot identifier, the unified identity, and a tracking parameter of the advertisement 2 that is being played by the core terminal, to determine an advertising campaign of the advertisement 2. The advertisement event 2 may further include an identifier of the advertisement 2, and the like. The advertisement slot identifier includes information used to identify the core terminal. In addition, when the unified identity is different from an OAID, the advertisement event 2 may further include the OAID.

Step 8: A trusted terminal sends an advertisement request 3 to the first server, receives an advertisement response 3 returned by the first server, and plays an advertisement 3 based on the advertisement response 3.

Step 9: The trusted terminal sends an advertisement event 3 to the second server, where the advertisement event 3 includes an advertisement slot identifier (for example, a second advertisement slot identifier in this application), the unified identity, and a tracking parameter of the advertisement 3 that is being played by the trusted terminal. The tracking parameter of the advertisement 3 is used to determine an advertising campaign of the advertisement 3. The advertisement event 3 may further include an identifier of the advertisement 3, and the like.

Step 10: The second server receives a conversion event from the core terminal, where the conversion event includes the unified identity and the tracking parameter of the advertisement 2.

Step 11: The second server obtains, based on the unified identity and the tracking parameter of the advertisement 2 that are included in the conversion event, an advertisement event related to the conversion event, so as to perform advertisement attribution analysis.

In this embodiment, because the server that performs advertisement attribution analysis is different from the server that provides an advertisement resource and an advertising platform, the server that performs advertisement attribution analysis and the second server do not learn of an advertising campaign corresponding to an advertisement delivered to each device. Therefore, when a device reports an advertisement event to the second server, the device needs to add a tracking parameter of a corresponding advertisement, so that the second server determines, after receiving a conversion event, an advertising campaign of an advertisement corresponding to each advertisement event, to determine an advertisement event related to the conversion event. In other words, the advertisement event 1, the advertisement event 2, and the advertisement event 3 each include the tracking parameter of the corresponding advertisement, to determine the advertising campaign. In this way, after receiving the conversion event, the second server may determine, based on the tracking parameter carried in each advertisement event, the advertising campaign of the advertisement corresponding to each advertisement event. Specifically, the second server may determine the advertising campaign of the advertisement 1 based on the tracking parameter of the advertisement 1 in the advertisement event 1, determine the advertising campaign of the advertisement 2 based on the tracking parameter of the advertisement 2 in the advertisement event 2, and determine the advertising campaign of the advertisement 3 based on the tracking parameter of the advertisement 3 in the advertisement event 3, so as to determine the advertisement event related to the conversion event. In some other embodiments, if the server that provides an advertisement resource and an advertising platform is different from the server configured to perform attribution analysis, the advertisement event reported by the device may alternatively not carry the tracking parameter of the advertisement corresponding to the advertisement event. Instead, the server that provides an advertisement resource, for example, the first server, sends a correspondence between an advertisement and an advertising campaign that is stored in the first server to the second server for storage. In this way, after receiving the conversion event, the second server may determine, based on the stored correspondence and the conversion event, the advertising campaign of the advertisement corresponding to each advertisement event, so as to determine the advertisement event related to the conversion event.

It should be noted that other descriptions in this embodiment of this application are similar to the descriptions of the corresponding content in the embodiment shown in FIG. 6A-1 to FIG. 6A-3. Details are not described herein again. In addition, the technical solution provided in this embodiment is similar to the technical solution provided in the embodiment shown in FIG. 6A-1 to FIG. 6A-3, and may also achieve beneficial effects of the embodiment shown in FIG. 6A-1 to FIG. 6A-3. Details are not described herein again in this embodiment.

Some other embodiments of this application further provide a computer-readable storage medium. The computer-readable storage medium may include computer instructions. When the computer instructions are run on a terminal, for example, the foregoing core terminal, the core terminal is enabled to perform the corresponding steps in the advertisement multi-screen collaboration method in the embodiment shown in FIG. 6A-1 to FIG. 6A-3 or FIG. 7A to FIG. 7E.

Some other embodiments of this application further provide a computer-readable storage medium. The computer-readable storage medium may include computer instructions. When the computer instructions are run on a terminal, for example, the foregoing trusted terminal, the trusted terminal is enabled to perform the corresponding steps in the advertisement multi-screen collaboration method in the embodiment shown in FIG. 6A-1 to FIG. 6A-3 or FIG. 7A to FIG. 7E.

Some other embodiments of this application further provide a computer-readable storage medium. The computer-readable storage medium may include computer instructions. When the computer instructions are run on a server, the server is enabled to perform the corresponding steps in the advertisement multi-screen collaboration method in the embodiment shown in FIG. 6A-1 to FIG. 6A-3 or FIG. 7A to FIG. 7E.

Some other embodiments of this application further provide a computer-readable storage medium. The computer-readable storage medium may include computer instructions. When the computer instructions are run on an advertising device, the advertising device is enabled to perform the corresponding steps in the advertisement multi-screen collaboration method in the embodiment shown in FIG. 6A-1 to FIG. 6A-3 or FIG. 7A to FIG. 7E.

Some other embodiments of this application further provide an apparatus. The apparatus has functions of implementing behavior of the core terminal in the method shown in FIG. 6A-1 to FIG. 6A-3 and FIG. 7A to FIG. 7E. The functions may be implemented by hardware, or may be implemented by hardware executing corresponding software. The hardware or software includes one or more modules corresponding to the foregoing functions, for example, a receiving unit or module, a sending unit or module, a determining unit or module, and a generation unit or module.

Some other embodiments of this application further provide an apparatus. The apparatus has functions of implementing behavior of the trusted terminal in the method shown in FIG. 6A-1 to FIG. 6A-3 and FIG. 7A to FIG. 7E. The functions may be implemented by hardware, or may be implemented by hardware executing corresponding software. The hardware or software includes one or more modules corresponding to the foregoing functions, for example, a receiving unit or module and a sending unit or module.

Some other embodiments of this application further provide an apparatus. The apparatus has functions of implementing behavior of the server in the method shown in FIG. 6A-1 to FIG. 6A-3 and FIG. 7A to FIG. 7E. The functions may be implemented by hardware, or may be implemented by hardware executing corresponding software. The hardware or software includes one or more modules corresponding to the foregoing functions, for example, a receiving unit or module, an update unit or module, and a sending unit or module.

The foregoing descriptions about implementations allow persons skilled in the art to understand that, for the purpose of convenient and brief description, division of the foregoing function modules is used as an example for illustration. During actual application, the foregoing functions can be allocated to different function modules and implemented according to a requirement, that is, an inner structure of an apparatus is divided into different function modules to implement all or some of the functions described above.

In several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed on different places. Some or all of the units may be selected according to an actual requirement to achieve an objective of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
playing, by an advertising device, a first advertisement
broadcasting, by the advertising device, a wireless signal, wherein the wireless signal comprises an identifier of the advertising device and orientation information of the advertising device, and the orientation information indicates a position and an orientation of the advertising device;
receiving, by a first terminal, the wireless signal;
determining, by the first terminal, based on the orientation information in the wireless signal, based on a position and a movement direction of the first terminal, and based on a preset exposure duration, that the first advertisement played by the advertising device is effectively exposed to a user of the first terminal;
sending, by the first terminal, based on determining that the first advertisement played by the advertising device is effectively exposed to the user of the first terminal, a first advertisement event to a server, wherein the first advertisement event comprises the identifier of the advertising device and a unified identity, and the unified identity corresponds to the user of the first terminal;

playing, by the first terminal, a second advertisement;

sending, by the first terminal, a second advertisement event to the server, wherein the second advertisement event comprises a first advertisement slot identifier and the unified identity, and the first advertisement slot identifier comprises information identifying the first terminal;

receiving, by the server, the first advertisement event;

receiving, by the server, the second advertisement event;

receiving, by the server, a conversion event from the first terminal, wherein the conversion event comprises the unified identity and a first tracking parameter, and wherein the conversion event indicates the user interaction with an advertisement;

determining, by the server, an advertising campaign of the first advertisement corresponding to the first advertisement event;

determining, by the server, an advertising campaign of the second advertisement corresponding to the second advertisement event;

determining, by the server, based on the unified identity and the first tracking parameter in the conversion event, that the advertising campaign of the first advertisement corresponding to the first advertisement event is the same as an advertising campaign indicated by the first tracking parameter;

determining, by the server, that the advertising campaign of the second advertisement corresponding to the second advertisement event is the same as the advertising campaign indicated by the first tracking parameter;

determining, by the server, based on determining both that that the advertising campaign of the first advertisement corresponding to the first advertisement event is the same as an advertising campaign indicated by the first tracking parameter and that the advertising campaign of the second advertisement corresponding to the second advertisement event is the same as the advertising campaign indicated by the first tracking parameter, that the first advertisement event and the second advertisement event are related to the conversion event; and determining, by the server, based on determining that the first advertisement event and the second advertisement event are related to the conversion event, and based on the first advertisement event and the second advertisement event, a degree of contribution to user behavior conversion of the first advertisement played by the advertising device and a degree of contribution to the user behavior conversion of the second advertisement played by the first terminal.

2. The method according to claim 1, wherein the first advertisement event further comprises a second tracking parameter, the second advertisement event further comprises the first tracking parameter, and the second tracking parameter is added by the advertising device to the wireless signal and sent to the first terminal; and wherein determining, by the server, the advertising campaign of the first advertisement corresponding to the first advertisement event, and determining an advertising campaign of the second advertisement corresponding to the second advertisement event comprises:

determining, by the server, the advertising campaign of the first advertisement based on the second tracking parameter in the first advertisement event; and determining, by the server, the advertising campaign of the second advertisement based on the first tracking parameter in the second advertisement event.

3. The method according to claim 1, wherein the server stores a correspondence between a plurality of advertisements and a plurality of advertising campaigns; and wherein determining, by the server, the advertising campaign of the first advertisement corresponding to the first advertisement event, and determining the advertising campaign of the second advertisement corresponding to the second advertisement event comprises:

determining, by the server, the advertising campaign of the first advertisement based on the correspondence and the first advertisement corresponding to the first advertisement event; and determining, by the server, the advertising campaign of the second advertisement based on the correspondence and the second advertisement corresponding to the second advertisement event.

4. The method according to claim 1, further comprising:

sending, by the first terminal, the conversion event to the server when receiving a conversion operation performed by the user on the second advertisement.

5. The method according to claim 1, wherein the unified identity is pre-configured in the first terminal.

6. The method according to claim 1, wherein before sending, by the first terminal, the first advertisement event to the server, the method further comprises:

generating, by the first terminal, the unified identity.

7. The method according to claim 1, wherein before receiving, by the server, the conversion event from the first terminal, the method further comprises:

sending, by the first terminal, the unified identity to a second terminal;

receiving, by the second terminal, the unified identity;

playing, by the second terminal, a third advertisement, and sending a third advertisement event to the server, wherein the third advertisement event comprises a second advertisement slot identifier and the unified identity, and the second advertisement slot identifier comprises information identifying the second terminal; and receiving, by the server, the third advertisement event; and wherein after receiving, by the server, the conversion event from the first terminal, the method further comprises:

determining, by the server, an advertising campaign of the third advertisement corresponding to the third advertisement event; and determining, by the server based on the unified identity and the first tracking parameter in the conversion event, that the advertising campaign of the third advertisement corresponding to the third advertisement event is the same as the advertising campaign indicated by the first tracking parameter, determining that the third advertisement event is related to the conversion event, and determining, based on the third advertisement event, a degree of contribution to the user behavior conversion of the third advertisement played by the second terminal.

8. The method according to claim 1, further comprising:

optimizing a brand advertisement placement policy based on the determined degree of contribution of the first advertisement played by the advertising device to user behavior conversion and the determined degree of contribution of the second advertisement played by the first terminal to the user behavior conversion.

9. The method according to claim 8, wherein optimizing the brand advertisement placement policy comprises increasing a placement volume or changing to a new advertisement device.

10. A method, comprising:
receiving, by a first terminal, a wireless signal that is broadcast by an advertising device, wherein the wireless signal comprises an identifier of the advertising device and orientation information of the advertising device, and wherein the orientation information indicates a position and an orientation of the advertising device;
determining, by the first terminal, based on the orientation information in the wireless signal, based on a position and a movement direction of the first terminal, and based on an effective exposure duration, that a first advertisement played by the advertising device is effectively exposed to a user of the first terminal;
sending, by the first terminal, a first advertisement event to a server, wherein the first advertisement event comprises the identifier of the advertising device and a unified identity, and wherein the unified identity corresponds to the user of the first terminal, and wherein the server determines, based on the first advertisement event, and after the server receives a conversion event related to the first advertisement event, a degree of contribution to the user behavior conversion of the first advertisement played by the advertising device;
playing, by the first terminal, a second advertisement, wherein the second advertisement and the first advertisement have a same advertising campaign; and
sending, by the first terminal, a second advertisement event to the server, wherein the second advertisement event comprises a first advertisement slot identifier and the unified identity, wherein the first advertisement slot identifier comprises information identifying the first terminal, and wherein the server determines, based on the second advertisement event, and after the server receives the conversion event related to the second advertisement event, a degree of contribution to the user behavior conversion of the second advertisement played by the first terminal.

11. The method according to claim 10, wherein the wireless signal further comprises a second tracking parameter, the first advertisement event further comprises the second tracking parameter, and the server determines that the first advertisement event is related to the conversion event based on the second tracking parameter in the first advertisement event; and
wherein the second advertisement event further comprises a first tracking parameter, and wherein the server determines that the second advertisement event is related to the conversion event based on the first tracking parameter in the second advertisement event.

12. The method according to claim 10, further comprising:
sending, by the first terminal, the unified identity to a second terminal, wherein the second terminal sends a third advertisement event that carries the unified identity to the server when playing a third advertisement, wherein an advertising campaign of the third advertisement is the same as the advertising campaign of the first advertisement, and the server determines, based on the third advertisement event after receiving the conversion event related to the third advertisement event, a degree of contribution to the user behavior conversion of the third advertisement played by the second terminal.

13. The method according to claim 10, wherein determining, by the first terminal based on the orientation information in the wireless signal, based on the position and a movement direction of the first terminal, and based on the effective exposure duration, that the first advertisement played by the advertising device is effectively exposed to the user of the first terminal comprises:
determining, by the first terminal based on the orientation information, and the position and the movement direction of the first terminal, that an orientation of the first terminal relative to the advertising device meets a preset condition;
determining, by the first terminal, an exposure duration in which the first advertisement played by the advertising device is exposed to the user of the first terminal; and
determining, by the first terminal, based on determining that the exposure duration is greater than the effective exposure duration, that the first advertisement played by the advertising device is effectively exposed to the user of the first terminal, wherein that the orientation of the first terminal relative to the advertising device meets the preset condition comprises:
a distance between the first terminal and the advertising device is within a preset distance range, the first terminal is located on a side of the orientation of the advertising device, and an included angle between the movement direction of the first terminal and the orientation of the advertising device is within a preset included angle range.

14. The method according to claim 10, wherein before playing, by the first terminal, the second advertisement, the method further comprises:
sending, by the first terminal, a first advertisement request to the server, wherein the first advertisement request comprises the unified identity and the first advertisement slot identifier, and the first advertisement request requests an advertisement resource; and
receiving, by the first terminal, a first advertisement response from the server, wherein the first advertisement response comprises an advertisement resource of the second advertisement.

15. The method according to claim 10, wherein the determined degree of contribution of the first advertisement played by the advertising device to user behavior conversion and the determined degree of contribution of the second advertisement played by the first terminal to the user behavior conversion are used to optimize a brand advertisement placement policy.

16. A system, comprising:
a server;
an advertising device, configured to:
play a first advertisement; and
broadcast a wireless signal, wherein the wireless signal comprises an identifier of the advertising device and orientation information of the advertising device, and wherein the orientation information indicates a position and an orientation of the advertising device; and
a first terminal, configured to:
receive the wireless signal;
determine, based on the orientation information in the wireless signal, based on a position and a movement direction of the first terminal, and based on a preset exposure duration, that the first advertisement played by the advertising device is effectively exposed to a user of the first terminal;

send a first advertisement event to the server, based on determining that the first advertisement played by the advertising device is effectively exposed to the user of the first terminal, wherein the first advertisement event comprises the identifier of the advertising device and a unified identity, and the unified identity corresponds to the user of the first terminal;

play a second advertisement; and send a second advertisement event to the server, wherein the second advertisement event comprises a first advertisement slot identifier and the unified identity, and the first advertisement slot identifier comprises information identifying the first terminal;

send a conversion event to the server, wherein the conversion event comprises the unified identity and a first tracking parameter, and wherein the conversion event indicates the user interaction with an advertisement wherein the server is configured to:
receive the first advertisement event;
receive the second advertisement event;
receive a conversion event from the first terminal;
determine an advertising campaign of the first advertisement corresponding to the first advertisement event;
determine an advertising campaign of the second advertisement corresponding to the second advertisement event;
determine, based on the unified identity and the first tracking parameter in the conversion event, that the advertising campaign of the first advertisement corresponding to the first advertisement event is the same as an advertising campaign indicated by the first tracking parameter;
determine that the advertising campaign of the second advertisement corresponding to the second advertisement event is the same as the advertising campaign indicated by the first tracking parameter;
determine, based on determining both that that the advertising campaign of the first advertisement corresponding to the first advertisement event is the same as an advertising campaign indicated by the first tracking parameter and that the advertising campaign of the second advertisement corresponding to the second advertisement event is the same as the advertising campaign indicated by the first tracking parameter, that the first advertisement event and the second advertisement event are related to the conversion event; and determine, based on determining that the first advertisement event and the second advertisement event are related to the conversion event, and based on the first advertisement event and the second advertisement event, a degree of contribution to the user behavior conversion of the first advertisement played by the advertising device and a degree of contribution to the user behavior conversion of the second advertisement played by the first terminal.

17. The system according to claim 16, further comprising a second terminal;
wherein the first terminal is further configured to send the unified identity to the second terminal; and
wherein the second terminal is configured to:
receive the unified identity, play a third advertisement, and send a third advertisement event to the server, wherein the third advertisement event comprises a second advertisement slot identifier and the unified identity, and the second advertisement slot identifier comprises information used to identify the second terminal; and
wherein the server is further configured to:
receive the third advertisement event;
determine an advertising campaign of the third advertisement corresponding to the third advertisement event; and
determine, based on the unified identity and the first tracking parameter in the conversion event, that the advertising campaign of the third advertisement corresponding to the third advertisement event is the same as the advertising campaign indicated by the first tracking parameter, determine that the third advertisement event is related to the conversion event, and determine, based on the third advertisement event, a degree of contribution to the user behavior conversion of the third advertisement played by the second terminal.

18. The system according to claim 17, further comprising:
a relay device; and
wherein the first terminal is configured to send the unified identity to the second terminal through the relay device.

19. The system according to claim 16, wherein the determined degree of contribution of the first advertisement played by the advertising device to user behavior conversion and the determined degree of contribution of the second advertisement played by the first terminal to the user behavior conversion are used to optimize a brand advertisement placement policy.

20. The system according to claim 19, wherein optimizing the brand advertisement placement policy comprises increasing a placement volume or changing to a new advertisement device.

* * * * *